United States Patent
Mani et al.

(10) Patent No.: US 7,953,850 B2
(45) Date of Patent: May 31, 2011

(54) MONITORING RELATED CONTENT REQUESTS

(75) Inventors: Ramesh Mani, Fremont, CA (US); Brian Zuzga, San Francisco, CA (US); Ling Thio, Sunnyvale, CA (US)

(73) Assignee: Computer Associates Think, Inc., Islandia, NY (US)

( * ) Notice: Subject to any disclaimer, the term of this patent is extended or adjusted under 35 U.S.C. 154(b) by 230 days.

(21) Appl. No.: 12/244,942

(22) Filed: Oct. 3, 2008

(65) Prior Publication Data

US 2010/0088404 A1    Apr. 8, 2010

(51) Int. Cl.
G06F 15/16      (2006.01)
G06F 15/173     (2006.01)
G06F 15/177     (2006.01)

(52) U.S. Cl. ......... 709/224; 715/762; 715/273; 717/104

(58) Field of Classification Search .......... 709/217–228; 715/762, 273; 717/104
See application file for complete search history.

(56) References Cited

U.S. PATENT DOCUMENTS

| 7,805,510 | B2* | 9/2010 | Bansal et al. | 709/224 |
| 2006/0095569 | A1* | 5/2006 | O'Sullivan | 709/224 |
| 2007/0266045 | A1* | 11/2007 | Bansal et al. | 707/104.1 |
| 2007/0266148 | A1* | 11/2007 | Ruiz et al. | 709/224 |
| 2007/0266149 | A1* | 11/2007 | Cobb et al. | 709/224 |
| 2008/0192725 | A1* | 8/2008 | Dussaume et al. | 370/349 |

* cited by examiner

*Primary Examiner* — Haresh N Patel
(74) *Attorney, Agent, or Firm* — Vierra Magen Marcus & DeNiro LLP

(57) ABSTRACT

Multiple transaction components that comprise a transaction are correlated using a GUID generated at a browser application. The transaction components may occur asynchronously or synchronously between a network browser and one or more applications. An identifier is generated for a set of network browser requests corresponding to a single user input or some other event and the identifier is included in each request. Server traffic and the servers processing the request are monitored and data which includes the identifier is generated. Data for the transaction with multiple transaction components is reported using the GUID associated with the transaction.

17 Claims, 30 Drawing Sheets

| Request Unique Id | Servlet |
|---|---|
| 1 | Servlet A |
| 2 | Servlet B |
| 3 | Servlet C |
| 4 | Servlet D |

MONITORING RELATED CONTENT REQUESTS

BACKGROUND

The growing presence of the Internet as well as other computer networks such as intranets and extranets has brought many new applications in e-commerce and other areas. Organizations increasingly rely on such applications to carry out their business or other objectives, and devote considerable resources to ensuring that the applications perform as expected. To this end, various application management techniques have been developed.

Previously, performance of a web service was monitored by adding a component between the client device and an application server. The component determines times between transmission events for the client device and application server. However, the interposed component introduces additional delays in the communication between the client device and the application server.

Another previous system for monitoring web service performance captures times associated with server-side events during communication with a client device. An application server of the server-side time capture system receives a content request from a client device. After receiving the request, the server generates a content response which includes page load notification code and sends the response to the client device. An Internet browser at the client loads the content in the response and executes the page load notification code. When the content loading is completed, the code sends a page load notification message to the application server. The application server then determines the response time for the web service as the difference between the time the content request was received and the time the page load notification message was received at the application server.

The server-side time capture system for monitoring a web service shall be discussed in more detail. The system includes a client device, an application server, an agent and a manager application. The client device includes an Internet browser (or browser application). The content request is initiated by the browser application on the client in response to receiving user input. The time at which the server receives the request from the client is stored by the server. The server then generates a content response for the request. The content response includes requested content, a response identifier and page load notification code. The server sends the generated response to the client device. The page load notification message sent after content has been loaded includes the response identifier and is in the form of an image content request. When the server receives the page load notification message, it captures the current time at the server. The server-side captured response times are then sent to an agent module. The agent module aggregates the response time information and forwards aggregated response time information to a manager application.

The application server generates the response using a servlet and servlet filters. A custom servlet filter is used to insert the page load notification code into the response. Bytecode generation is used to generate the custom servlet filter within an application. To generate the filter, an application management tool may instrument the application's object code (also called bytecode). An application uses probes to access information from the application. A probe builder instruments (e.g. modifies) the bytecode for the application to add probes and additional code to the application. By adding the probes, the application becomes a managed application. The probes may measure specific pieces of information about the application without changing the application's business logic. The probe builder also generates the agent module. The agent may be installed on the same machine as the managed application or a separate machine. More information about instrumenting byte code can be found in U.S. Pat. No. 6,260,187 "System For Modifying Object Oriented Code" by Lewis K. Cirne, and U.S. patent application Ser. No. 09/795,901, filed Feb. 28, 2001, entitled "Adding Functionality to Existing Code at Exits," having inventor Jeffrey Cobb, both of which are incorporated herein by reference in its entirety. In one embodiment, the technology described herein does not actually modify source code. Rather, the present invention modifies object code. The object code is modified conceptually in the same manner that source code modifications are made.

To configure the application server of the server-side time capture system to process requests, the application server is initialized. After the server is initialized, application servlet filters are loaded and instantiated into servlet containers. To load and instantiate the application servlet filters, an application server configuration file is accessed and loaded to determine the current servlet filters associated with the application servlet container. Once the current servlet filters are determined, additional servlet filters are added into the servlet filter chain. The custom servlet data is added to a configuration file entitled, "web.xml" of the application server. The custom servlet filter data is added such that custom servlet filter is the first to process a content request for a servlet and last to process an outgoing content response from a servlet. The application server configuration file with modified servlet chain data is stored as an object in the application server memory.

The application file on the application server is then initialized, and the stored application server configuration file is read. The configuration file is read by the servlet container in preparation for instantiating servlets and servlet filters. Individual servlet filter class files are then loaded and instantiated. The individual servlet filter class files include both custom servlet class files and pre-existing servlet class files. This creates a data structure of servlet filters which will be used to process incoming content requests. Next, request templates for a servlet and servlet filter chains are generated and cached. Templates consisting of a chain of processing servlet filters and servlets are generated for particular URLs.

When a content request is received by the configured application server, the server generates a content response. The content response is generated at the application server by a servlet and a chain of one or more servlet filters. Once the content request is received by the application server, the server generates a request object and a response object. The request and response objects are routed through the chain of servlet filters and then to the servlet. The servlet generates the response from the response object, and the response is routed through the servlet filters again before being sent to the requesting client device.

The servlet filter chain includes a custom servlet filter inserted by bytecode instrumentation. When the request is routed through the servlet filters to the servlet, custom servlet filter assigns a request identifier to the request. The request identifier is stored with the request as it is processed by the servlet and servlet filters. The request identification number and corresponding servlet identification information are stored in a servlet table. The custom servlet filter also wraps the response object in a wrapper. The response object wrapper detects whether a writing object or output stream is used to generate the body of the response and can provide that information to a requesting entity.

When processing the response generated by the servlet, the custom servlet filter adds JavaScript page load notification code to the response. When adding the page load notification code to the content response, the custom servlet filter confirms the response is in HTML and whether the response was written using an available writer or an output stream. The custom servlet determines if the response is in HTML by placing a call to a response object method for retrieving a Multi-Purpose Internet Mail Extension (MIME) type of the response object. The response from the get MIME type method indicates whether the MIME type is HTML or some other format. If the response is determined to be HTML, a Get Writer query is made to the response object wrapper. The page load notification code is then written to the response using either an output stream if used to generate the response, the writer used to generate the response, or an alternative writer that may be used to write to the response. If the response is not in HTML or there is no writer available to write code to the response which was generated with a writer, then the code is not inserted into the response by the custom servlet filter.

After writing the response, the response is sent to the client device. The client device receives the response and provides the response to the browser application. The page load notification code is then registered with the browser application and executed. When executed, the page load notification code registers a function with an On Load event handler at the browser application.

When an On Load handler already exists, the page load notification code places the function before the existing code in the On Load handler such that the added code is executed first. The function is JavaScript code that, when executed, sends a page load notification message to the application server. The page load notification message includes the request identification information assigned to the response by the custom servlet filter. The page load notification code is executed upon the detection of a browser application On Load event.

The page load notification message is in the form of an image source request message. Thus, the message requests image data from the application server. The message includes the request identification information in the name of the site request, such that the message is sent to: HTTP://(site)/ID=A, wherein A is the request identification information. The receiving application server "site" extracts the request identification information included in the site link and transmits a response to the image source request. The response is a transparent image having a 1×1 pixel array.

After the client device sends the page load notification message, the application server receives the message. The application server routes the received message to the appropriate processing servlet within the application server. The application server determines the appropriate servlet by retrieving the servlet identifier from the servlet identification table which is associated with the request identification information in the response. The processing servlet determines the time the page load notification message was received, determines the response time based on server side events, and sends an image content response to the browser application. The image content response includes a transparent 1×1 pixel matrix.

After processing the response, the servlet sends the time response to the agent application. The agent application then stores and aggregates the received time data at step 1420. The aggregated time data is then sent to the manager application. The data may then be reported by the manager application to a workstation or database. The manager application receives performance data from managed applications via the Agent application, runs requested calculations, makes performance data available to workstations and optionally sends performance data to a database for later analysis. The workstations are the graphical user interface for viewing performance data. The workstations are used to create custom views of performance data which can be monitored by a human operator. The workstations consist of two main windows: a console and an explorer. The console displays performance data in a set of customizable views. The explorer depicts alerts and calculators that filter performance data so that the data can be viewed in a meaningful way.

The server-side time capture system is able to capture server-side information related to web service response time, but is not able to accurately determine the actual response time involved with a web service which provides content to a user at a client device. Rather, the server-side time capture system approximates the response time by recording times at the server that are associated with communications with the client device. The server-side time capture system also does not monitor the different content requests made from a client in response to a user input. Accurate assessment of web service performance is important to evaluating the service provided to users.

SUMMARY

Performance monitoring of web services is achieved by correlating multiple transaction components between a network browser and one or more applications. An identifier is generated for a set of network browser requests that correspond to a single user input or some other event. The identifier is included in each request sent to one or more applications on one or more servers providing a web service. The servers are monitored and performance data which includes the identifier is generated. The identifier is used to correlate performance data for requests that correspond to a single user input or other event.

An identifier can be placed in a network browser application request by performance monitoring code received from a server and loaded into the browser. The identifier allows multiple requests sent to any monitored application or web server to be correlated to determine web service performance. When an application server receives a client request, the server may include performance monitoring code in the response to the client. Upon receiving the response, the client may retrieve and execute the performance monitoring code such that the monitoring code is loaded into the browser. The loaded monitoring code may generate an identifier when the browser application receives a user selection or some other event occurs that causes the browser application to send a request. The identifier is included in each request resulting from the user input (or other event). One or more web servers or application servers will receive the one or more requests from the browser application with the identifier, and monitoring systems will be able to detect and correlate the requests associated with the user input.

An embodiment monitors a transaction by receiving a request by a client through an application. The application stores an identifier associated with the request. Two or more content requests are then generated based on the received request. Each of the requests includes the identifier stored by the application. The application then transmits the content requests with the identifier.

An embodiment receives a user selection through a network browser and generates a GUID associated with the selection. Two or more asynchronous requests are then sent by the network browser in response to the selection. Each of the one or more asynchronous requests include the generated GUID.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
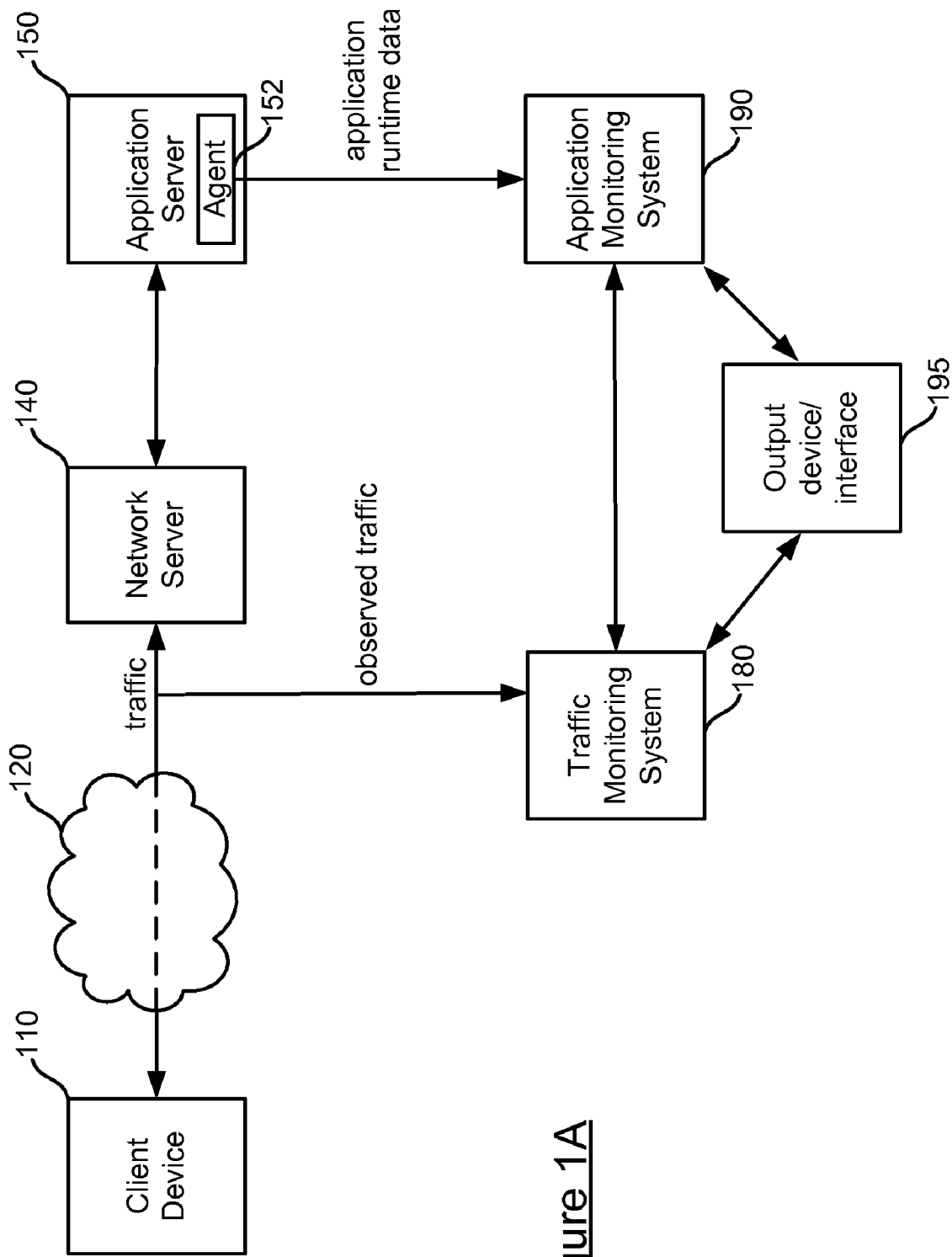
FIG. 1A is a block diagram of an embodiment of a network monitoring system which monitors a network service.

Web service transactions are monitored for performance by correlating transaction components occurring between a network browser and one or more servers in response to a single user input or other event. An identifier is generated in response to receiving a single selection or input or some other event. The identifier is included in two or more requests sent to one or more servers. The identifier is retrieved from the request by one or more monitoring systems which monitor the traffic and/or performance of each server. The identifier and other transaction data are stored by the monitoring systems, and a new identifier is used to identify subsequent user selection. The retrieved identifier is used to correlate and report performance data for user selection that results in multiple browser application requests.

An identifier can be included in a request from a browser application by performance monitoring code in the browser. When an application server receives a client request, the server may include performance monitoring code in a response sent to the client. The client may receive the response, retrieve the performance monitoring code and execute the code such that the code is loaded into the browser. The loaded monitoring code generates an identifier when the browser application receives user input or some other event occurs that causes the browser application to send a request. In some embodiments, the identifier is included in each of multiple requests resulting from the user input or event. One or more web servers and application servers receive the browser application requests with the identifier, and one or more monitoring systems can access the identifier (and other data) by intercepting the requests and/or monitoring performance of the one or more of the applications that process the requests. The monitoring systems can then correlate performance data for the requests associated with the single user input using the identifier.

Performance monitoring code sent to a browser application registers code with one or more event handlers of a client application, such as an On Click handler. When a particular event is detected, the corresponding handler can execute code to generate and store an identifier associated with user input or an event, retrieve information from client files, or perform some other operation. Operation of performance monitoring code is discussed in more detail below.

In some embodiments, the technology herein may be used with interactive web applications provided through a network browser. The interactive web applications may enable asynchronous communication between the browser and one or more servers which provide browser content. The asynchronous communication may allow a browser to be updated in part without reloading or refreshing an entire content page within the browser. The asynchronous interactive web browser experience may be implemented using one or more of IFrames, XHMTL, cascade style sheets (CSS), or Asynchronous JavaScript and XML (AJAX). Monitoring a set of transactions associated with an interactive web application is discussed in more detail below.

Network Service Monitoring

The present technology may be implemented at least in part by a network service monitoring system that monitors a network service such as a web service, though other network services may be monitored as well. Generally, a network service can be provided over the Internet, an intranet, an extranet, a private network or other network or networks and is not limited to network services which are provided via the World Wide Web. Although some examples discussed below reference a web service, the technology discussed herein applies generally to other services that are connected to or in communication with a network or other means of communication.

The network service monitoring system may include multiple monitoring systems such as, in one embodiment, a traffic monitoring system and an application monitoring system. The traffic monitoring system may observe network traffic sent and received by a network service, may have a variety of architectures and may monitor traffic provided according to any type of network protocol. The observed traffic may be processed as discussed in more detail below to provide traffic monitoring data. An example network monitoring system is discussed below in connection with FIG. 1A. Logical operation of a traffic monitoring system is discussed below with respect to FIG. 1B.

In some embodiments, a synthetic transaction generating system may be implemented as a separate system from the network monitoring system. Thus, a synthetic transaction generating system may reside on the client side of the network illustrated in FIG. 1A.

The application monitoring system may monitor the execution of one or more applications of the network service. For example, the application monitoring system may monitor the performance of one or more applications and/or application components and generate corresponding application runtime data which identifies, e.g., components which are invoked in one or more execution paths such as threads and/or processes of the application. For example, the components can include servlets, Java Server Pages, Enterprise Java Beans Java Database Connectivity components and/or Microsoft .NET components. The application runtime data can provide a transaction trace, for example, which indicates the time intervals in which the components were invoked. Logical operation of an application monitoring system is discussed in more detail below with respect to FIG. 1C.

Processing observed traffic and application runtime data may include associating the two types of data so that related traffic monitoring data and application runtime data can be correlated and selectively accessed. In this way, an operator can quickly navigate through the data to obtain relevant information, such as information for diagnosing an anomalous condition.

Thus, an operator may obtain information regarding network service performance "from the outside" by viewing the observed traffic (e.g., from the perspective of a client interacting with the network service) as well as "from the inside" (e.g., from the perspective of the execution of components of the application). By viewing a network service from the inside and outside, the operator has more information from which to monitor, manage and diagnose the performance and health of a network service.

For example, the traffic monitoring data can characterize a user's interaction with an application from the user's perspective, that is, by answering the question: "What is the impact of the application on the user?" The application runtime data can characterize the application from a perspective of individual software components that are invoked in the application. Such component level data allows a programmer or other specialists to diagnose a problem and implement a fix, e.g., by patching or otherwise revising the application, repairing or replacing hardware, reallocating resources, etc. The traffic monitoring data and application runtime data can also be used separately, in a non-integrated manner. Generally, the application runtime data focuses on diagnosis of a problem, e.g., finding the root cause of a problem, while the traffic monitoring data focuses on user impact.

Further, traffic monitoring data and application runtime data can be classified according to one or more hierarchies which characterize client interactions with an application. For instance, a hierarchy may characterize the interactions according to a business model for an e-commerce application. This allows the traffic monitoring data and application runtime data to be presented in a user-friendly manner which is tailored to the needs of a particular organization and individuals in the organization.

FIG. 1A is a block diagram of an embodiment of a network monitoring system which monitors a network service. The network service includes an example network server 140 and an example application server 150. In practice, any number of servers or other computing devices which are connected in any configuration can be used. Network server 140 sends traffic to and receives traffic from an example client device 110 over a network 120, such as the Internet or other WAN, a LAN, intranet, extranet, private network or other network or networks. In practice, a number of client devices can communicate with the network server 140.

Application server 150 may be in communication with network server 140. In particular, when network server 140 receives a request from client device 110, network server 140 may relay the request to application server 150 for processing. The client device 110 can be a laptop, PC, workstation, cell phone, PDA, or other computing device which is operated by an end user. Or, the client device can be an automated computing device such as a server. Application server 150 processes the request received from the network server 140 and sends a corresponding response to the client device 110 via the network server 140.

The network monitoring system also includes traffic monitoring system 180 and an application monitoring system 190. In one possible approach, the application monitoring system uses one or more agents, such as agent 152, which is considered part of the application monitoring system 190, though it is illustrated as a separate block in FIG. 1A. Traffic monitoring system 180 observes traffic sent between client device 110 and network server 140, including requests sent from client device 110 and corresponding responses received by the client device 110. Agent 152 and application monitoring system 190 monitor the execution of one or more applications at the application server 150, generate application runtime data, which represents the execution of components of the application responsive to the requests, and process the generated application runtime data. In some embodiments, application monitoring system 190 may be used to monitor the execution of an application or other code at some other server, such as network server 140. An output device/interface 195 may communicate with the traffic monitoring system 180 and the application monitoring system 190 for presenting reports and other data to an operator and for receiving inputs from the operator. The traffic monitoring system 180 and the application monitoring system 190 may have independent interfaces or may share a common interface.

Figure 1B:
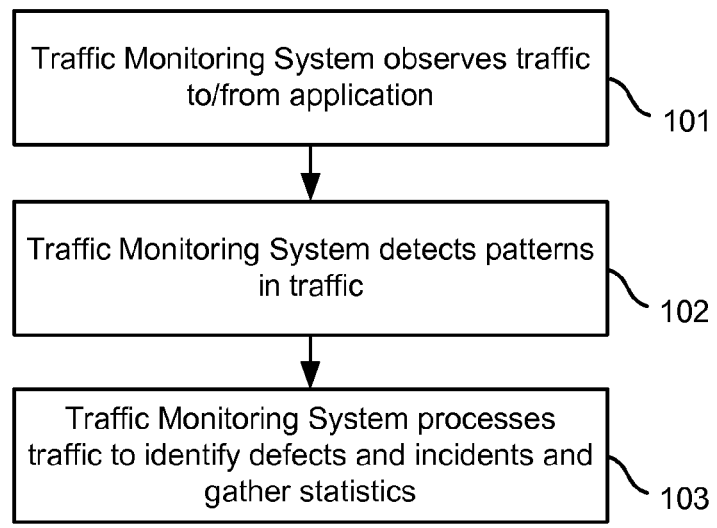
FIG. 1B illustrates a flowchart of an embodiment of a process by which a traffic monitoring system monitors traffic.

FIG. 1B illustrates a flowchart of an embodiment of a process by which traffic monitoring system 180 of FIG. 1A monitors traffic. Note that in this and the other flowcharts provided, the steps indicated are not necessarily performed one at a time in the order indicated, but may occur simultaneously, at least in part, and/or in another order. Traffic sent to and from an application, such as traffic sent between client device 110 and web server 140 over network 120, for instance, is observed by traffic monitoring system 180 at step 101. The observation can involve passively copying the traffic at some intermediate point between the client and the application via a tap or mirror port, for instance, or intercepting the traffic, copying the intercepted traffic and relaying the intercepted traffic it to its intended destination.

At step 102, the traffic monitoring system 180 detects patterns in the traffic and may use this information to group traffic into an object hierarchy. For example, this can involve recognizing application requests and responses, relating or binding corresponding request-response pairs into transaction components (for example an HTML file or an image file), binding transaction components into transactions (for example a web page with an HTML file and zero or more image files), binding transactions into user-specific tasks that may be called business transactions (for example an application's login business transaction may retrieves one or more web pages). Similarly, business transactions can be bound to a business process, and business processes can be bound to a domain. The domain, business processes, business transactions, transactions and transaction components may be part of one or more hierarchies which are defined for classifying the observed traffic. A business process includes one or more business transactions, and a domain includes one or more business processes.

Also, a transaction component may itself be a transaction and require no component-to-transaction binding, for example, where a web page transaction contains no additional components, or where additional components exist but are not defined as part of the transaction. Binding may be accomplished through a simple table lookup, where a list of transaction components is related to a transaction, for example. Another example of a binding mechanism may be through such a list used with a session identifier, where only transactions or transaction components sharing a common session identifier may be bound together. Further related information can be found in U.S. patent app. publication no. 2003/0191989 to P. O'Sullivan, published Oct. 9, 2003, titled "Methods, systems and computer program products for triggered data collection and correlation of status and/or state in distributed data processing systems," and incorporated herein by reference.

Transactions can be detected based on transaction definitions which specify the existence or non-existence or combination thereof of a set of name/value pairs, e.g., parameters, which are found in the traffic. For example, parameter specification may include a matching type, a parameter type (e.g., URL, cookie, post, or query, or session), a name pattern, and a value pattern. URL parameters include name/value pairs that appear in the HTTP request line before the first "?" character or in special request headers such as the Host: request header. Cookie parameters include name/value pairs that appear in the Cookie: request header. Post parameters include name/value pairs that appear in the HTTP POST request-body. Query parameters include name/value pairs that appear in the HTTP request line after the first "?" character. Session managers, such as the eTrust® SiteMinder available from CA, Inc., Islandia, N.Y. uses a cookie parameter to hold an encoded or encrypted value, which in turn holds session specific name/value pairs. Session parameters include name/value pairs that appear in such an encoded or encrypted value. Name and value specifications may specify an exact value for exact matching or a pattern for pattern matching. Any form of pattern matching may be used, from simple wild-card pattern matching to more complex regular expression pattern matching.

In particular, an operator can define a hierarchy for organizing the traffic monitoring data which is obtained by the traffic monitoring system, e.g., through an interface or other means. For example, an operator may use an interface to generate the hierarchy from a set of parameters obtained from the observed traffic. The parameters can be designated as belonging to one or more levels of the hierarchy as discussed in more detail below with respect to FIG. 3 and FIG. 10B. In this manner, traffic monitoring data can be accessed according to the classification provided by the hierarchy to facilitate diagnosis of anomalies and understanding of application and network performance.

At step 103, the traffic monitoring system processes the traffic to identify defects and incidents and gather statistics. A defect generally indicates an anomalous condition of a request-response pair. Moreover, an incident can be set when one or more related defects are set. An incident may be a cause for concern which should be analyzed further. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may be sufficient to set an incident.

In one approach, defects can be detected by evaluating a request-response pair against defect criteria which may specify transaction types, a range of acceptable response times, and/or other parameters, for instance. For example, when the defect criteria specifies a range of acceptable response times within which a response may be received after a request is sent, the request-response pair is defective if the response time falls outside the specified range. Similarly, when the defect criteria specify a range of unacceptable response times, the request-response pair is defective if the response time falls within the specified range. Moreover, defect criteria can be specified for transaction components, transactions and/or business transactions.

Furthermore, defect data and statistics can be aggregated for a number of request-response pairs and classified according to the hierarchy. The aggregated statistics and defects can then be processed to enable other functionality of the present technology and stored for access by an operator through an interface or other appropriate output.

Figure 1C:
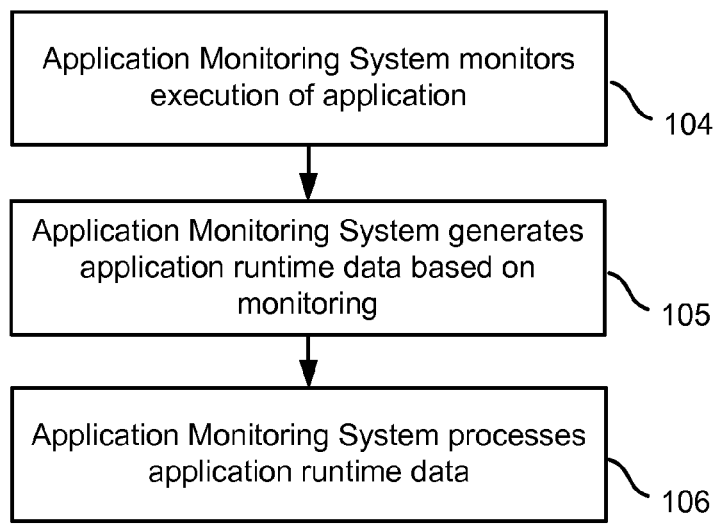
FIG. 1C illustrates a flowchart of an embodiment of a process by which an application monitoring system monitors an application.

FIG. 1C illustrates a flowchart of an embodiment of a process by which the application monitoring system 190 of FIG. 1A monitors an application. An application is monitored by application monitoring system 190 at step 104. Monitoring may involve agent 152 determining which components of application server 150 are invoked and the duration in which they are invoked when the application processes a client request, as discussed in more detail below with respect to FIG. 4 and FIG. 11.

Application runtime data based on the monitoring of the application is generated at step 105. The generated application runtime data can indicate the application components involved in processing a request, the duration that each component consumed in processing a request, and other information. The application runtime data can be generated by agent 152, in one possible approach, after which the agent 152 may forward the generated application runtime data to application monitoring system 190, which can exist outside of application server 150, in one embodiment. Generating and reporting application runtime data is discussed in more detail below with respect to FIG. 4 and FIG. 11.

The application runtime data is processed by application monitoring system 190 at step 106 such as by aggregating the data, storing the data, and providing the data to an operator through an interface or other output.

Further, traffic monitoring system 180 and application monitoring system 190 may communicate with each other to enable association of the traffic monitoring data and application runtime data. The association allows an operator to access information which characterizes the network service from the "outside" via the traffic monitoring data and from the "inside" of the network service via the application runtime data. This provides the operator with a powerful insight into how a network service processes requests (the inside perspective) and the effect of the network service on a customer or other user or network component (the outside perspective).

In some embodiments, the traffic and application monitoring systems may be used together, e.g., integrated, to provide diagnostics, statistics and other data regarding the operation of a web service, network system or other system. The integrated data may be analyzed by an operator or administrator, viewed in reports, and processed to identify system health, performance or other issues of concern, for instance.

In one embodiment, integrating the data allows business information associated with a number of web service requests and corresponding responses to be associated with application runtime data. For example, consider a number of requests received daily by a web service of a bank to open new user accounts. The integrated traffic monitoring and application runtime data may provide aggregated information regarding the content of the requests and responses and timing information (e.g., response times) for the transactions from the requesting users' point of view, as well as detailed information regarding the execution of the application such as information regarding application components which are invoked and timing information regarding how the requests were processed and the responses were generated. Generally, application runtime data can include information such as average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, application runtime data can identify a garbage collection heap size, a bandwidth metric indicating file and socket activity, a number of threads, system logs, exceptions, memory leaks and component interactions. The traffic monitoring data and application runtime data can be aggregated over many requests and responses to obtain valuable trend information without the need to save data for each specific request and response. However, traffic monitoring data and application runtime data for a specific request and response can be saved, e.g., if an anomalous condition is detected, to allow a detailed analysis of a specific request-response pair on an as-needed basis. The integrated data may be accessed through the traffic monitoring system, the application monitoring system or some other system, and/or provided to another system, device or program code for further processing.

Below, an architecture for a traffic monitoring system and application monitoring system is discussed generally and then in more detail with respect to FIGS. 1D-5. Operation of the monitoring systems is discussed with respect to FIGS. 6-11. Exemplary methods of integrating traffic monitoring data and application runtime data are discussed with respect to FIGS. 12A-13.

Figure 1D:
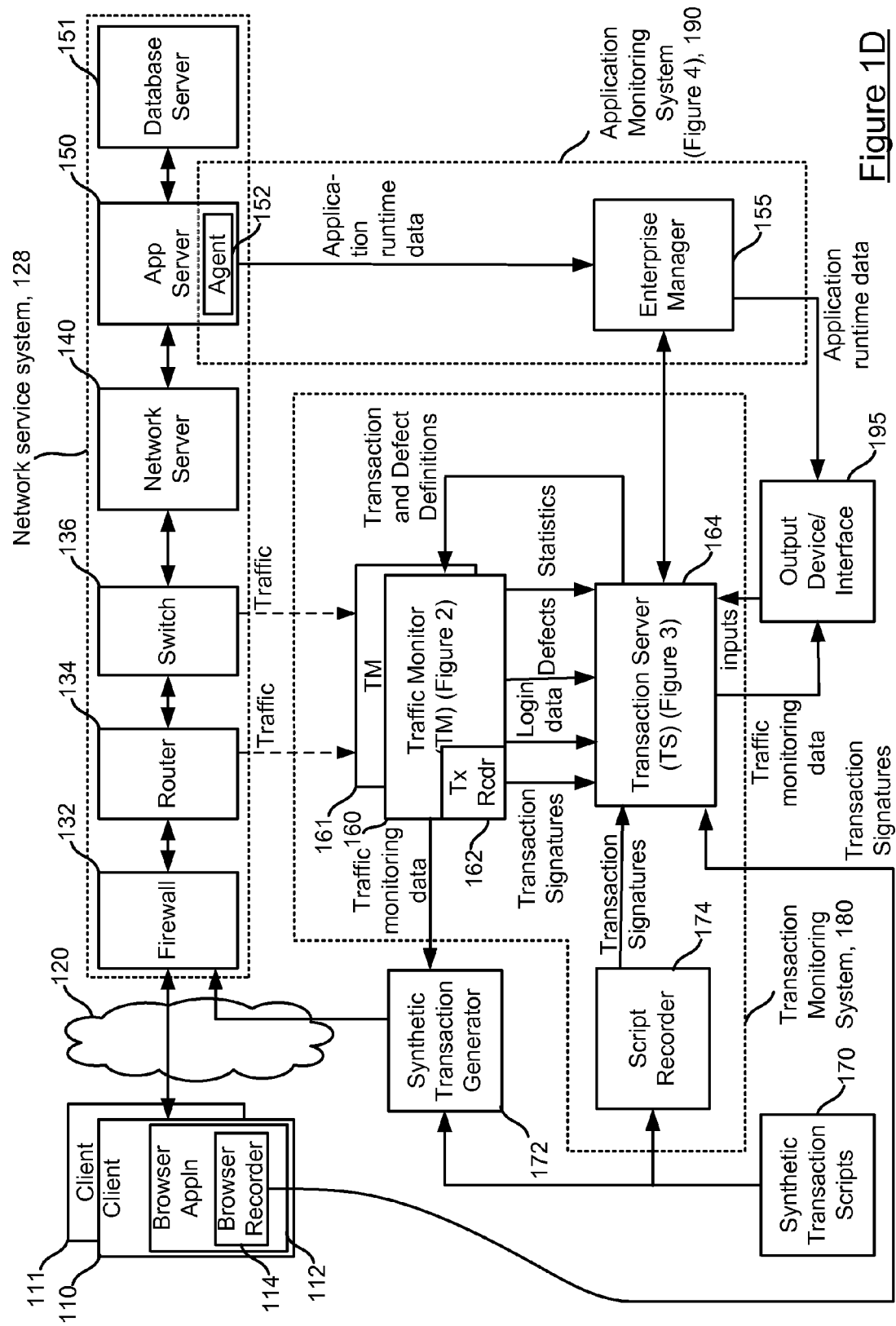
FIG. 1D is a block diagram of an embodiment of a system for monitoring a network service.

FIG. 1D is a block diagram of an embodiment of a system for monitoring a network service. A network service system 128, traffic monitoring system 180, and application monitoring system 190 are provided. The network service system 128 includes firewall 132, router 134, switch 136, network server 140, application server 150 and database server 151. Client 110 may send requests to and receive responses from the network service system over one or more networks such as network 120. Traffic monitoring system 180 collects data regarding network service system traffic and application monitoring system 190 collects data regarding execution of the application at the application server 150.

In the embodiment illustrated, client 110 includes browser application 112, which may be implemented, e.g., as a web browser or other network browser. In some embodiments, browser application 112 may include browser recorder 114 which records browser requests, headers and content data received from network server 140, translates the browser content data into transaction signatures, and transmits the signatures to transaction server 164. Transactions signatures and recorders are discussed in more detail below. In some embodiments, more than one client, as illustrated by additional client 111, may communicate with network server 140 to send traffic to and receive traffic from network server 140. In some embodiments, a client can be a server computer or other computer. In this case, requests need not originate from a browser or as a result of human interaction. In any case, the recorder 114 can record requests, headers and content for the client device.

Traffic sent over network 120 from client 110 may pass through firewall 132, router 134 and switch 136 before reaching network server 140, in one possible network topology. In practice, more complex or less complex topologies may be used. Firewall 132 may be implemented as a set of one or more related programs located on a network gateway server that protects the resources of the servers and devices inside a private network. Incoming traffic received by firewall 132 can be analyzed to determine if it is safe before it is sent toward network server 140.

Router 134 may be implemented as a device or software within a device and can be connected to more than one other device. Router 134 determines the next network point or device to which an information packet should be forwarded based on its understanding of the state of the network or networks to which it is connected. Switch 136 channels incoming data from any of multiple input ports to the specific output port that will take the data towards its intended destination, e.g., based on an Internet Protocol or IP address in each received packet.

Traffic sent by client 110 is received by network server 140 and may be processed by network server 140. Network server 140 may optionally send requests to one or more other servers to process the received traffic, such as application server 150, database server 151 or other backend servers (not illustrated in FIG. 1D). In response to a request received from browser application 112, network server 140 provides a response with web page content, for instance, to browser application 112. Network server 140 is in communication with client 110 (through devices 132-136) and with application server 150. Application server 150, which can include one or more application programs that provide business logic, for instance, is in communication with network server 140 and database server 151. Database server 151 is in communication with application server 150 and stores network service system information and other information for responding to client requests. The stored information is configured to be accessed, managed and updated by application server 150 and other devices and/or programs.

The network service system processes a request received from client 110 such as by sending the request to application server 150 which, in turn, generates a response and provides it to network server 140. In some cases, application server 150 may access database server 151 or some other backend server to process the request. Network server 140 transmits the response to the client 110 through switch 136, router 134, firewall 132 and network 120.

Traffic monitoring system 180 may monitor the traffic associated with the request and corresponding response at any desired location such as between client 110 and network server 140. Traffic monitoring system 180 includes traffic monitor (TM) 160, transaction server (TS) 164, script recorder 174, and browser recorder 114. In some embodiments, there may be more than one traffic monitor, as illustrated by additional traffic monitor 161. In one approach, each traffic monitor can monitor a different server, such as a web server or application server. Moreover, the monitoring duties may be divided among multiple monitors according to different ranges of network addresses. One or more traffic monitors may report information to transaction server 164. Thus, one transaction server may receive information from more than one traffic monitor, in one approach.

Traffic monitor 160 observes the traffic and can perform tasks such as determining whether portions of the traffic qualify as a defect, identifying user information in a transaction, and generating defects and statistics information. Traffic monitor 160 may observe the traffic at router 134, e.g., through a passive tap, at switch 136, e.g., via a mirror port, or some other point in the route traversed by the traffic. Traffic monitor 160 is described in more detail below with respect to FIG. 2.

Transaction server 164 receives login data, statistics and defects information from traffic monitor 160, receives transaction signatures from one or more recorders, generates transaction and defect definitions, provides the definitions to traffic monitor 160, and provides traffic monitoring data to an operator regarding the observed traffic. Transaction signatures provide information for transactions monitored by a particular recorder and are used by transaction server 164 to generate transaction definitions and defect definitions. Transaction server 164 provides the definitions to traffic monitor 160 for use in detecting transactions and determining whether they are defective. The transaction data may be provided to an operator through an output device/interface 195 to allow the operator to view reports with traffic monitoring data and application runtime data, generate and modify transaction and defect definitions, and perform other tasks. Transaction server 164 is discussed in more detail below with respect to FIG. 3.

The transaction signatures received by transaction server 164 can be sent by one or more transaction recorders. A transaction signature is a set of data that describes a particular transaction. In one embodiment, a transaction includes one or more request-response pairs. For example, a transaction may include a request by a client browser application for a login page from a web service system, and the corresponding response from the system that includes the login page content to be rendered by the client browser. The transaction signature that describes the transaction may include the request header data, request body data, the user data contained in the request, a request identifier, the source of the request, the recipient of the request, and corresponding information in the response (e.g., header, body, source of response, intended recipient).

An operator may use an interface to generate transaction definitions from transaction signatures, e.g., by viewing transaction signature data through the interface, modify the transaction signature data if desired, and selecting or "promoting" the transaction signature data to a transaction definition. The transaction definition may then be used to identify valid transactions in subsequently observed traffic. For example, assume a user "Bob" is logging on to a corporate intranet site to submit a form to the human resources department. Transaction definitions can be set which identify Bob's login transaction and the form submission transaction as two distinct transactions. Moreover, the promotion can also remove "Bob" as a specific user. Generating transaction definitions from transaction signatures is discussed in more detail below.

One or more recorders can be used to provide the transaction signatures by capturing transaction data (for example, a request observed at a client which generated the request or observed in network server system traffic), translating the transaction data into transaction signatures, and transmitting the signatures to transaction server 164. For example, a client request can be translated into a transaction signature by extracting identification parameters such as HTTP parameters (name/value pairs) from the request. Moreover, different types of recorders can be used, such as comprehensive recorders, standard recorders, and script recorders. A comprehensive recorder may be implemented on any machine, such as an administrator console or a machine which performs live transactions. For example, the transaction recorder (Tx Rcdr) 162 which is provided as part of the traffic monitor 160 may be considered to be a comprehensive recorder. A standard recorder may be implemented on the same machine which performs live transactions (such as within a browser). For example, the browser recorder 114 may be considered to be a standard recorder. Script recorders, such as script recorder 174, use pre-recorded network packet capture files and test script output files to create transaction signatures.

In one embodiment, transaction server 164 receives transaction signatures from browser recorder 114 within browser application 112, script recorder 174, and transaction recorder (Tx Rcdr) 162 within traffic monitor 160. Browser recorder 114 may be a standard recorder or a browser plug-in. The browser plug-in records a web page and page components as they are loaded into browser application 112. Browser recorder 114 then translates the page and page components into a transaction signature and transmits the transaction signature to transaction server 164. Transaction recorder 162 records transaction signatures from monitored traffic. Script recorder 174 may receive transaction scripts. A transaction script is a set of script commands that can be executed to perform one or more transactions at a client communicating with a network system. For example, a transaction script may include script commands to request a network service login page, and provide login user information in response to receiving the login page. In some embodiments, each script command may also include parameters and other data to complete each request. For example, a login request may include data for a user name and password. In some embodiments, the transaction scripts may be provided in a log file or some other script file. Script recorder 174 translates the transaction scripts into transaction signatures and transmits the signatures to transaction server 164. One example of a script recorder uses a script generated by "Mercury LoadRunner," software, available from Mercury Interactive Corporation, of Mountain View, Calif.

Transaction server 164 may also communicate and exchange information with Enterprise Manager 155 such as hierarchy information, statistics and defects information and other information, as discussed in more detail below.

Application monitoring system 190 may monitor execution of an application based on the traffic received by the application, generate application runtime data and process the generated data. As discussed above with respect to FIGS. 1A and 1C, application monitoring system 190 may include Enterprise Manager 155 and Agent 152 and is in communication with application server 150 and traffic monitoring system 180. Application monitoring system 190 is discussed in more detail below with respect to FIG. 4.

Output device/interface 195, which may include an on-screen interface, for instance, may receive traffic monitoring data from traffic monitoring system 180 and application runtime data from application monitoring system 190 for access by an operator. The interface 195 also allows the operator to provide inputs to the transaction server 164, e.g., to provide transaction definitions or other configuration settings.

Synthetic transaction generator 172 may generate synthetic transactions for network server 140, e.g., in response to receiving synthetic transaction scripts from synthetic transaction script module 170. The synthetic transaction scripts can also be received by script recorder 174, which records the scripts, translates the scripts into transaction signatures, and forwards the generated transaction signatures to transaction server 164. The synthetic transaction generator 172 may be provided as part of the traffic monitoring system or as a component that works with the traffic monitoring system and/or the application monitoring system. The synthetic transactions may be injected into the traffic received by network server 140. Generating synthetic transactions may begin with observing traffic for a network service, and determining the scope and frequency of the traffic, in particular, the scope of a network functionality tested by the observed traffic as well as the frequency with which the traffic scope is tested. Synthetic transactions may be generated to test network service functionality based on a comparison of actual traffic scope and/or frequency to target scope and/or frequency. For example, if a particular function of an application is not being tested frequently enough by the actual users of the network service, synthetic transactions can be generated to test the function. In some embodiments, the synthetic transactions may also be based on application runtime data which may be processed to determine the scope and frequency with which application components are tested by the observed network traffic.

Figure 2:
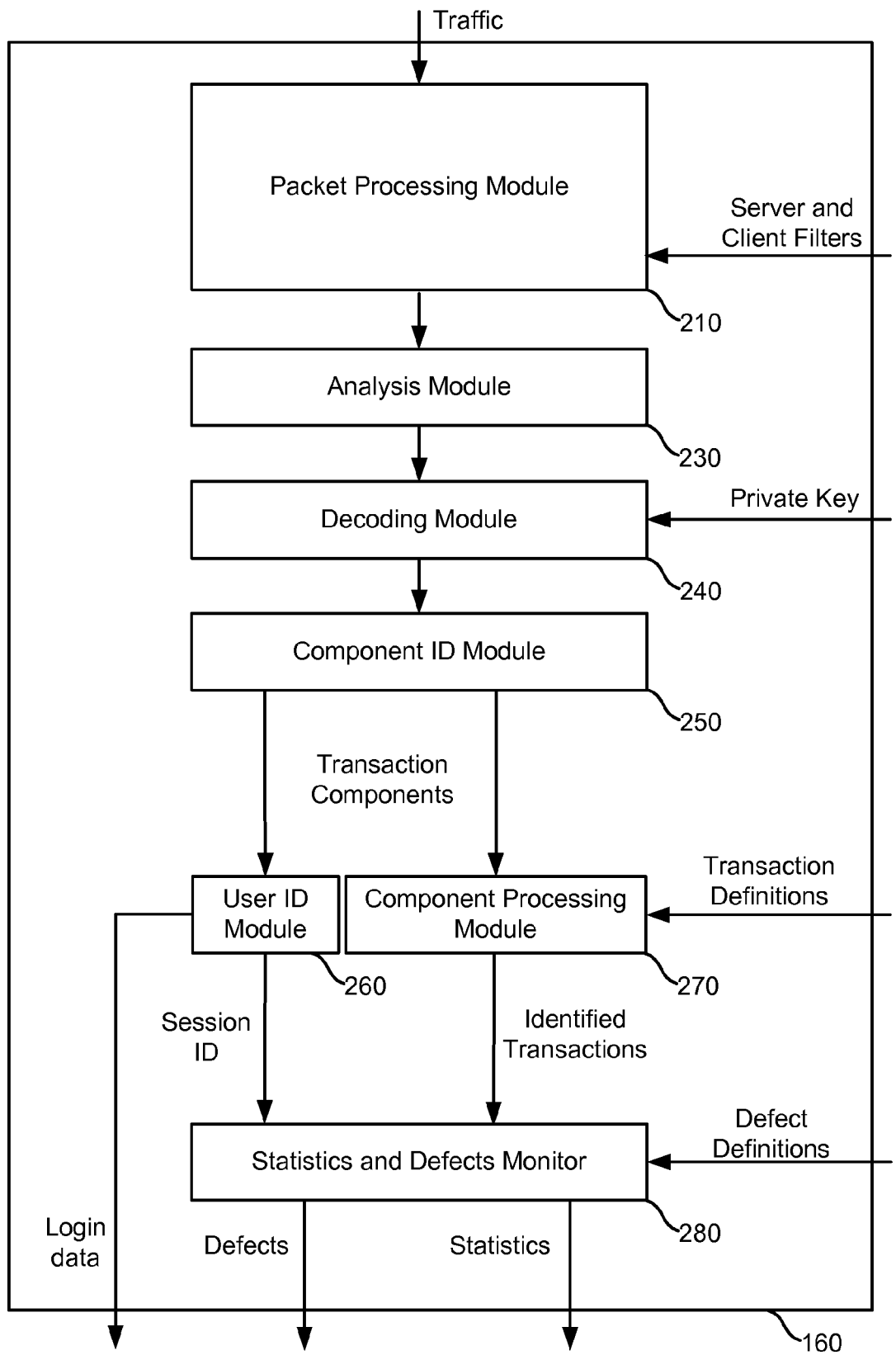
FIG. 2 is a block diagram of an embodiment of a system for processing network traffic.

FIG. 2 is a block diagram of an embodiment of a system for processing observed network traffic. In one embodiment, FIG. 2 provides detail of software modules for implementing the traffic monitor 160 of FIG. 1D. Operation of traffic monitor 160 is also discussed with respect to FIGS. 8 and 9.

As discussed above, traffic monitoring system 180 may be used to observe and process network traffic using any protocol, including but not limited to HTTP and HTTPS. Portions of the discussion below that reference HTTP and/or HTTPS, or any other protocol, are provided for purposes of example and should not be construed to limit application of the present technology.

Traffic monitor 160 includes packet processing module 210, analysis module 230, decoding module 240, component ID module 250, user ID module 260, component processing module 270 and statistics and defects monitor 280. Packet processing module 210 captures and filters traffic packets. In some embodiments, observing traffic may include receiving a copy of the traffic which is received by router 134, switch 136 or some other point in the path of traffic between client 110 and web server 140. In some embodiments, traffic may also be observed at a device existing between network server 140 and application server 150, or between application server 150 and database server 151. The observed traffic may be received as unordered packets of traffic provided according to HTTP, HTTPS or some other format. Packet processing module 210 may also receive one or more server and/or client filters for filtering the captured traffic as discussed in more detail below with respect to FIG. 8.

The analysis module 230 may reconstruct a data stream according to its format, e.g., TCP/IP, from filtered unordered packets received from packet processing module 210. The reconstructed data stream may include requests and responses. For example, request-response pairs can be detected in the data stream. A request-response pair can include a request provided by a client to an application and a corresponding response provided by the application to the client. For instance, the request can be a request for a component of a web page such as an image, a cascaded style sheet, or a JavaScript component.

Decoding module 240 decodes the reconstructed data stream provided by the analysis module when it is an encoded data stream. For example, a data stream may be encoded if it is generated from a stream of packets sent over a secure socket layer connection, e.g., using HTTPS or some other secure protocol. The decoding may be performed using a private key received or otherwise accessed by decoding module 240.

Component ID module 250 receives a reconstructed data stream from analysis module 230 (or decoding module 240 if the stream was encoded), identifies transaction components within the stream such as by identifying name/value pairs and provides the transaction components to a user ID module 260 and a component processing module 270. Further details regarding the component ID module 250 are provided below in connection with FIG. 8.

User identification (ID) module 260 receives the transaction components from component ID module 250 and identifies a session ID and/or user ID from the received components. In some embodiments, a user ID is derived from a login transaction as part of a business transaction. The user identification module 260 then provides the session ID and/or user ID to the statistics and defects monitor 280.

In one approach, a session identifier can be related to one or more transactions. For example, in a web application, the session ID is carried in the observed traffic as a cookie in every packet. The session ID in the packets related to the transaction may be related to the transaction itself. A single session identifier may be bound to one or more transactions. Session attributes, for example, session priority, may also be associated with transactions through this session-to-transaction binding mechanism.

Further, a user identity can be related to transactions. A user ID may be identified and associated with a session by examining and parsing a login transaction for user identity information, for example. In those cases where the login transaction possesses a session identifier, for example, this session ID may be used to establish a relationship between the user ID and the session ID, which may in turn share a relationship with one or more transactions. Another example of user to transaction binding is through the intermediary of a network address, for example where the IP source address of the packets related to the transaction is used to look up user identity in a table of IP address to user identity relationships. User attributes, for example, user priority, user location, user access rights, user organization, and/or user group, among other user attributes may be associated with sessions and/or transactions through this user-to-session binding mechanism and through the user-to-session-to-transaction binding mechanism. User attributes may be retrieved from an external system, for example, by using user identity information to look up user attributes in an X.500 directory, a LDAP directory, and/or a single sign-on system.

Component processing module 270 receives the transaction components from component ID module 250 and processes them to identify associated transactions using transaction definitions received from transaction server 164. A transaction can refer to a series of related network communications that perform a function. For example, the retrieval of a web page may involve one or more transactions. Moreover, a transaction definition may indicate that a particular transaction component is a "primary" component of a particular transaction. In some cases, this can be the first transaction component in a set of transaction components that make up a transaction. The presence of the primary component indicates the presence of the associated transaction. The other transaction components in the definition of a transaction can be considered to be secondary components. For example, if a transaction component within a transaction has a key/value pair indicating an action of "login," then the transaction is a login transaction. The secondary components are also part of the login transaction. The use of primary components to identify transactions can improve efficiency but is not necessary.

The received components are compared to the transaction definitions to identify transactions to be further processed by the traffic monitoring system. Transactions are selected to be processed further if the components conform to one or more of the transaction definitions. In one embodiment, the comparison determines if the received components have a URL which matches a URL in the transaction definitions. The components which match the transaction definitions are combined into transactions and provided to statistics and defects monitor 280 to be processed further. The components that do not match any transaction definitions can be discarded, ignored, identified as "not classified," or otherwise processed.

In addition to identifying transactions based on transaction components, component processing module 270 can identify a business transaction which includes a set of associated transactions. Generally, different logical constructs of a hierarchy can be identified from the transaction components. At higher levels of the hierarchy, a business process which refers to a series of related business transactions, and a domain which refers to a series of related business processes, can be defined using corresponding definitions. A business process can include a set of associated business transactions which have a common session identification, for instance. To illustrate, a business process class for buying a book from an e-commerce web site can be defined. This business process class can include classes of business transactions such as login, shopping, add to cart and checkout. A particular use of the login process, for instance, by a particular user at a particular time represents an example of an instance of the login business transaction. The login business transaction instance may include transaction component instances which provide a user identifier (user ID), a URL for a login page, and a session identifier (session ID). The component processing module provides the identified transactions to the statistics and defects monitor 280.

Further, multiple business process hierarchies may be built on top of a single business transaction/transaction/transaction component hierarchy. Also, users may be part of a user group hierarchy. Users groups may be part of a higher level user group hierarchy. Multiple user group hierarchies may be built on top of the user identification.

Statistics and defects monitor 280 receives session ID data from user ID module 260, identified transactions (transactions that match a transaction definition) from component processing module 270 and defect definitions from transaction server 164. In one embodiment, the defect definitions define criteria for determining whether the behavior of a transaction is acceptable. For example, a defect definition may indicate an acceptable response time for a component, error responses that are allowed or not allowed in response to a request, and other transaction data components required for a transaction. The identified transactions are analyzed based on the defect definitions to generate defects and statistics data. Generally, transactions are defective when they fail to meet quality standards. Moreover, the quality standards may be set for different levels of the hierarchy such as the business transaction, transaction or transaction component levels, for instance. Behavioral defects result from the behavior of a transaction failing to meet specifications. Slow transaction time, fast transaction time, low throughput, and incomplete transactions are examples of different types of behavioral defects. Response defects result from the response of a transaction failing to meet specifications. HTTP response codes (for example, HTTP 500-599 errors), unauthorized access, content analysis defects, and missing response defects are examples of different types of response defects.

The defect data indicates the number of defects found in the identified transactions over time, the type of defect and the number of defect transactions for each particular defect type. The defects may be reported per defective transaction with session identification information. In one embodiment, any identified transactions that conform to the defect definitions are designated as defects. Statistics data may include the number of transactions which occur, the type of transaction (for example, by URL), and other data. The statistics may be reported per hour, per transaction definition, per user and per session identification, for instance. Statistics and defects monitor 280 can report statistics and defect data for the identified transactions to transaction server 164.

Figure 3:
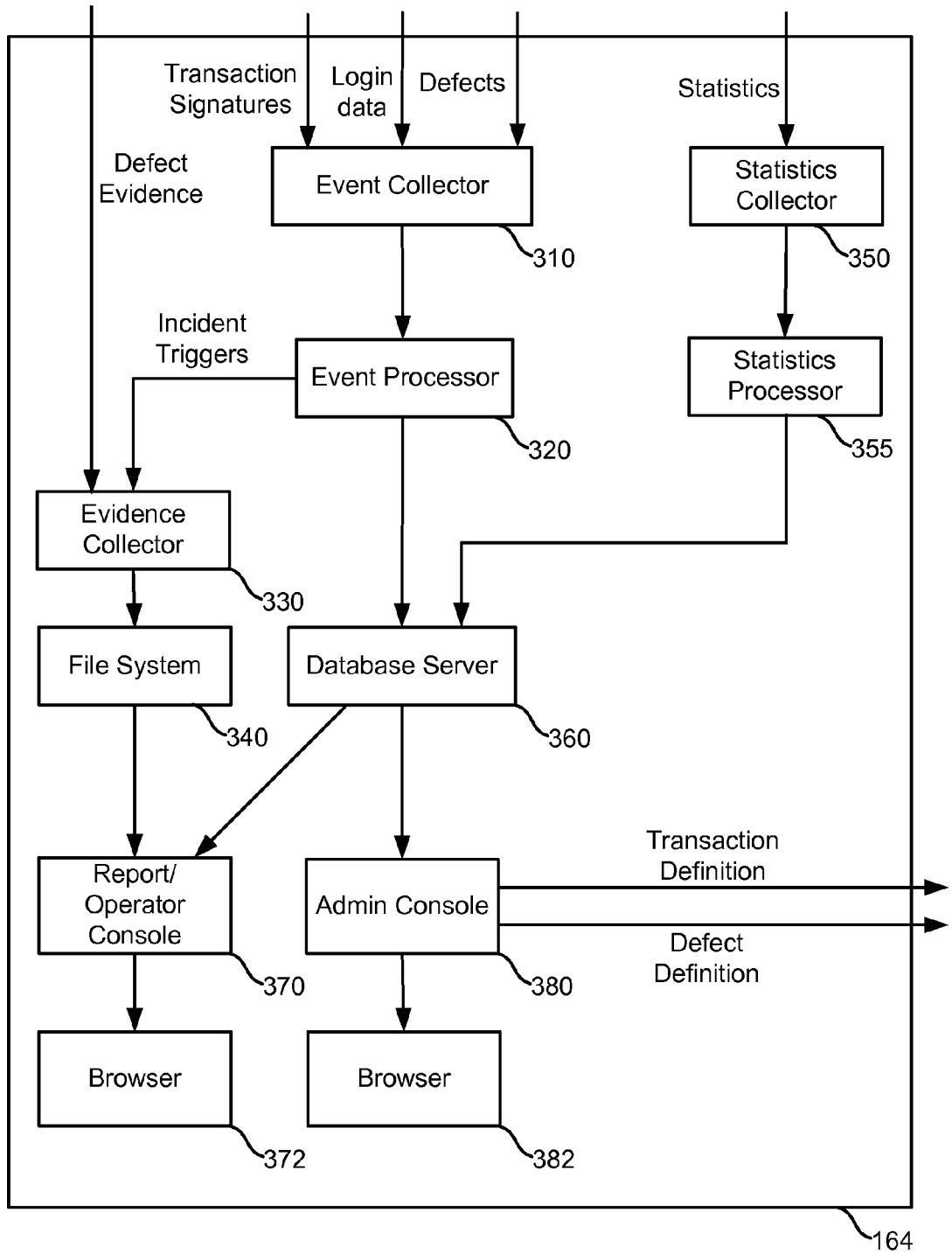
FIG. 3 is a block diagram of an embodiment of a system for receiving traffic information and generating traffic monitoring data.

FIG. 3 is a block diagram of an embodiment of a system for receiving transaction data and generating traffic monitoring data, e.g., transaction statistics, defect data, transaction definitions, and other data. In one embodiment, the system of FIG. 3 provides details regarding software modules for implementing transaction server 164 of FIG. 1D. Operation of transaction server 164 is discussed with respect to FIGS. 10A and 10B. Generally, transaction server 164 enables an operator to generate traffic classification logic, view traffic monitoring data reports, such as defect and incident reports, and provide transaction and defect definitions to traffic monitor 160.

Event collector 310, statistics collector 350, event processor 320, statistics processor 355, evidence collector 330, file system 340, database server 360, report/operator console 370, admin console 380, and browsers 372 and 382 are provided. Event collector 310 receives data including transaction signatures from recorders 114, 162, and 174 (FIG. 1D) and login data and defects from traffic monitor 160 as discussed above with respect to FIG. 2, and translates the received data into a format that can be processed by event processor 320. In one embodiment, event collector 310 generates objects, such as Java objects, from the received data and provides the objects to event processor 320. Event processor 320 processes the objects to provide database data to be stored at database server 360. In some embodiments, database server 360 may be implemented as an SQL database server. In one possible approach, the Java Database Connectivity (JDBC) API can be used for this purpose. JDBC enables Java programs to execute SQL statements to allow Java programs to interact with an SQL-compliant database.

Similarly, statistics collector 350 receives statistics data from traffic monitor 160, translates the received data into one or more objects, such as Java objects, and provides the generated objects to statistics processor 355. Statistics processor 355 processes the objects to provide database data to be stored at database server 360, again such as by using JDBC.

Event processor 320 may also generate incident triggers for use by evidence collector 330. An incident can be set when one or more related defects are set. An incident may be a cause for concern which should be analyzed further. An incident trigger is an event that informs evidence collector 330 when to collect evidence associated with defects. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may set an incident. In response to receipt of incident triggers, evidence collector 330 gathers evidence regarding defects and/or incidents and provides the evidence to file system 340. The evidence gathered can be any form of unstructured data collected from various resources (e.g., switches, routers, load balancers, web servers, application servers, database servers, etc.) Evidence collector 330 places gathered evidence into persistent storage. For example, in one possible approach, the evidence is placed in an evidence file (for example, in HTML format) and stored at the file system 340. For example, when a number of "slow transaction" defects trigger the business impact threshold of an incident, an evidence collection trigger can be sent from event processor 320 to evidence collector 330. Evidence collector 330 can execute any executable program, including scripts, to collect any form of evidence, for example, a script (Unix shell, Python, Perl, etc.) to retrieve a web log from the server performing the slow transaction and execute a Simple Network Management Protocol (SNMP) GET command on a router. The script then appends the content of the web log and the results of the SNMP query into a single evidence file. In some cases, the script may also reformat the content of the evidence file in a format for providing a display in a web browser such as by inserting various HTML tags into the evidence file.

A persistent store such as database server 360 may store transaction data and other data, e.g., based on data received from processors 320 and 355, for access by an operator user through operator console 370 and admin console 380 of transaction server 164. Note that the admin console 380 and the operator console can optionally be provided in the same console. Operator console 370 may be used to access and perform operations on data at the database server 360. Admin console 380 may provide an interface through browser 382 to allow an operator to view reports, define transaction and defect definitions from received transaction signatures and perform other tasks. Defining a transaction definition and defect definition is discussed in more detail below.

Figure 4:
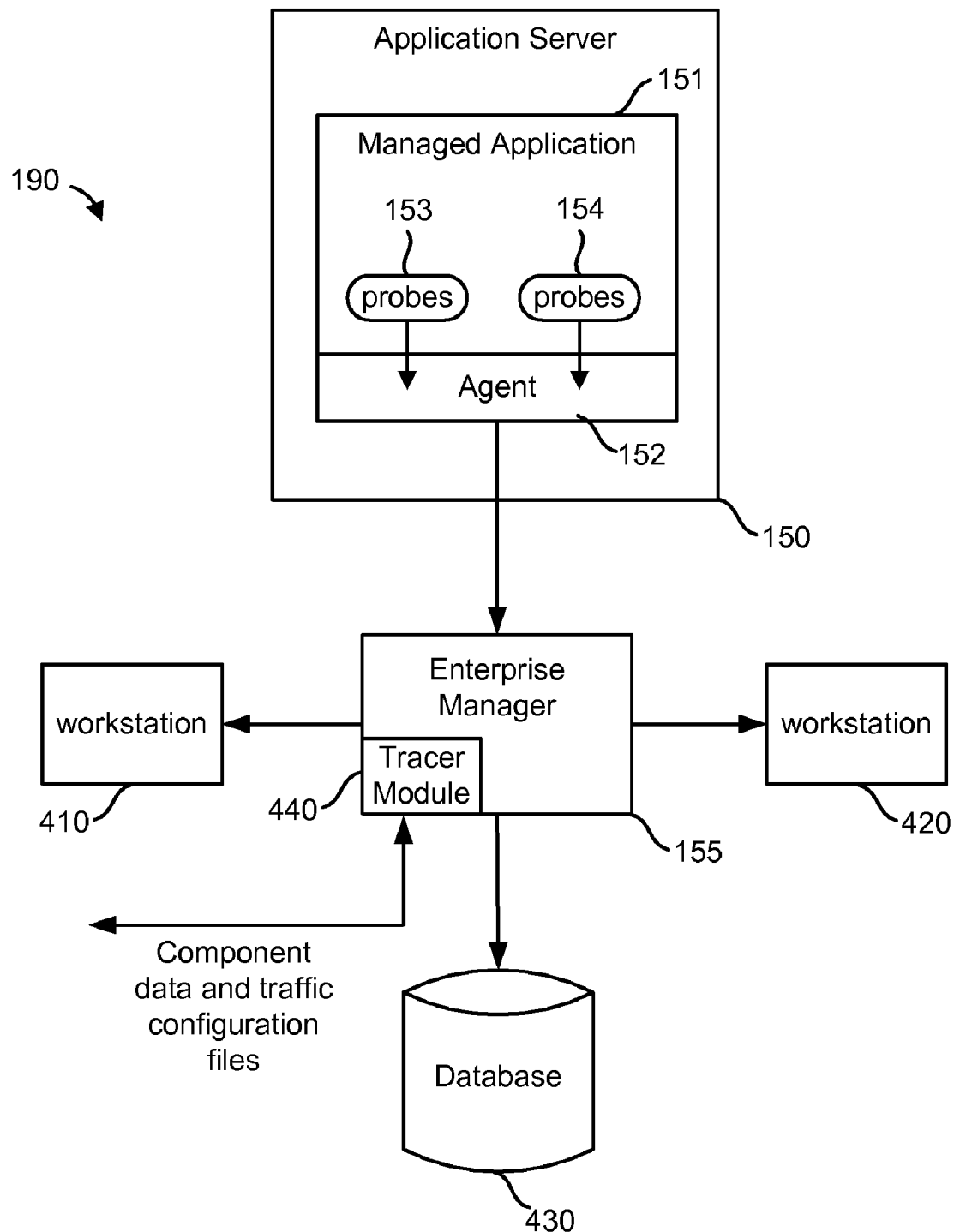
FIG. 4 is a block diagram of an embodiment of a system for monitoring an application.

FIG. 4 is a block diagram of an embodiment of a system for monitoring an application. As discussed above with respect to FIG. 1A, the application monitoring system 190 may be used to monitor an application and generate application runtime data. In one embodiment, FIG. 4 provides more detail for application server 150 and Enterprise Manager 155 of FIG. 1D. The system includes application server 150 which is in communication with Enterprise Manager 155 which, in turn, is in communication with example workstations 410 and 420 and database 430. Application server 150 includes managed application 151, which includes agent 152 and example probes 153 and 154. Application 151 can be a Java application or a different type of application.

Behavior of the application 151 can be monitored by instrumenting bytecode or intermediate language (IL) code of the application, by plugging into an exit built into the application or network server, or by any other monitoring technique. For example, information from the application 151 can also be obtained using probes 153 and 154. In practice, many such probes can be used to obtain information regarding different components of the application.

In one embodiment, a probe builder (not pictured) instruments (e.g. modifies) bytecode for application 151 to add the probes 153 and 154 and additional code. In another approach, developers add probes to the application source code. The probes may measure specific pieces of information regarding the application without changing the application's business logic. The probe builder may also add agent 152 which may be installed on the same machine as application 151 or a separate machine. Once the probes have been installed in the application, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety. See also FIG. 11.

As managed application 151 runs, probes 153 and 154 send data to agent 152. In one embodiment, probes 153 and 154 may be implemented in objects and other code that write data, change data or otherwise cause the state of an application server to change. Agent 152 then collects, summarizes and sends the data, referred to as application runtime data, to Enterprise Manager 155. In response, Enterprise Manager 155 runs requested calculations, makes application runtime data available to workstations 230 and 240 and, optionally, sends the application runtime data to database 430 for later analysis. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Workstations 410 and 420 provide a graphical interface for viewing application runtime data such as by creating custom views which can be monitored by a human operator. The workstations can include windows which provide a set of customizable views and depict alerts and calculators that filter application runtime data so that the data can be viewed in a meaningful way. The elements of the workstation that organize, manipulate, filter and display application runtime data can include actions, alerts, calculators, dashboards, persistent collections, metric groupings, comparisons, smart triggers and SNMP collections.

In one embodiment of the system of FIG. 4, one or more components are running on different computing devices. Alternatively, the components can run on the same computing device. A computing device on which each component may run is discussed in more detail below with respect to FIG. 5.

Enterprise manager 155 may also include tracer module 440 which may receive a hierarchy rules engine from transaction server 164 of FIG. 1D. In another approach, the tracer module 440 receives a configuration file which it parses to obtain the rules engine. In either case, the rules engine can be used to classify the application performance data according to different levels of the hierarchy. In one embodiment, the configuration file may include transaction server module identification, the date and time that the configuration file was created, application defect information, parameter defect lists and information regarding a domain, business processes associated with the domain, business transactions associated with the business processes, transactions associated with the business transactions and transaction components for each transaction. Further, for each of the business transactions, transactions and transaction components, defect definitions may be specified. Processing using a hierarchy is discussed in more detail below.

Figure 5:
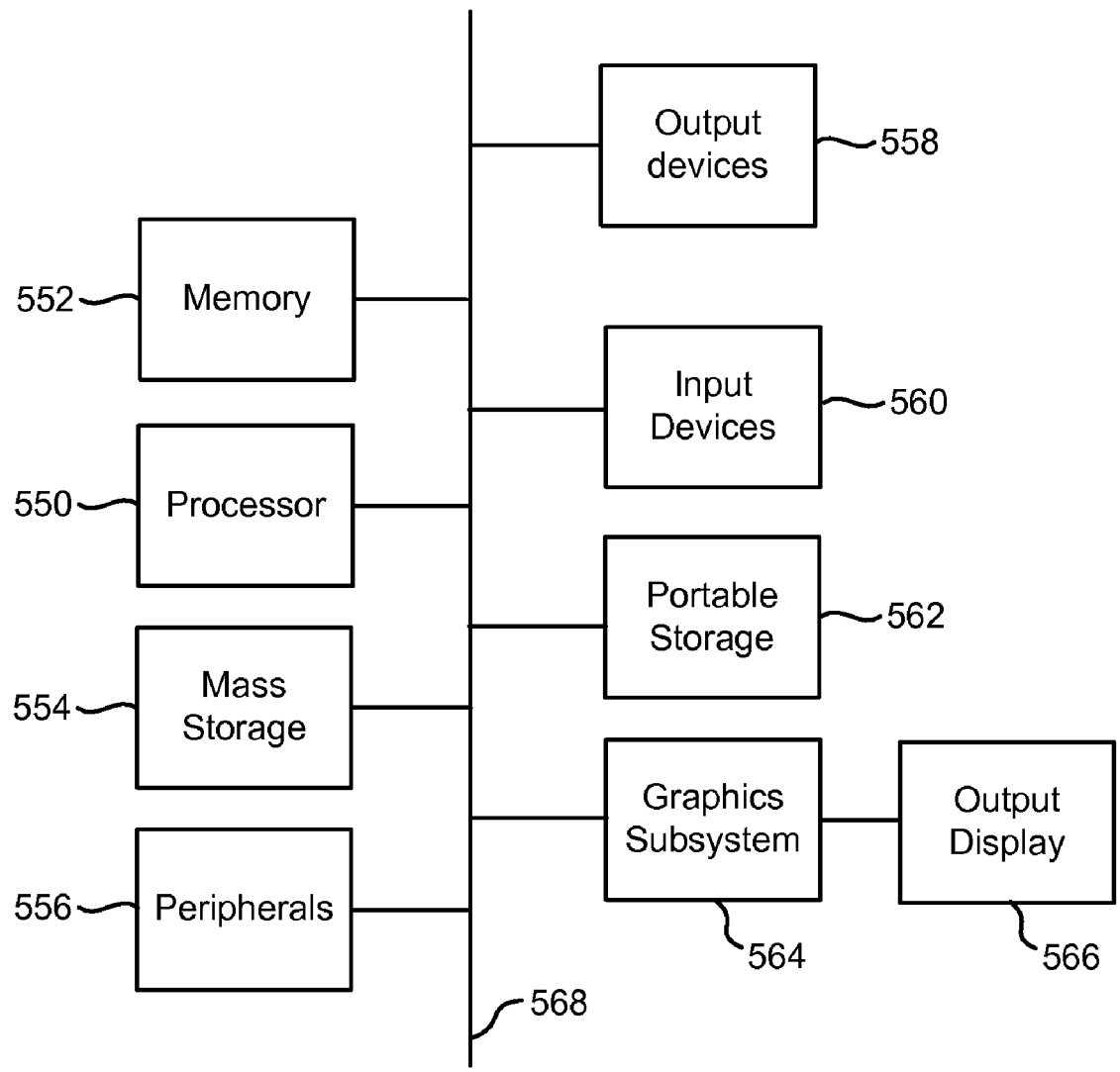
FIG. 5 is a block diagram of an embodiment of a computing system.

FIG. 5 is a block diagram of an embodiment of a computing system for use with the present technology. In one embodiment, the computing system may be used to implement client device 110, any of firewall 132, router 134 and switch 136 on one or more machines, network server 140, application server 150, database server 151, Enterprise Manager 150, workstations 410 and 420, database 430, traffic monitor 160, transaction server 164, synthetic transaction generator 172, script recorder 174 and synthetic transaction script module 170.

The computer system includes one or more processors 550 and main memory 552 which stores, in part, instructions and data for execution by processor unit 550. If the system of the present invention is wholly or partially implemented in software, main memory 552 can store the executable code when in operation. Also provided are a mass storage device 554, peripheral device(s) 556, user input device(s) 560, output devices 558, portable storage medium drive(s) 562, a graphics subsystem 564 and an output display 566. For simplicity, the components are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 564 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device 554 stores the system software for implementing the present invention for purposes of loading to main memory 552.

Portable storage medium drive 562 operates with a portable non-volatile storage medium, such as a floppy disk, to input and output data and code to and from the computer system. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to output display 566. Additionally, the computer system includes output devices 558. Examples of suitable output devices include speakers, printers, network interfaces, monitors, etc.

The components contained in the computer system are those typically found in computer systems suitable for use with the present invention, and are intended to represent a broad category of such computer components that are well known in the art. Thus, the computer system can be a personal computer, hand held computing device, telephone, mobile computing device, workstation, server, minicomputer, mainframe computer, or any other computing device. The computer system can also include different bus configurations, networked platforms, multi-processor platforms, etc. Various operating systems can be used including Unix, Linux, Windows, Macintosh OS, Palm OS, and other suitable operating systems.

Figure 6:
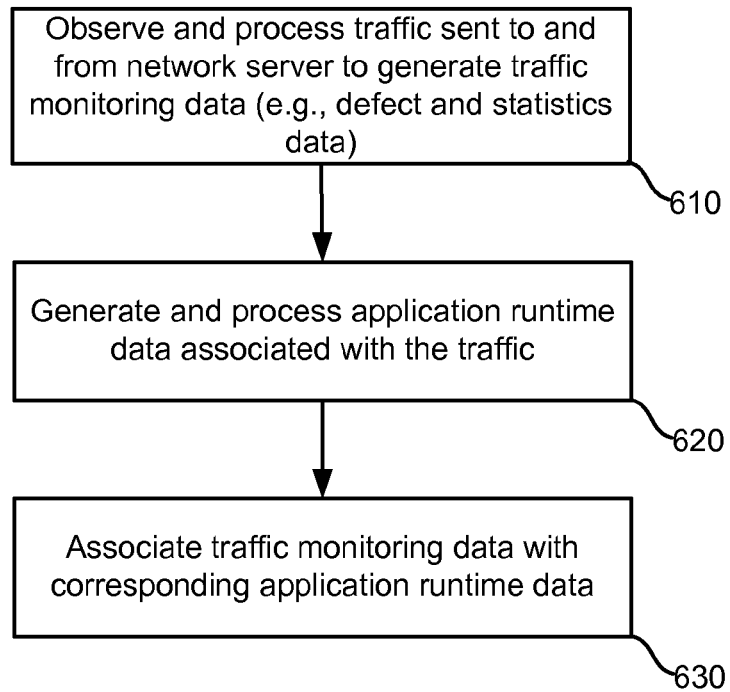
FIG. 6 is a flowchart of an embodiment of a process for monitoring a network service.

FIG. 6 is a flowchart of an embodiment of a process for monitoring a network service. The process can be performed by traffic monitoring system 180 and application monitoring system 190 of FIG. 1. The process begins with the traffic monitoring system observing and processing traffic sent to and from network server 140 to generate traffic monitoring data such as defects and statistics data, at step 610. In one embodiment, traffic may be received by a device in the line of communication between client 110 and network server 140. The device which receives the traffic sends a copy of the traffic to traffic monitoring system 180 while also forwarding the traffic to its intended destination. In particular, the traffic is received and processed by traffic monitor 160 and further processed by transaction server 164 of FIG. 1, e.g., to translate the traffic into transaction components, identify transactions from the transaction components, obtain statistics and defect data from the identified transactions, store transaction data and report information regarding the stored transaction data. Observing and processing traffic in step 610 is discussed in more detail below with respect to FIG. 7.

Application runtime data associated with the observed traffic is generated and processed by the application monitoring system at step 620. For example, the application may execute to handle a request from a network server to retrieve data from a database by sending a request to the database for the requested data, receiving the data in a response from the database, and sending the requested data to the network server in a response. For each of these actions performed by the application while processing the request, application runtime data can be generated, e.g., by the agent 152, and sent to Enterprise Manager 155 for processing. Step 620 is discussed in more detail below with respect to FIG. 11.

Traffic monitoring data can be associated with corresponding application runtime data at step 630. This can be achieved in different ways. For example, an identifier may be assigned by the application monitoring system to a request-response pair of a transaction component and provided to the traffic monitoring system in the response. Moreover, in some embodiments, the traffic monitoring system and the application monitoring system may use the same or similar classification rules for classifying transactions according to a hierarchy. In some embodiments, traffic monitoring data may be integrated with the application runtime data and viewed through an output device. Providing application runtime data associated with traffic monitoring data to an operator is discussed in more detail below, e.g., with respect to FIGS. 12A-13.

Figure 7:
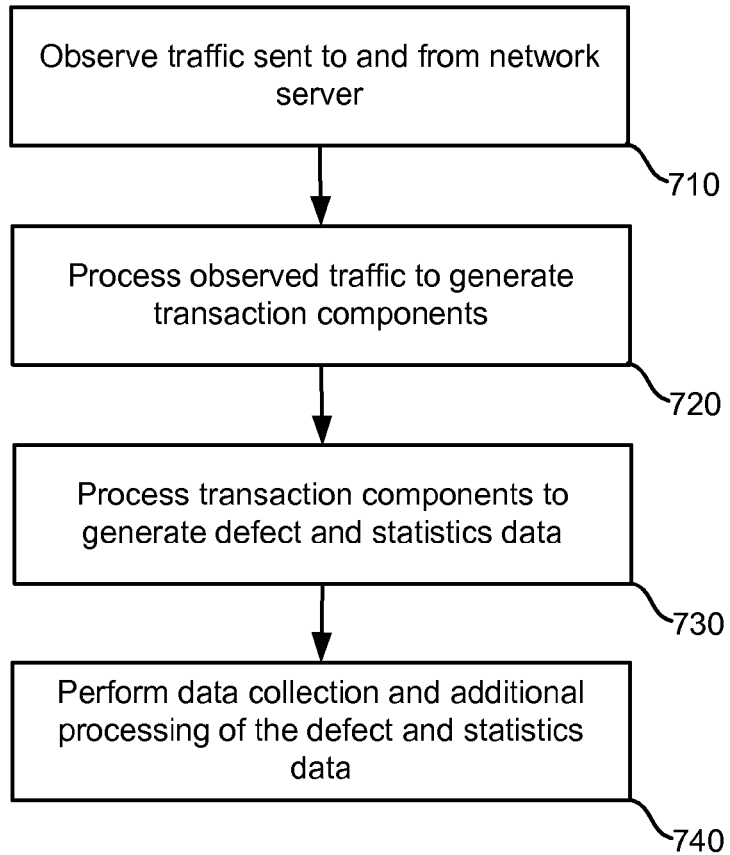
FIG. 7 is a flowchart of an embodiment of a process for observing and processing network server traffic.

FIG. 7 is a flowchart of an embodiment of a process for capturing and processing network service system traffic. In one embodiment, the flowchart provides more detail for step 610 of FIG. 6 performed by traffic monitoring system 180. First, traffic sent to and from network server 140 is observed at step 710, e.g., by receiving the traffic at router 134, switch 136 or some other point between firewall 132 and network server 140. The device which receives the traffic can provide a copy of the traffic to traffic monitoring system 180, enabling system 180 to observe the traffic. In another approach, observing the traffic can include intercepting the traffic and forwarding it to its intended destination.

The traffic monitor 160 processes the observed traffic to generate transaction components at step 720. Referring also to the discussion regarding FIG. 2, this processing may include constructing a data stream from data packets of the observed traffic, determining request-response pairs that form transaction components, and grouping the transaction components into classifications such as transactions, business transactions, business processes and a domain. This processing is discussed in more detail below with respect to FIG. 8.

Traffic monitor 160 processes the transaction components to generate defect and statistics data at step 730. In one embodiment, this involves processing transaction components to identify valid transactions using received transaction definitions, determining defect and statistics data from the valid transactions and defect definitions, and providing the defect and statistics data for further processing, storage and reporting. This processing is discussed in more detail below with respect to FIG. 9.

Transaction server 164 performs data collection and additional processing on the defects and statistics data at step 740. In one embodiment, data collection includes translating the defects and statistics data into a format which can be stored in a database, storing the data and reporting the data. The additional processing may include generating transaction and defect definitions from transaction signature data received from one or more recorders and providing the definitions to traffic monitor 160. Performing data collection and additional processing is discussed in more detail below with respect to FIG. 10A.

Figure 8:
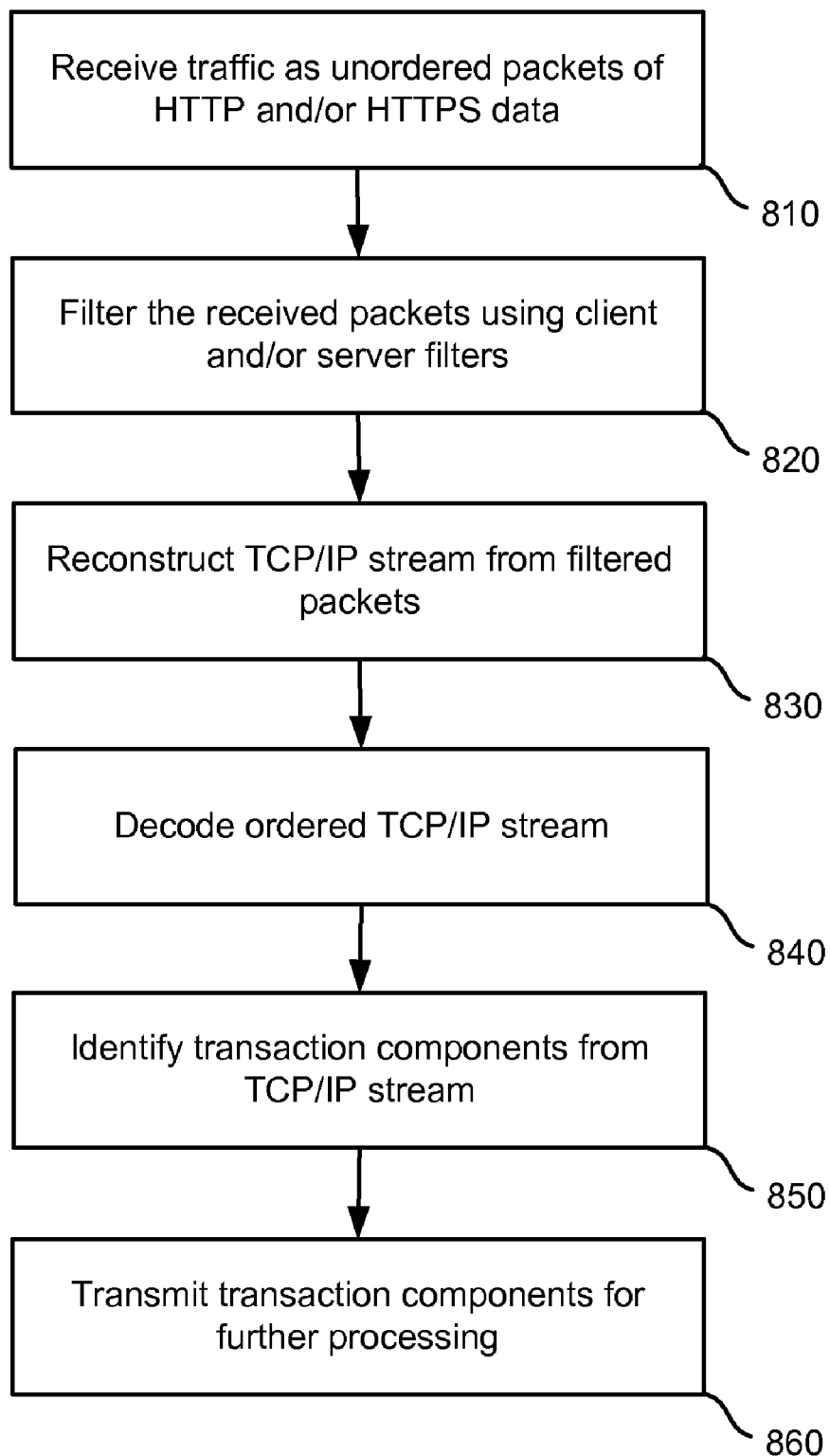
FIG. 8 is a flowchart of an embodiment of a process for obtaining transaction components from observed traffic.

FIG. 8 is a flowchart of an embodiment of a process for obtaining transaction components from observed traffic. In one embodiment, the process provides more detail for step 720 of the process of FIG. 7 and can be implemented by modules 210-250 of transaction server 160 of FIG. 2. At step 810, traffic is received, e.g., in the form of unordered packets of data provided in an HTTP and/or HTTPS format or some other network data transport format.

The unordered packets are filtered at step 820, e.g., via packet processing module 210 using filter data received from the transaction server 164. The filter data can apply to the client 110, network server 140 and/or application server 150. In one embodiment, the filtering achieves load-balancing of large packet streams across multiple traffic monitors. For example, if three traffic monitors process a large packet stream, each traffic monitor may be configured to process one third of the stream. The traffic monitors may be configured by a client or server filter file that instructs each monitor as to what range of traffic to process. The packet filtering can involve determining which traffic should be captured and processed and which packets should be discarded or ignored or otherwise processed differently.

Filtering may be performed based on client and/or server filters received by traffic monitor 160. The client and server filters may include one or more IP address ranges, for instance, which indicate which packets to process and/or which packets not to process for a particular traffic monitor. Thus, if an observed traffic packet has an IP address which is not within a corresponding IP address range of a corresponding filter, the traffic packet is not processed. The client filter file may enable filtering based on client IP address ranges. A server filter file may enable filtering on server IP address ranges. Filtering can also be based on IP-Address:TCP-Port combinations in addition to just IP-Address, or any other form of filtering. If no filter file is received and no client filters are specified for a traffic monitor module, the particular traffic monitor does not perform client filtering of incoming traffic packets. When one or more client filters are specified, any captured packet that does not match at least one of the client filters can be discarded. For example, a packet matches a filter if either its source or destination address is greater than or equal to the <FromIp> address of a client filter and less than or equal to the <ToIp> address of the same filter. In some embodiments, the packet source and/or destination address, client filter <FromIp> address and client filter <ToIp> address are 32-bit numbers.

After filtering the packets, a TCP/IP stream, for instance, is reconstructed from the filtered packets at step 830. The TCP/IP stream can be generated by analysis module 230 of traffic monitor 160 of FIG. 2 such as by generating requests and responses in a network protocol format (e.g., for HTTP format, the requests and responses have a header and data portion) from the received traffic packets. The generated TCP/IP stream is then decoded, if necessary, at step 840 by decoding module 240 of traffic monitor 160 (FIG. 2). In one embodiment, decoding module 240 decodes an encrypted ordered TCP/IP stream using a private key which is obtained from network server 140 or other source by traffic monitor 160 to provide a decoded TCP/IP stream to component ID module 250.

After decoding the stream, transaction components are identified from the TCP/IP stream at step 850 by component ID module 250. As discussed above, a transaction component can include a portion of a content page provided as a response to a request. In this case, component ID module 250 parses requests in the decoded TCP/IP stream to generate transaction components. For example, each request may be parsed to determine query, cookie, post, URL and session type name/value pairs. For example, a typical HTTP post request which can be parsed by traffic monitor 160 is shown below.

```
Request-line:   POST /dir/file.html?query1=q1&query2=q2 HTTP/1.1\r\n
request-headers: Content-type: application/x-www-form-urlencoded\r\n
          Host: www.company.com\r\n
          Cookie: cookie1=c1; cookie2=c2\r\n
          Referer:
               https://www.company.com/dir/home.html?action=login\r\n\r\n
request-body:   post1=p1&post2=p2
```

An example of an HTTP parameter list derived from parsing the above request is shown below. Each parameter includes a type and name/value pair.

```
type="Query," name="query1",  value="q1"
type="Query," name="query2",  value="q2"
type="Cookie," name="cookie1", value="c1"
type="Cookie," name="cookie2", value="c2"
type="Post," name="post1",   value="p1"
type="Post," name="post2",   value="p2"
type="Url," name="Host",    value="www.company.com"
type="Url," name="Path",    value="/dir/file.html"
type="Url,"
name="Url",
value="www.company.com/dir/file.html?query1=q1&query2=q2"
type="Url," name=
"Referer",value="www.company.com/dir/home.html?action=login"
```

The parameter list data is retrieved from the request listed above. In particular, the parameter list query data can be retrieved from the request-line of the request, the cookie data can be retrieved from the request headers, the post data can be retrieved from the request body, and the URL data can be retrieved from the request header and request line.

Identifying components at step 850 may include identifying primary and secondary components. As discussed above, a request can be processed to identify transaction components by comparing parameters in the request to parameters in a transaction definition. If the request includes a primary transaction component, the request can be categorized directly according to the transaction with which the primary transaction component is associated. A primary transaction component and associated secondary components can be identified by their use of the same session ID in one possible approach. In some embodiments, a primary component may be identified as the first component to have a particular session ID. In some embodiments, a primary component is a component having a "content type" value that starts with "text." If no primary transaction component is used, the request can be categorized according to a transaction definition which is met by a set of one or more transaction components of the request. Further, the request-response pair can be categorized according to the request, in one possible approach. The transaction components are transmitted by component ID module 250 to user ID module 260 and component processing module 270 of traffic monitor 160 for further processing at step 860.

Figure 9:
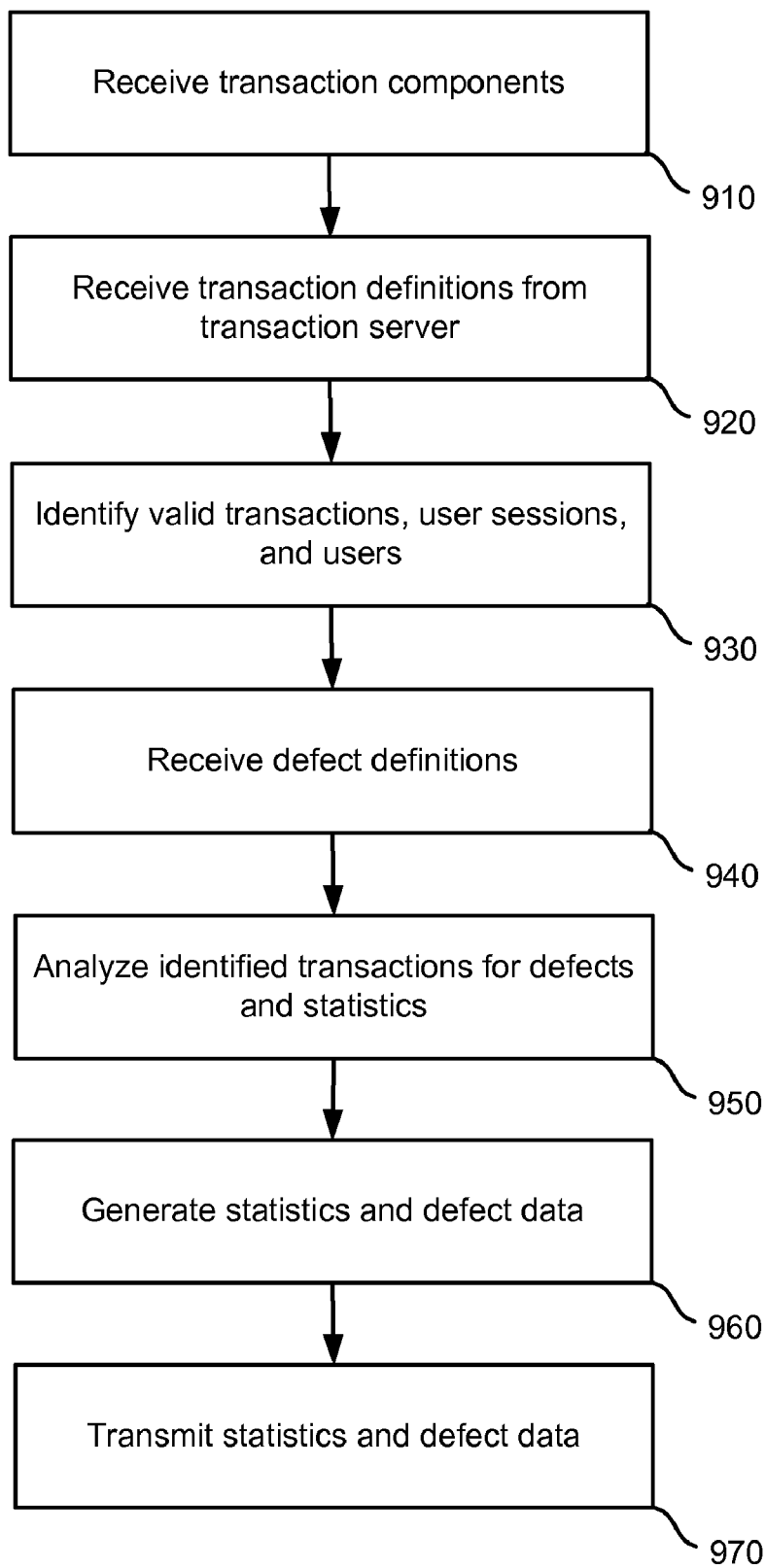
FIG. 9 is a flowchart of an embodiment of a process for processing transaction components from observed traffic.

FIG. 9 is a flowchart of an embodiment of a process for processing transaction components. In one embodiment, the flowchart of FIG. 9 provides more detail for step 730 of FIG. 7 and is implemented by modules 260-280 of traffic monitor 160 of FIG. 2. First, transaction components are received at step 910, e.g., including primary components and secondary components.

Transaction definitions are received by module 270 from transaction server 164 at step 920. The transaction definitions are generated by transaction server 164 from user input and/or transaction signatures received by transaction server 164 to describe templates that the traffic monitoring system should use in detecting patterns in the traffic. In one embodiment, recorders capture transaction data, generate transaction signatures from the transaction data and provide the signatures to transaction server 164. An operator may view the transaction signatures, modify them if desired, and select them to become transaction definitions. The transaction definitions may include HTTP parameter definitions, for instance, such as type, name and specification parameters. The type contained in the HTTP parameter definitions may include a query, cookie post, URL or session manager type. An HTTP parameter definition of a transaction name may be "user login" or any other name provided by an operator. The specification parameters may indicate a URL associated with the transaction, user identification, client machine identification, server machine identification, and other parameters associated with the particular transaction. Generation of transaction definitions from transaction signatures is discussed in more detail below with respect to steps 1050-1060 of FIG. 10B.

After receiving transaction definitions, traffic monitor 160 identifies valid transactions, user sessions and users at step 930. In one embodiment, a user name associated with a user session is detected by user ID module 260. The user name may include a login name for a user and can be included in the first request-response pair associated with a session. Once the login name or user name is identified, the login name and corresponding session ID (included in every request and response pair) is forwarded as login data to transaction server 164. User ID module 260 then forwards the session identification data to statistics and defects monitor 280.

Component processing module 270 identifies valid transactions by comparing the transaction definitions to the transaction components. In some embodiments, component processing module 270 may compare a URL of a transaction component with the transaction definitions. In some embodiments, component processing module 270 may also compare user identification, client machine identification, and other information of the transaction components to the transaction definitions. If the data contained in the transactions components does not match any transaction definition, the transaction component can be discarded, ignored, identified as "unclassified" or otherwise processed.

Defect definitions are received from transaction server 164 by traffic monitor 160 at step 940. At step 950, identified transactions are monitored for defects and statistics. Step 950 may be performed by statistics and defects monitor 280 of the system of FIG. 2. For example, valid transactions can be compared to the defect definitions to determine if any of the transactions are defective. Defect definitions may specify what comprises a defect and/or an acceptable transaction. In any case, transactions identified as defective are identified at step 950. For example, the defect definitions may specify that a transaction having a particular URL should not have a response time over a particular response time threshold. Thus, for all transactions having the particular URL and having a response time over the response time threshold, the transaction is identified as defective. A defective transaction is a transaction with one or more defects.

Statistics and defect data are then generated from the identified transactions at step 960 by statistics and defects monitor

280. Statistics may include, e.g., response time, count of completed transactions, count of uncompleted transactions, and other statistics for one or more transactions. Defect data may include defect and incident information, count information such as the number of times a particular defect has occurred and other data associated with transactions identified as being defective. The statistics and defect data is transmitted to transaction server 164 at step 970. In some embodiments, the defect data may be in XML format and the statistics data may be in binary format.

Figure 10A:
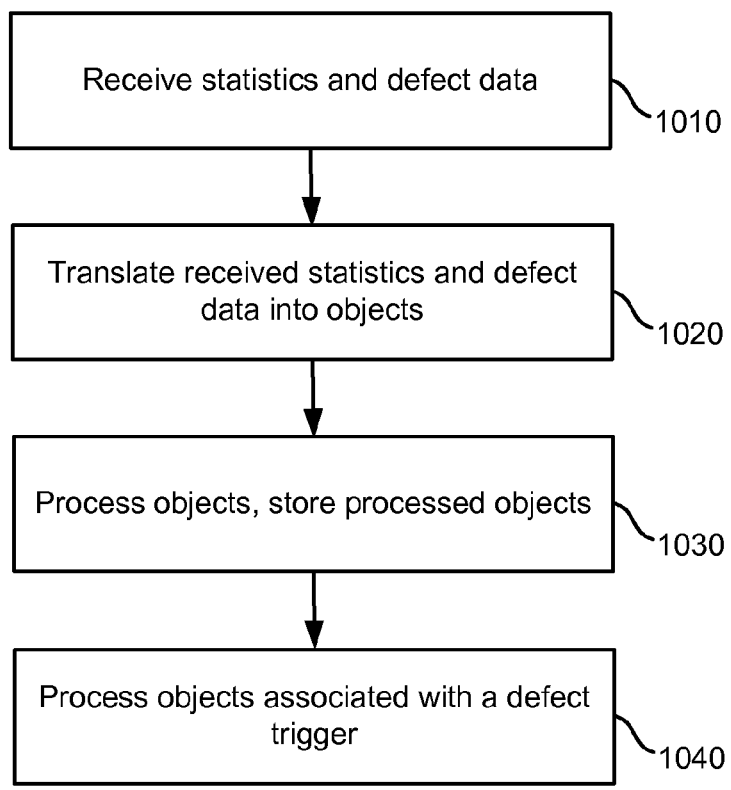
FIG. 10A is a flowchart of an embodiment of a process for performing data collection.

FIG. 10A illustrates a flowchart of an embodiment of a process for performing data collection. In one embodiment, the flowchart provides more detail for step 740 of the flowchart of FIG. 7 and is performed by transaction server 164. At step 1010, statistics and defect data are received by transaction server 164 from traffic monitor 160. In one embodiment, the statistics data is provided for one or more transactions based on the transaction URL. In some embodiments, the defects and statistics may be received by event collector 130 and statistics collector 350, respectively (FIG. 3).

The statistics and defect data are translated into a persistent storage state and stored, e.g., in an SQL database. In this embodiment, the statistics and defect data are first translated into objects such as Java objects at step 1020. The translation may be performed by collectors 310 and 350, as illustrated in FIG. 3. Statistics collector 350 receives statistics data, e.g., in a binary format, from traffic monitor 160, translates the received data into objects and provides the objects to statistics processor 355.

The objects are processed and stored at step 1030 by event processor 320. In one embodiment, storing the objects includes retrieving login data from the objects and storing the login data as a session ID and user name pair.

Next, the objects associated with a defect trigger are processed at step 1040. In some embodiments, the objects are processed to determine whether a defect is new or matches pre-existing defect criteria. In this embodiment, if a defect does not match pre-existing defect criteria, a new defect is created. Handling of triggers and the corresponding gathering of evidence is discussed in more detail above.

Figure 10B:
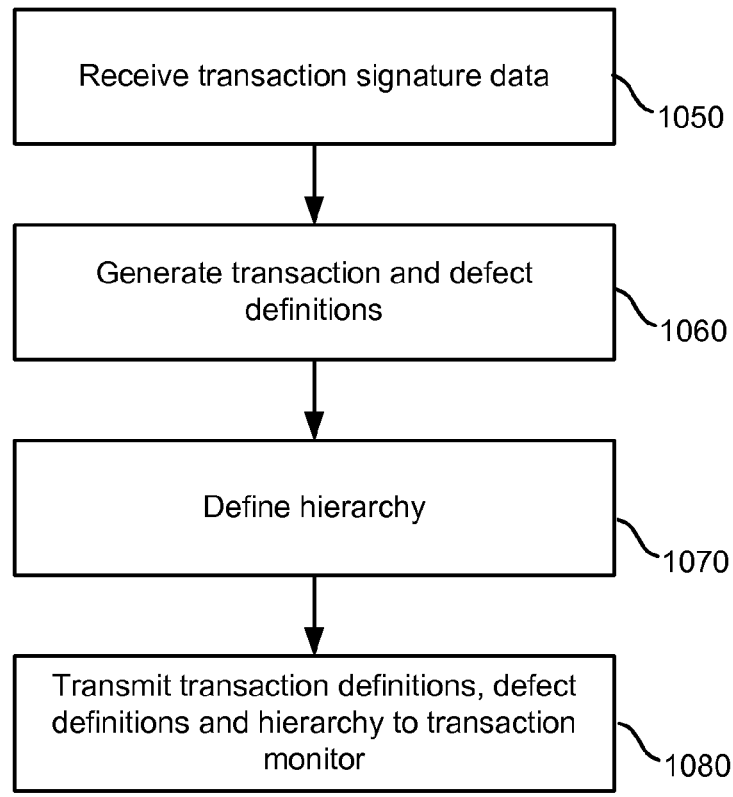
FIG. 10B illustrates a flowchart of an embodiment of a process for generating and transmitting transaction and defect definitions.

FIG. 10B illustrates a flowchart of an embodiment of a process for generating and transmitting transaction and defect definitions. In one embodiment, the flowchart provides more detail for step 740 of the flowchart of FIG. 7. As discussed above, a transaction signature describes an individual transaction that is captured by a recorder. A received transaction signature may later be manipulated into a transaction definition through transaction server 164 and used by traffic monitor 160 to identify valid transactions. Transaction signature data may be received by event collector 310 from one or more recorders, such as recorders 114, 162 and 174 of FIG. 1D and translated into objects before being stored in database server 360 (FIG. 3).

After receiving the transaction signature data, transaction definitions and defect definitions can be generated at step 1060. In one embodiment, admin console 380 provides an interface through browser 382 (FIG. 3) for this purpose. In particular, the operator may manipulate the transaction signature data and enter other commands through the interface to generate the transaction and defect definitions. This provides a convenient method for generating transaction definitions without having to generate them from scratch, although it is also possible for the operator to provide one or more transaction definitions from scratch. Rather, transactions can be recorded from actual client-application interactions, data for the transactions can be provided to an operator as a transaction signature for a particular transaction, and the operator may modify, e.g., edit, the signature through the interface.

For example, admin console 380 may present transaction signature data for a login transaction signature which includes parameters indicating that a login transaction request was received from a particular client machine A by a particular front-end web server B, that the request from client machine A included a specific user name parameter and password parameter, and that the request took twenty milliseconds to complete. An operator may manipulate the transaction signature into a transaction definition by changing the parameters, e.g., to identify a transaction from any client machine (rather than only client machine A). This can be done by deleting an identifier in the transaction signature associated with client machine A, for instance. A wildcard character can also be used to specify, e.g., a subset of a group of machines which are to be included in a transaction definition. The transaction signature can similarly be modified to omit a reference to any specific user name and password parameters and to specify a response time no greater than fifty milliseconds, for instance, (rather than exactly twenty milliseconds). In this case, the transaction definition is made more general and inclusive than the original transaction signature. A balance should be struck in modifying transaction definitions to avoid over- or under-inclusiveness. The operator can thus modify a transaction signature and select or "promote" the transaction signature to a transaction definition for transactions of interest.

For example, assume the operator is interested in monitoring a login process which involves one or more web pages which allow a user to login to a web site. The trained operator can recognize such web pages by their URLs. Requests with URLs for those web pages may therefore be generalized and promoted to transaction definitions. Moreover, a request with a URL for a login web page will typically include an identifier of the particular user in a query field of the URL, e.g., after the "?" in the URL. This user-specific information would result in an unnecessarily narrow transaction definition because only login requests from that specific user would match. Accordingly, the URL can be edited to delete the user-specific information, thereby generalizing the transaction definition so that login requests from all users will match the transaction definition.

In some embodiments, a signature parameter of a response time threshold may be used to identify defective transactions. For example, a transaction signature may be modified and saved as a defect definition so that transaction signatures which match the defect definition indicate a defective transaction. In another approach, a transaction signature may be modified and saved to define a non-defective transaction so that transaction signatures which match the non-defect definition indicated a non-defective transaction. In any case, the modified transaction signature may then be saved as a transaction definition. Additionally, generating a transaction or defect definition may include defining a business transaction, a domain, an application and user identifiers, business processes associated with an application, and other information. An application may be an attribute of a business process and include a session ID, user ID and other information.

Thus, admin console 380 may access the stored transaction signature data, provide it through an interface to be edited by an operator, and store the resulting transaction and/or defect definitions at database server 360. In other embodiments, an operator may manually generate transaction and defect definitions and store them in database server 360.

At step 1070, the operator can define a hierarchy. For example, a domain level can be defined at the top of the hierarchy followed by one or more business processes and business transactions associated with the business processes, where the detected transactions in the traffic can be associated with the business transactions. See also the discussions associated with step 102 of FIG. 1B and the component processing module 270 of FIG. 2. A hierarchy rules engine can be generated based on the transaction and hierarchy definitions for use in classifying interactions with an application.

After generating transaction definitions, defect definitions and a hierarchy, they are transmitted to traffic monitor 160 at step 1080 for use in monitoring incoming traffic, identifying transactions to process and classifying the transactions according to the hierarchy.

Figure 11:
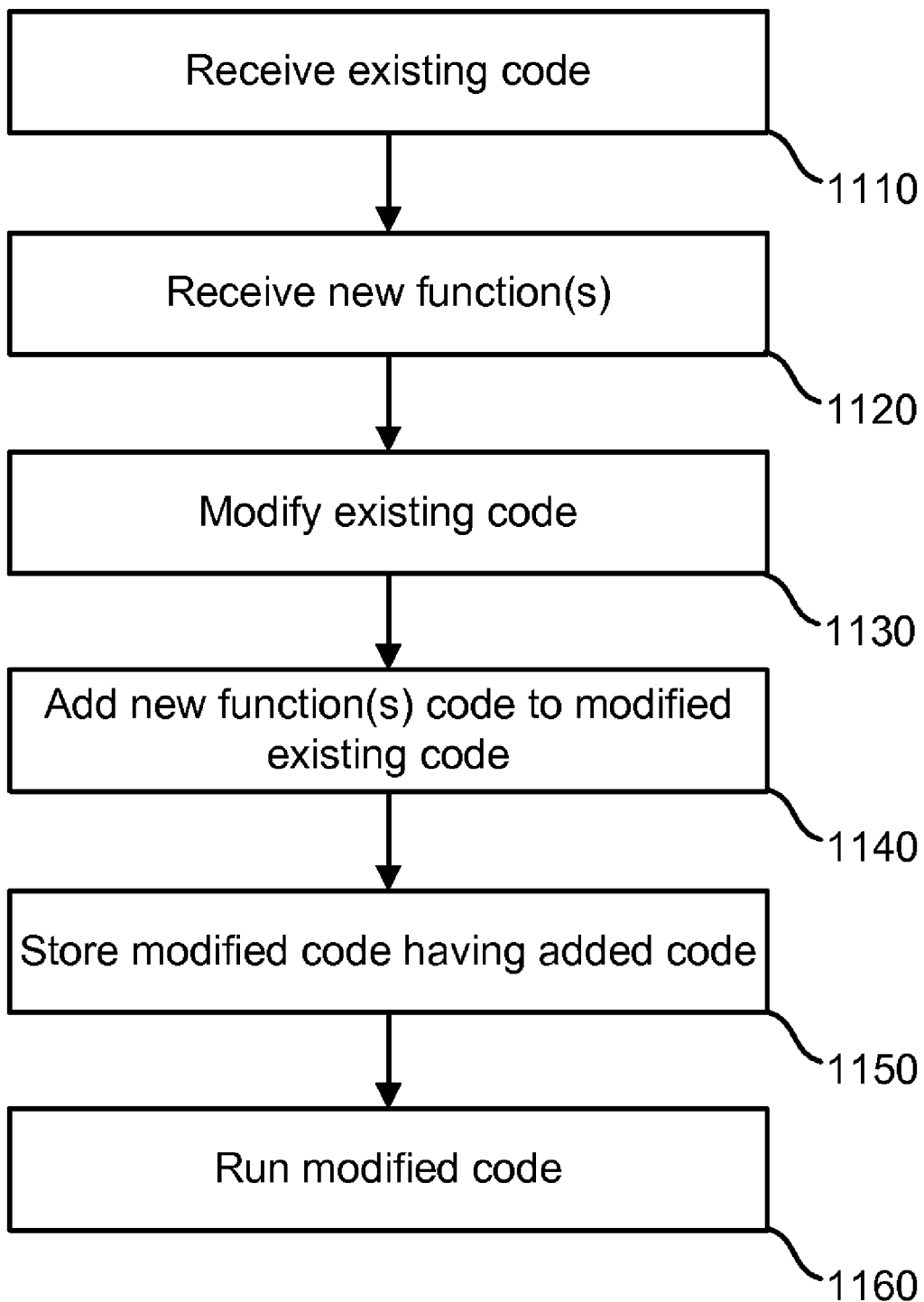
FIG. 11 is a flowchart of an embodiment of a process for modifying application code to generate application runtime data.

FIG. 11 is a flowchart of an embodiment of a process for modifying application code to generate application runtime data. As discussed in connection with FIG. 4, application monitoring system 190 monitors one or more applications, such as application 151 of application server 150, and generates application runtime data from the monitored applications. To achieve this, application code is configured to generate and provide application runtime data which is associated with processing of requests. Put another way, the flowchart of FIG. 11 is one embodiment of a process of modifying the existing object code of an application in order to monitor the application. In step 1110, a probe builder or other module receives the existing object code. In step 1120, the probe builder receives the new functionality, which can be new classes and processes that allow for monitoring of the application. In some embodiments, the new classes and processes can be provided by one or more libraries.

The existing code is modified to prepare for additional code at step 1130. In some embodiments, the existing code is modified to account for the size of the additional code, e.g., by adjusting indices for the existing code. Instructions of the existing code which follow an insertion point of the additional code are moved to make room for instructions of the additional code. For example, if the new code consumes eight bytes, then the indices for the existing code are adjusted to reflect a displacement of eight bytes. Additionally, all references to bytecode within an instruction, e.g., a pointer reference for a jump or branch instruction, may be adjusted.

All or part of the new functionality (e.g., the new classes/methods) is added to, combined with, or otherwise associated with the existing modified code at step 1140. Note that instrumenting bytecode of an application is only one example of a technique for monitoring an application. Various other techniques can be used, such as plugging into an exit built into the application or network server. In one embodiment, step 1140 may include adding a function which writes application data, such as a request-response pair identifier, an application server IP address and other information, to a response header generated by application code, as discussed in more detail below with respect to step 1220 of the flowchart of FIG. 12A. The application data may be observed and processed as network server traffic by traffic monitor 160 as the response travels from application server 150 to network server 140 and to client device 110. The modified code which includes the added code is stored at step 1150. In step 1160, the modified code is run, thereby generating application runtime data.

Figure 12A:
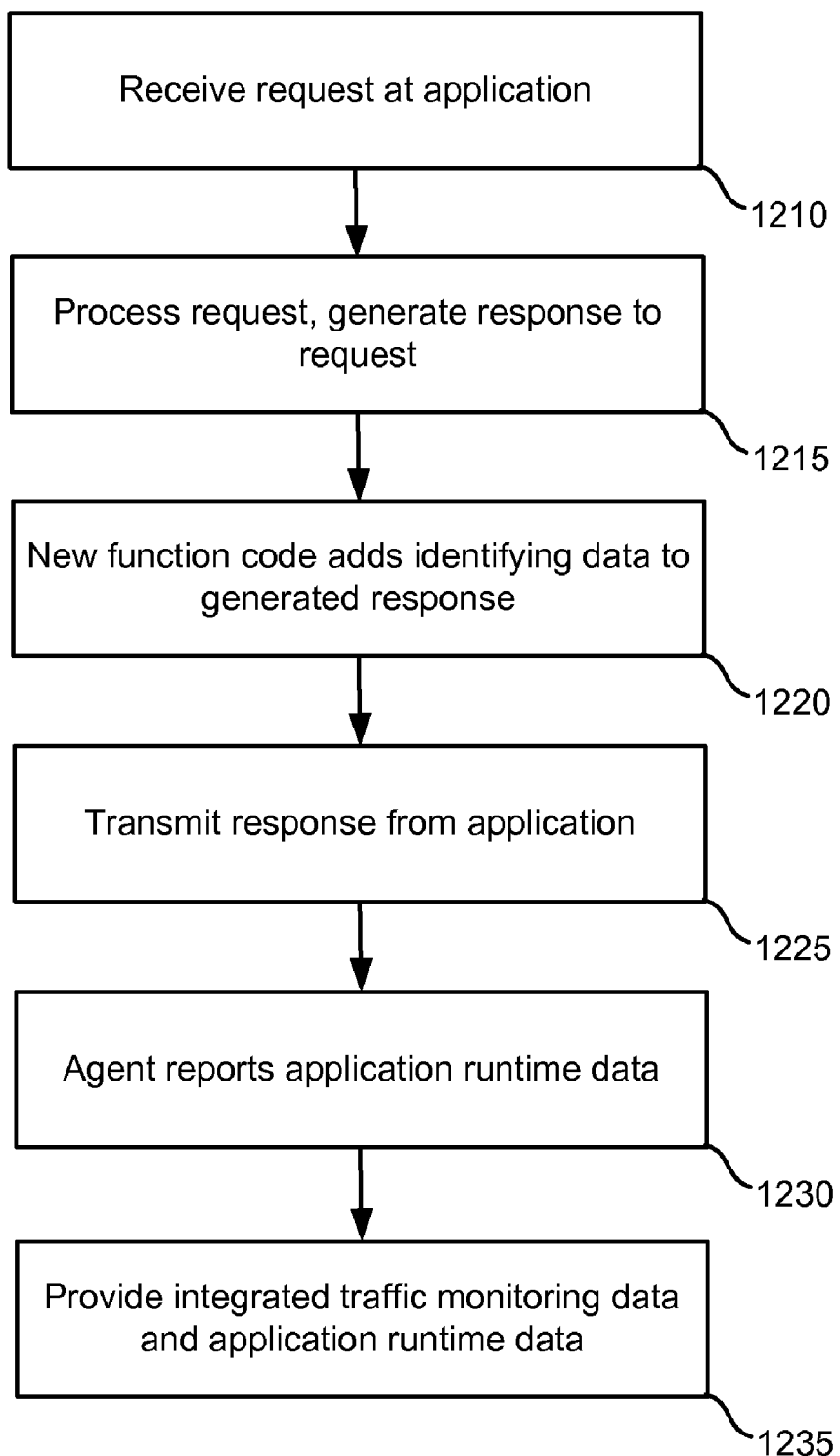
FIG. 12A is a flowchart of an embodiment of a process for processing an application request to associate traffic monitoring data with corresponding application runtime data.

FIG. 12A is a flowchart of an embodiment of a process for processing an application request to associate traffic monitoring data with corresponding application runtime data. One feature of the present technology involves integrating traffic monitoring data and application runtime data. In some embodiments, the integrated traffic monitoring data and application runtime data may be accessed through traffic monitoring system 180. In this approach, identifying data can be communicated to traffic monitoring system 180 from application monitoring system 190 or from another location to enable traffic monitoring system 180 to access application runtime data corresponding to traffic monitoring data for a particular request-response pair. For example, the identifying data may include index data, a request-response pair identifier and/or other information regarding the application runtime data. The identifying data may be communicated to system 180 by inserting the data into a response generated by an application, in one possible approach. In one embodiment, application monitoring system 190 may insert the identifying data into the response. The response and the identifying data may then be observed and processed by traffic monitoring system 180.

In one embodiment, FIG. 12A provides more detail of step 630 of FIG. 6. A request is received at an application at step 1210. The application processes the request and generates a response at step 1215 thereby forming a request-response pair. Processing the request may include performing actions by application code within application server 150 as well as accessing database server 151 or some other back-end server, e.g., by calling a servlet or EJB of the application.

Identifying data for the request-response pair is inserted into the generated response by new function code at step 1220. In some embodiments, the identifying data may be inserted into the response sometime before the response has been completely generated rather than after the response is completed. Other application-related information can also be provided in the response, including an application server ID, such as an IP address of the machine that the agent is running on, a virtual machine ID, which is a name associated with agent 152, a request handler ID, which is an entry point and/or a servlet name (servlet class name) which is involved in generating the response, and a servlet response time.

At step 1225, after adding the identifying data and other application-related information to the response, the response is transmitted from the application to network server 140, which may or may not perform additional processing of the response. After any further processing is performed, the response is sent by network server 140 to client 110. Traffic monitoring system 180 may observe and process the response such as by determining transaction components associated with the response, determining if the response is part of a defective transaction, and incorporating the response into defect and transaction statistics as discussed above with reference to FIG. 7. Moreover, the identifying data may be retrieved from the response and used to retrieve application runtime data associated with the response. The application-related information can also be retrieved. For example, if it is determined that the response is part of a defective transaction, corresponding application runtime data may be identified from the identifying data. This is discussed in more detail below with respect to FIG. 12B.

Application runtime data is reported by agent 152 of application server 150 to Enterprise Manager 155 at step 1230. The application runtime data may be indexed to the identifying data added to the response as well as other application data regarding processing of a request by application 151. Integrated traffic monitoring data and corresponding application runtime data can be provided to the operator via an interface, for instance, at step 1235 as discussed in more detail below with respect to FIG. 12B. Essentially, the traffic monitoring data and application performance data can be cross-referenced to one another to allow the operator to easily access both types of data to provide an enhanced understanding of network and application activity.

Figure 12B:
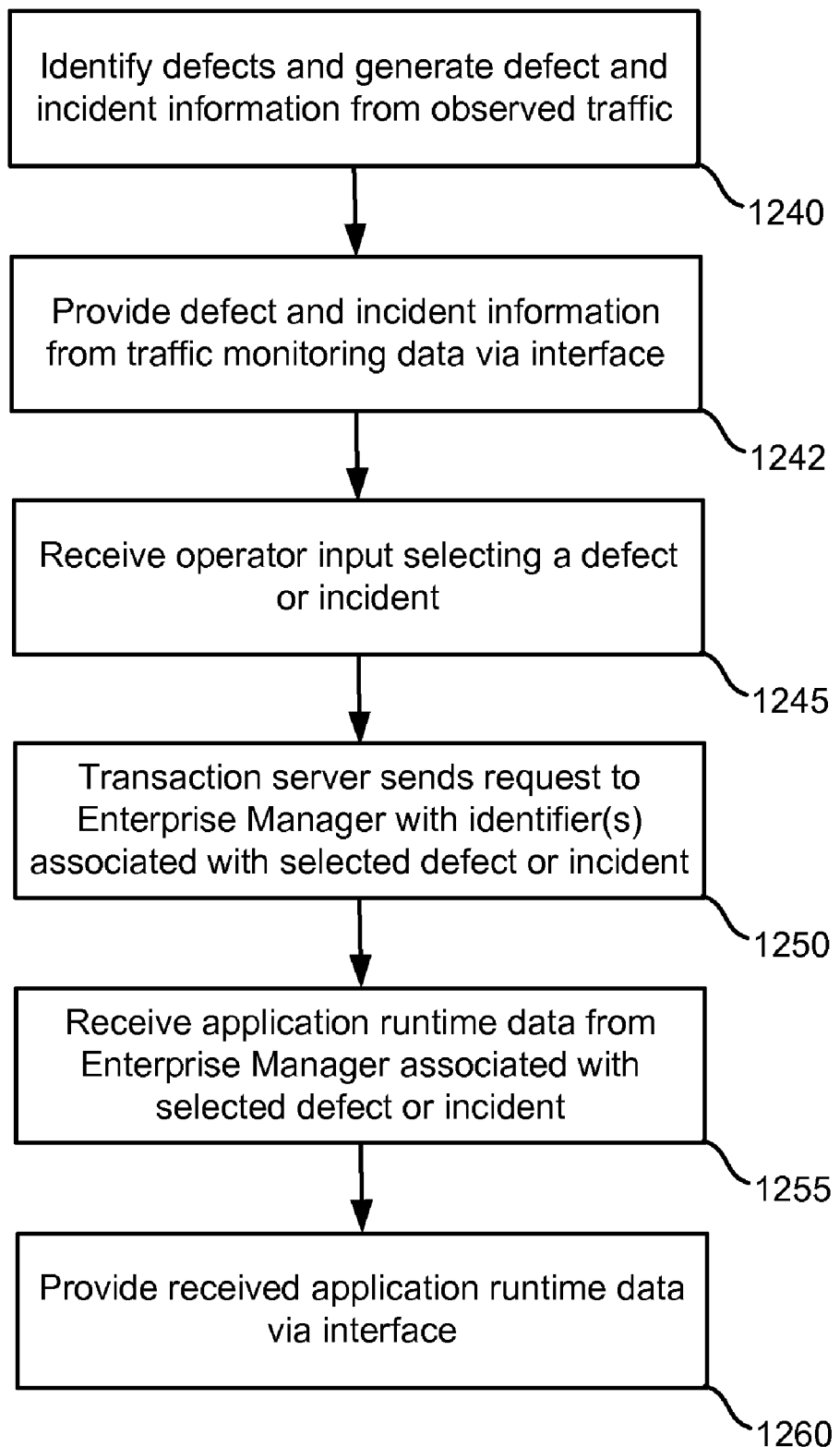
FIG. 12B is a flowchart of an embodiment of a process for associating application runtime data with corresponding traffic monitoring data.
Figure 12C:
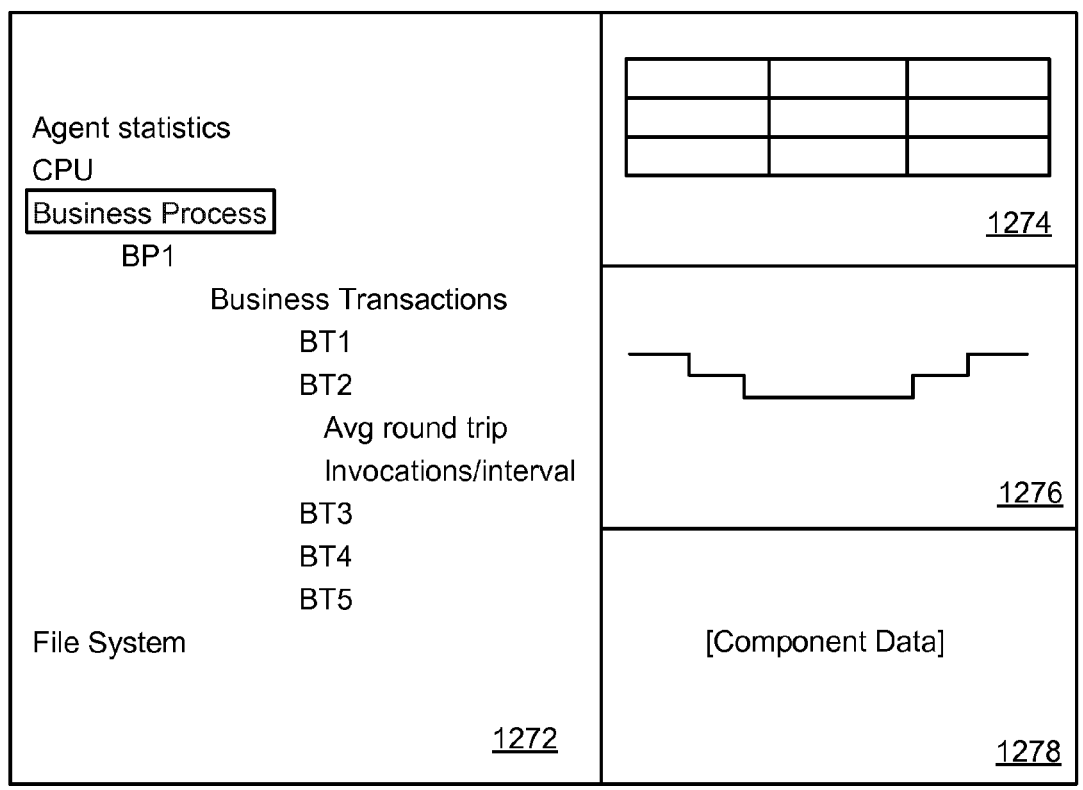
FIG. 12C is an example interface for displaying traffic monitoring data and application runtime data.

FIG. 12B is a flowchart depicting an embodiment of a process for associating application runtime data with corresponding traffic monitoring data. In one embodiment, the flowchart of FIG. 12B provides more detail for step 1235 of the process at FIG. 12A. Defects and incidents are identified and associated information is generated from the traffic monitoring data at step 1240. In one embodiment, this step is performed by traffic monitor 160 and transaction server 164. Step 1240 may include performing steps 710-730 of the process of FIG. 7 as discussed above. Identification of defects is discussed above with respect to step 950 of the flowchart at FIG. 9.

Next, data associated with the generated defects or incidents may be provided to an operator at step 1242, e.g., through an interface provided within browser 382 (FIG. 3). The interface content is provided to browser 382 by admin console 380. The operator can provide an input through the interface selecting a particular defect or incident for which application runtime data is desired, at step 1245. In response, transaction server 164 sends a request to Enterprise Manager 155 with identifying data associated with the selected defect or incident at step 1250. As mentioned, such identifying data may have been previously retrieved by traffic monitoring system 180 from a response provided to client 110, in one approach. For example, the identifying data may be associated with a request-response pair associated with a defect or one or more request-response pairs associated with one or more defects which triggered an incident. In another embodiment, transaction server 164 may send business transaction or transaction ID information to Enterprise Manager 155. In this case, Enterprise Manager 155 may have a mapping of business transaction or transaction ID to application runtime data. Enterprise Manager may then use the mapping to identify application runtime data associated with the selected defect or incident. In any case, when a request for application runtime data is received by Enterprise Manager 155 from transaction server 164, Enterprise Manager 155 gathers the requested data and sends it to transaction server 164.

Transaction server 164 receives the requested application runtime data associated with the selected defect or incident at step 1255. In one embodiment, the application runtime data is provided in an interface based on a hierarchy represented by a tree having a number of nodes. A portion of the application runtime data which is associated with a selected level of the hierarchy can be displayed based on a selected node. In some embodiments, the application runtime data may be received in some other format. Once the requested application runtime data is received, it is provided to the operator through the interface or some other means at step 1260.

In some embodiments, traffic monitoring data, such as statistics, defect and incident data derived from observed traffic, along with application runtime data, may be accessed through application monitoring system 190. In some embodiments, the application runtime data and/or corresponding traffic monitoring data can be displayed based on a hierarchy represented by a tree. A representative example of an interface for providing such a display, illustrated in FIG. 12C, includes display regions 1272, 1274, 1276 and 1278. Display region 1272 represents the hierarchy as a tree with selectable nodes. "RT" denotes response time. The tree has the following form, in one possible approach:

Domain
    Business Processes
        Business_Process1
            Business Transactions
                Business_Transaction1
                      Average Response time (ms)

-continued

Errors Per Interval
                      Invocations Per Interval
                Business_Transaction2
                      Average Response time (ms)
                      Errors Per Interval
                      Invocations Per Interval
        Business_Process2

Thus, the tree can organize the presentation of application runtime data and/or traffic monitoring data based on a hierarchy which includes a domain, business processes, business transactions and other nodes. Display region 1274 illustrates a representative table without data. The table in an actual interface may have information regarding defects of an incident which has been classified to the selected level of the hierarchy, for instance. An operator can select any of the rows of the table to have the corresponding trace displayed in the display region 1276, which includes a simplified representation of trace. Display region 1278 may provide other details regarding the invoked application components, such as an identifier of the request-response pair associated with the selected trace and other component data.

Figure 13:
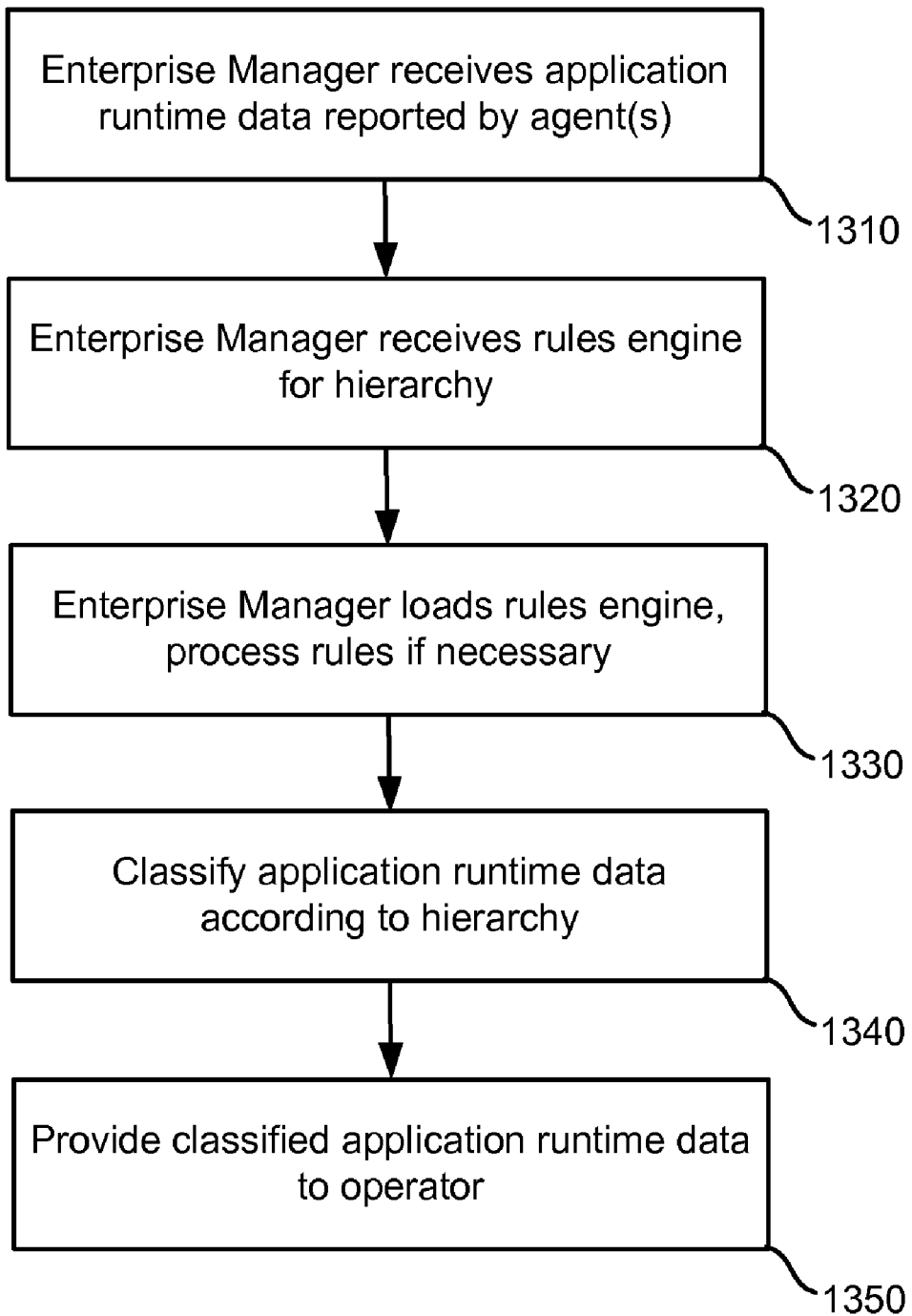
FIG. 13 is a flowchart of an embodiment of a process for providing traffic monitoring data and corresponding application runtime data to an operator via an interface.

FIG. 13 is a flowchart of an embodiment of a process for providing integrated traffic monitoring data and corresponding application runtime data to an operator through application monitoring system 190. In some embodiments, the process of FIG. 13 provides more detail for step 630 of the process of FIG. 6. Application runtime data reported by agent 152 is received by Enterprise Manager 155 at step 1310. The application runtime data can be associated with request-response pairs and can be reported as discussed above with respect to step 1230 of FIG. 12A.

Next, a rules engine for a hierarchy is received by Enterprise Manager 155, e.g., from transaction server 164, at step 1320. The set of rules can be generated by traffic monitoring system 180 in response to observed traffic and operator inputs. In some embodiments, the rules engine can be shared with the application monitoring system once, periodically, or at some other rate with respect to integration of data between traffic monitoring system 180 and application monitoring system 190.

In one embodiment, the rules engine may be generated from an XML file and can provide information for associating transactions with one or more levels of a hierarchy. In particular, the rules engine may provide classification rules and/or descriptions for identifying a domain, business processes within the domain, business transactions within the business processes, transactions within the business transactions and transaction components within the transactions. For example, the rules engine may describe HTTP request characteristics associated with a particular transaction, such as a URL host name, URL parameters, HTTP post parameters, cookie parameters and session manager parameters for each transaction.

The rules engine is loaded by Enterprise Manager 155 at step 1330. The rules can be modified, if necessary, to generate a modified rules engine which is tailored to the needs of the application monitoring system. For example, Enterprise Manager 155 may generate a modified set of rules to identify transaction components, e.g., by parsing the set of rules of the received rules engine. To this end, a configuration file which is used to generate the rules engine may include header information identifying each transaction component definition and body information containing the details of the transaction component definitions, such as name/value pairs that are associated with a transaction component. When the header information is detected during parsing, the information in the body is read and stored. A rule is then derived from the transaction component definition body portion.

Modified rules for identifying a transaction, business transaction, business process, domain and optionally other information can similarly be generated to provide the modified rules engine. The rules to identify the different levels of the hierarchy are derived from the portions of the rules engine which describe the corresponding elements. In one embodiment, the hierarchy can be represented by a tree having nodes which define the different levels of the hierarchy. In some embodiments, the rules engine used by the application monitoring system can be shared with traffic monitoring system 180.

Application runtime data may be classified according to the hierarchy at step 1340. For example, a transaction component may be associated with a request received and processed by application server 150. See the discussion above regarding step 102 (FIG. 1B) regarding binding of transaction components to the hierarchy. Step 102 can be applied equally by the traffic monitoring system using its rules engine or by the application monitoring system using its rules engine. Or, the traffic monitoring system and the application monitoring system can use the same rules engine.

In particular, application runtime data generated for each request received and processed by an application may be associated with a transaction component. The request received by the application includes parameter data associated with a transaction component. The parameter data may include, e.g., URL host name, URL parameters, HTTP post parameters, cookie and/or session manager parameters for each transaction. The agent, for instance, can compare the parameter data against the set of rules identifying a transaction component. If the parameter data matches a transaction component rule, the request is associated with the particular component. Optionally, the comparison can be made by the Enterprise Manager 155 or other entity.

For example, consider a business process for purchasing a book through a web site. This business process may include business transactions of performing a login, shopping to select a book, adding a selected book to a cart, and proceeding to checkout where payment information is entered. The business transaction of proceeding to checkout may include a request for a checkout content page and a response which provides the checkout page; the request for the checkout page may be processed by a checkout servlet within the monitored application. The rules engine received at step 1320 can identify the "checkout" transaction by URL host name (web server name), URL parameters (the URL itself), HTTP post parameters (parameters passed in the request), cookie parameters (cookies maintained, created or deleted as a result of the request) and/or session manager parameters (name/value pairs obtained from a session manager). Application runtime data reported at step 1310, which indicates the checkout servlet has processed a request, may include servlet identification information as well as URL host name, URL parameters, HTTP post parameters, cookie parameters and/or session manager parameters associated with the request processed by the servlet. These parameters will match the parameters for the checkout transaction, and the servlet will be associated with the transaction component at step 1340.

Moreover, because the transaction component is part of a transaction, a transaction is part of a business transaction, a business transaction is part of a business process and a business process is part of a domain, in the example hierarchy, the servlet can be associated with those additional levels of the hierarchy as well at step 1340.

A received request can be marked or otherwise associated with a transaction and business transaction. The reported application runtime data classified according to the hierarchy is then provided to an operator by Enterprise Manager 155 at step 1350. In one embodiment, the application runtime data may include average response time, errors per interval, method invocations per interval and other information for a transaction. This information can be provided along with the hierarchy information corresponding to the transaction and may be reported to an operator, e.g., through an interface provided by workstations 410 or 420 or other machines (not pictured).

Related Transaction Correlation

Correlation of related transaction components that comprise a transaction is achieved using an identifier incorporated into each component. As discussed above, a transaction may comprise several request-response pairs comprising a transaction component. For example, a transaction that updates a web page having multiple frames may have transaction components that update each frame. The identifier identifies a set of related transaction components performed in response to receiving a user selection or some other event. The identifier is generated and inserted into content requests by performance monitoring code in a network browser application, where two or more content requests associated with a single user selection or other input (or event) include the same identifier. Requests associated with subsequent user selections or events will contain a different identifier. The identifier may be a global unique identifier, or GUID, which can be generated each time a user selection is received through the browser application for a desired portion of a content page.

The identifier can be generated at a client by performance monitoring code in a network browser application. The browser application may receive the performance monitoring code from an application server. In one embodiment, an application server receives a content request from a client, generates a response for the request, and inserts the performance monitoring code into the response. When the response is received by the client, the performance monitoring code is executed and one or more handlers are created and/or modified to detect a browser application event, such as an On Click event. When such an event is detected, an identifier is generated and stored in a file, and the identifier is included in any content request initiated by the detected event. In some embodiments, a server may include the performance monitoring code with each new content page to be provided in the network browser application.

In some embodiments, the technology herein may be used with interactive web applications provided through a network browser. The interactive web applications may enable asynchronous communication between the browser and one or more servers which provide browser content. The asynchronous communication may allow a browser to be updated in part without reloading or refreshing an entire content page within the browser. The asynchronous interactive web browser experience may be implemented using one or more of IFrames, XHMTL, cascade style sheets (CSS), or Asynchronous JavaScript and XML (AJAX).

AJAX uses a set of technologies to provide interactive web content based on asynchronous communication between a browser application and server. The set of technologies may include XHMTL, cascade style sheets and JavaScript. AJAX uses an XMLHttpRequest JavaScript object to exchange data asynchronously with a web server and update portions of a content page or page frame provided through a browser application. AJAX may also utilize one or more IFrames or script tags to update browser application content and/or communicate with a server.

In operation, a browser application using AJAX may provide a content page which includes a user interface. The browser application may receive a user input, such as a click, post, or some other input, from a user though the interface. JavaScript within the content page (such as the XMLHttpRequest JavaScript object) may then update the content page and/or asynchronously send a request to a server. A user may continue to interact with the content page while the browser application is waiting for a reply from the server. Once the reply is received, the JavaScript object and optionally CSSs may update the content page based on the response without refreshing the entire page.

The present technology may be used to insert a GUID in each content request generated by an AJAX object or other AJAX technology. The GUID may be associated with a single user request, an automatically generated request, or a combination of these. The GUID may be included in a cookie attached to each server content request generated by JavaScript, IFrames, or other AJAX components. In some embodiments, AJAX may be used to automatically send requests to one or more servers. These automatic requests are not initiated by a user input. For example, an automatic AJAX based request may be used to update a stock value within a website. In some embodiments, the cookie containing the unique GUID may be deleted or otherwise modified to indicate that the cookie should not be sent with the automatic AJAX request (that is, if the GUID is intended to identify server content requests which correspond to a particular user selection). In some embodiments, the GUID cookie may not be sent if a determination is made that the browser has been idle for some period of time, such as three seconds. Rather, the GUID cookie may be modified with a new GUID and the modified GUID cookie may be sent with the request. In some embodiments, a modified GUID is included in an automatic AJAX request in some other manner.

Figure 14:
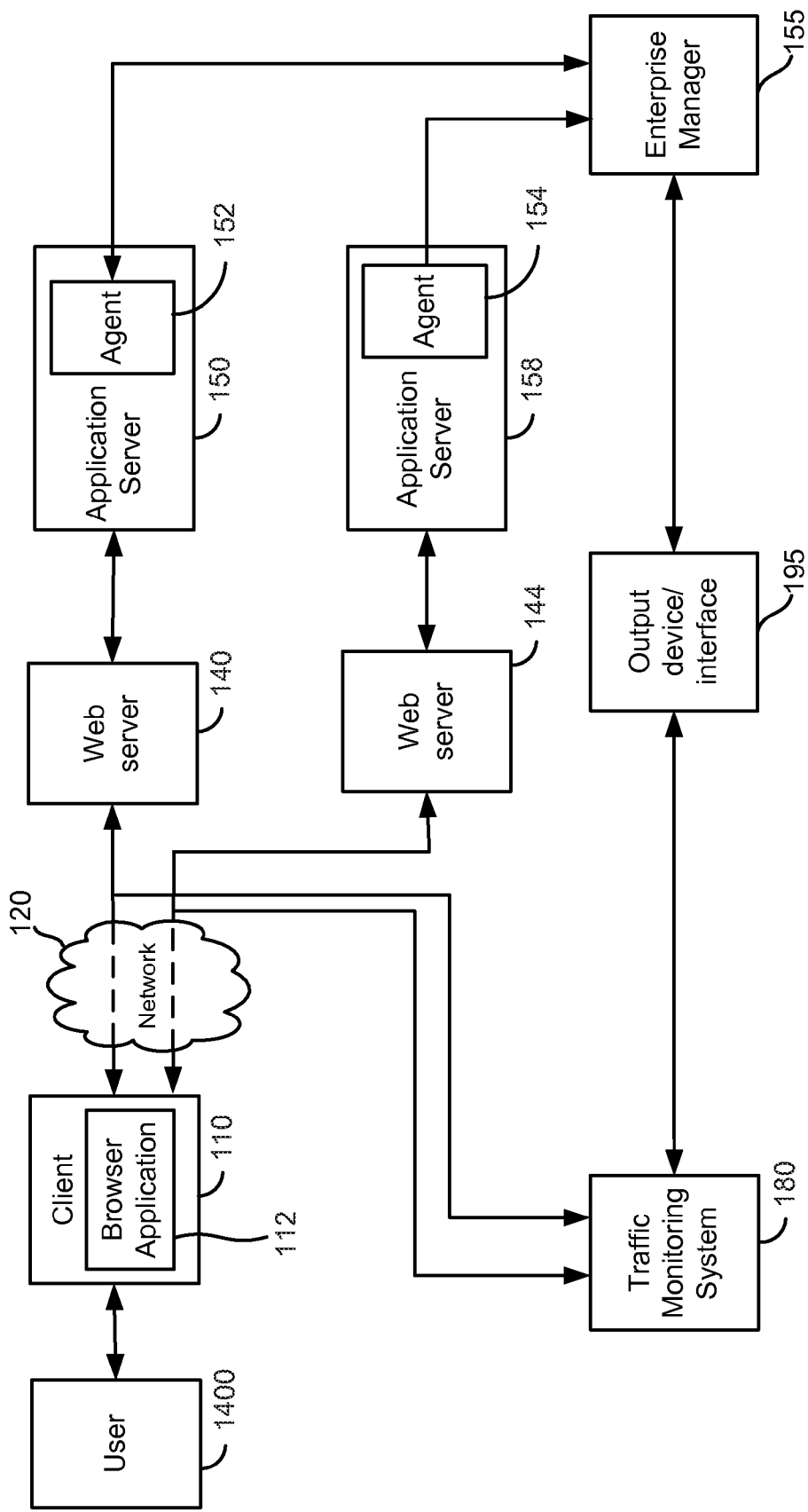
FIG. 14 is a block diagram of an embodiment to a system for monitoring related content requests.

FIG. 14 is a block diagram of an embodiment of a system for monitoring related content requests. The system of FIG. 14 includes user 1400, client 110, network 120, web servers 140 and 144, application servers 150 and 158, traffic monitoring system 180, enterprise manager 155 and output device/interface 195.

Client 110 may communicate with web servers 140 and 144 over network 120. Network 120 may be implemented as a public network, private network, LAN, WAN, the Internet, an intranet, or some other private or public network or combination thereof. Client 110 includes network browser application 112. User 1400 may provide input and/or a user selection to browser application 112 on client 110 through an input device (not illustrated in FIG. 14).

Web server 140 provides a web service over network 120 and communicates with client 110 and application server 150. Web server 144 also provides a web service over network 120 and communicates with client 110 and application server 158.

Application server 150 includes one or more applications (not illustrated in FIG. 14) and agent 152 and communicates with web server 140. Agent 152 of application server 150 may communicate with enterprise manager 155 to provide performance data, such as aggregated application runtime performance data that include one or more identifiers. Application server 158 includes one or more applications and agent 154 and communicates with web server 144, where agent 154 communicates with enterprise manager 155 to provide performance data.

Traffic monitoring system 180 may intercept and process traffic sent and received from web servers 140 and 144. In some embodiments, traffic monitoring system 180 may be implemented as a single system or two different monitoring systems that each monitor one web server.

Client 110, network 120, web server 140, application server 150, enterprise manager 155, traffic monitoring system 180 and output device/interface 195 are similar to those discussed above with respect to FIG. 1D.

Figure 15:
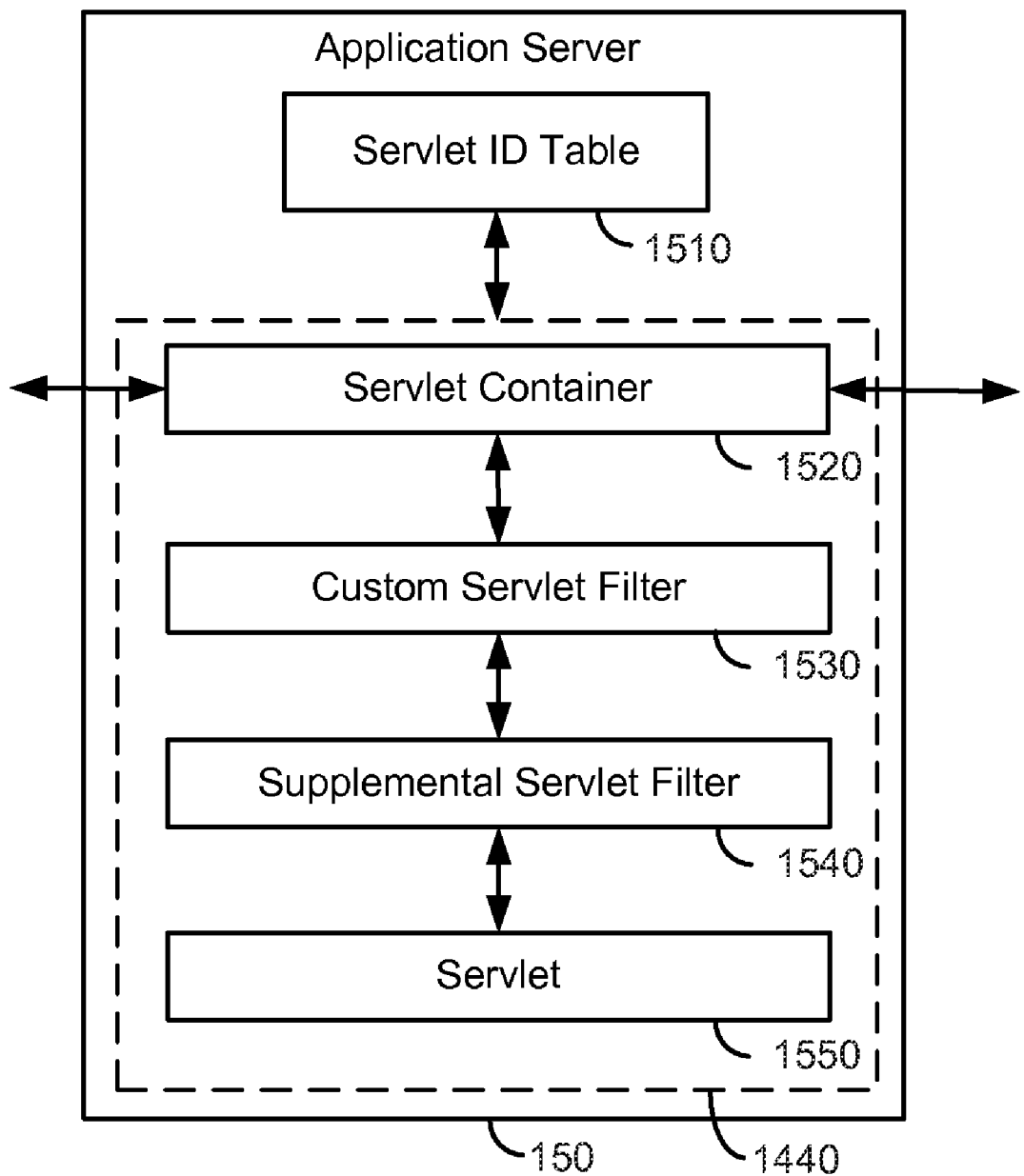
FIG. 15 illustrates an embodiment of an application server.

FIG. 15 illustrates an embodiment of application server 150 and/or application server 158 of FIG. 14. Application server 150 includes server identification table 1510 and response generation engine (RGE) 1440. RGE 1440 includes servlet container 1520, custom servlet filter 1530, supplemental servlet filter 1540, and servlet 1550.

Servlet container 1520 is a servlet engine able to provide servlet functionality. Servlet container 1520 manages servlets, such as servlet 1550, and determines which servlet to invoke for an incoming request. For example, servlet container 1520 may receive a request and route the request to servlet 1550. Operation of servlet container 1520 is discussed in more detail below.

One or more custom servlet filters, such as custom servlet filter 1530, may be implemented in RGE 1440. Custom servlet filter 1530 can intercept and process a request and/or response sent to or from servlet 1550. In particular, custom servlet filter 1530 may transform the header and body data in a content request or response. The code comprising custom servlet filter 1530 can transform the body and header information of a request or response. In some cases, a custom servlet filter can be added to a servlet container by modifying an application configuration file. Initialization, instantiation, and operation of custom servlet filter 1530 are discussed in more detail below.

One or more servlet filters, such as servlet filter 1540, may be implemented in RGE 1440. Supplemental servlet filter 1540 is a servlet filter similar to custom servlet filter 1530. However, supplemental servlet filter 1540 is typically already configured and installed on application server 150. Thus, data need not be separately added to a configuration file to initialize a supplemental servlet filter.

One or more servlets, such as servlet 1550, may be implemented in RGE 1440. In one embodiment, a servlet is a component that generates dynamic content. Servlet 1550 is an example of a component that generates a response associated with a content request. In one embodiment, servlet 1550 can be a Java technology based web component. In another embodiment, servlet 1550 may be implemented in some other technology. Operation of a servlet is discussed in more detail below.

Figure 16:
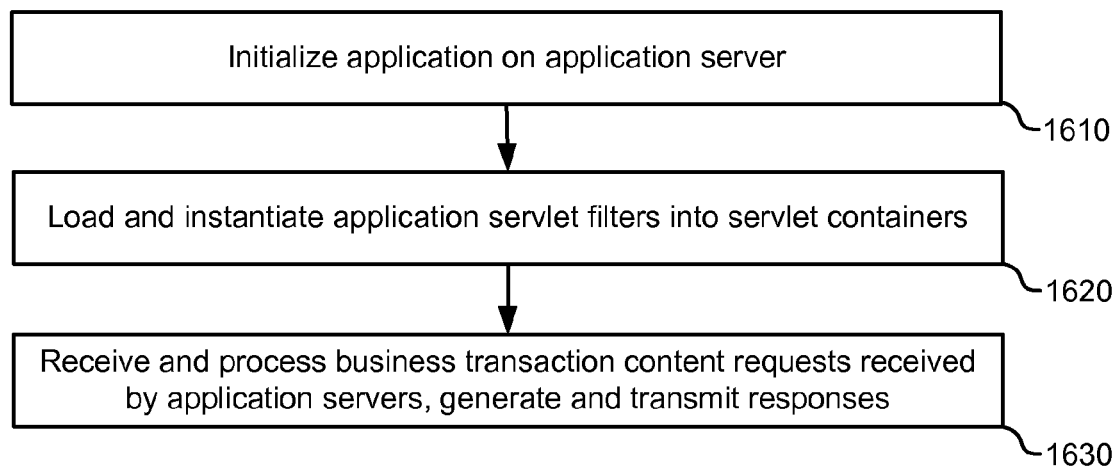
FIG. 16 illustrates a flowchart of an embodiment of a method for configuring an application server to process content requests.

FIG. 16 illustrates an embodiment of a method for configuring application server 130 to process content requests. An application on application server 130 is initialized at step 1610. Application servlet filters are loaded and instantiated into servlet containers at step 1620. Custom servlet filter 162 is included in the application servlet filters to be loaded and instantiated. In one embodiment, custom servlet filter 162 can be added to a configuration file in order for the filter to be loaded and instantiated with the other servlet filters. The loading and instantiating is performed by servlet container 161. Step 1620 is discussed in more detail below with respect to FIG. 17. Next, application servers receive and process content requests and generate and transmit responses at step 1630. The requests may originate from browser application 112 of client 110 and span over several servers. The responses may be sent synchronously or asynchronously to client 110 from web servers 140 and 144, or other servers. This is discussed in more detail below with respect to FIGS. 24-25.

Figure 17:
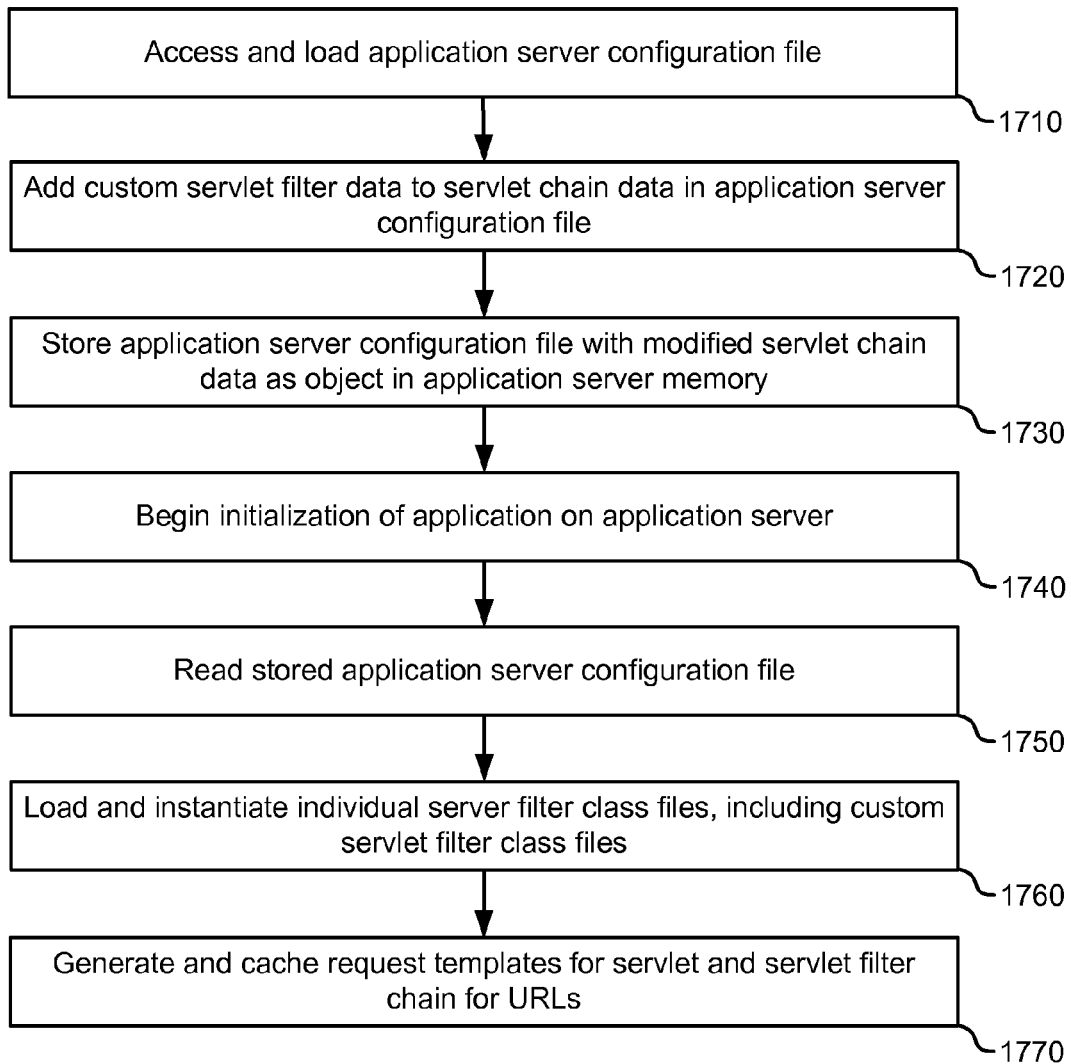
FIG. 17 illustrates a flowchart of an embodiment of a method for loading and instantiating application servlet filters.

FIG. 17 illustrates an embodiment of a method for loading and instantiating application servlet filters. The method of FIG. 17 provides more detail for step 1620 of the method of FIG. 16. In some embodiments, the method of FIG. 17 is performed for each application being monitored on an application server.

An application server configuration file is accessed and loaded at step 1710. In one embodiment, the configuration file is accessed to determine the current servlet filters associated with the application servlet container. Once the current servlet filters are determined, additional servlet filters can be added into the servlet filter chain. Custom servlet filter data is added to servlet filter chain data in the application server configuration file at step 1720. In one embodiment, the custom servlet data is added to a configuration file entitled, "web.xml" of the application server. The added data is used to subsequently load and instantiate custom servlet filters. The custom servlet filter data has the same format as existing servlet filters. For example, the custom servlet filter data includes header information and body information. In one embodiment, the custom servlet filter data is added such that custom servlet filter 162 is the first to process a content request for a servlet and last to process an outgoing content response from a servlet. This is illustrated in FIG. 15. Once information for additional servlet filters is added, an application server will interpret the custom servlet filter data as a normal servlet filter data within the application server configuration file.

The application server configuration file with modified servlet chain data is stored as an object in the application server memory at step 1730. This modified configuration file replaces the original application server configuration file accessed at step 1710.

Initialization of the application on the application server begins at step 1740. This can be performed by servlet container 161. In one embodiment, step 1740 is performed at startup of the application server or the servlet engine of the servlet container. Next, the stored application server configuration file is read at step 1750. The configuration file may be read by servlet container 161 in preparation for instantiating servlets and servlet filters. Individual servlet filter class files are then loaded and instantiated at step 1760. The individual servlet filter class files may include both custom servlet class files (for example, class files for custom servlet filter 162) and pre-existing servlet class files (such as class files for supplemental servlet filter 163). This creates a data structure of servlet filters which will be used to process incoming content requests. Next, request templates for a servlet and servlet filter chains are generated and cached at step 1770. Templates consisting of a chain of processing servlet filters and servlets are generated for particular URLs. For example, a different chain of servlet filters and servlets may be used to process requests from different URLs. Each request template may specify a chain for one or more URLs.

In one embodiment, the method of FIG. 17 may be performed for application servers within a WebLogic application server architecture. WebLogic is provided by BEA Systems, of San Jose, Calif. In another embodiment, the method of FIG. 17 may be performed for application servers implemented within a WebSphere application server architecture. WebSphere is provided by IBM, of San Jose, Calif. For WebSphere application servers, the method of FIG. 17 can be altered slightly because a servlet filter chain is maintained outside a server configuration file. In this case, the servlet filter chain is modified rather than an application server configuration file. Otherwise, the method of FIG. 17 is generally applicable to both application server architecture systems, as well as other systems.

Figure 18:
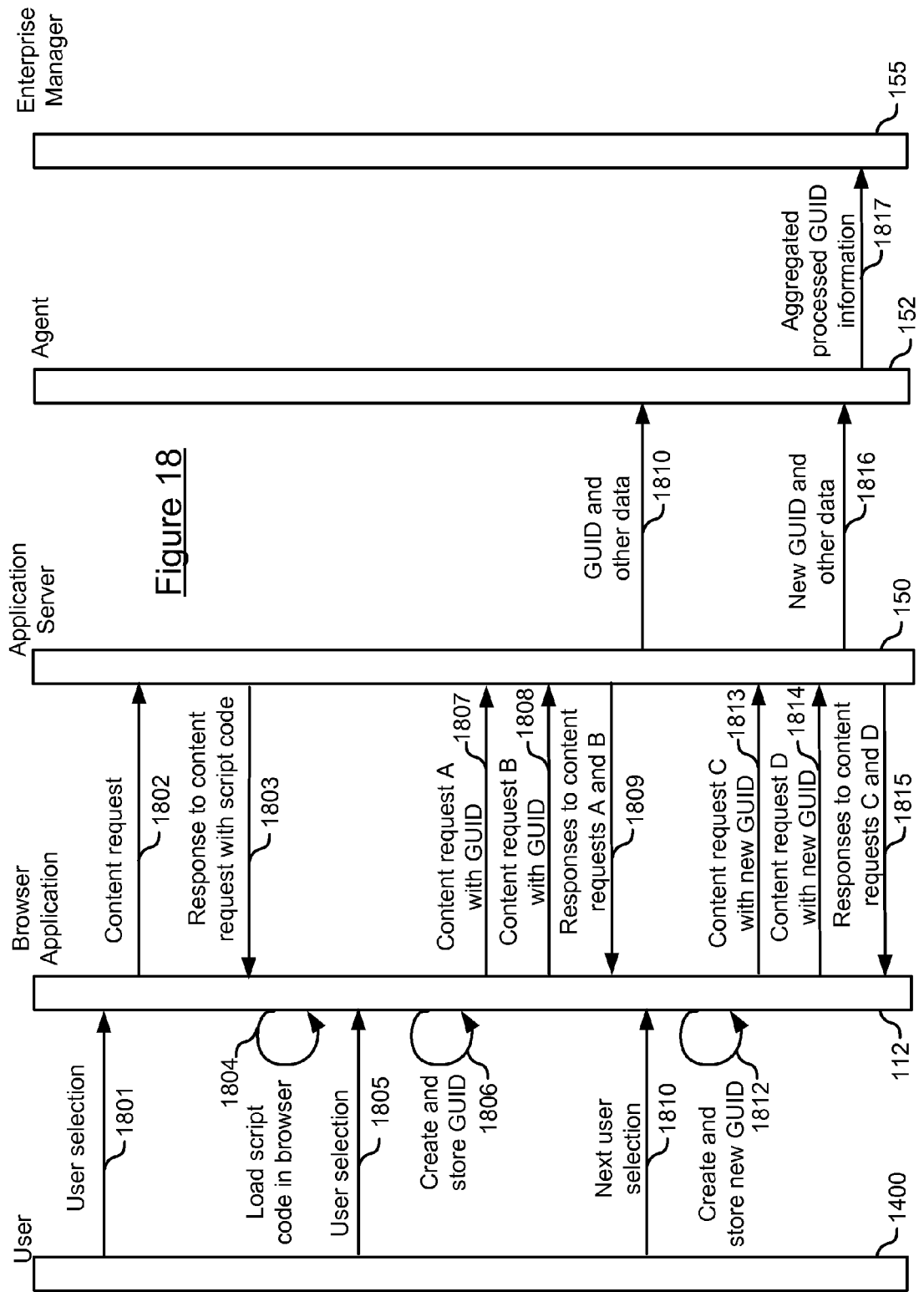
FIG. 18 illustrates an embodiment of a sequence diagram for the present technology.

FIG. 18 illustrates an embodiment of a sequence diagram for the present technology. Sequence diagram 1800 illustrates communications between user 1400, browser application 112, application server 150, agent 152, and enterprise manager 155. In one embodiment, the communications are initiated by a user selection received through browser application 112. In response to receiving the user selection, browser application 112 retrieves content from application server 155 through web server 140 (not illustrated in FIG. 18). The content may be transmitted to browser application 112 in the form of a content response, and includes performance monitoring code. The performance monitoring code is loaded into browser application 112. When browser application 112 receives a subsequent user selection, two or more second content responses are retrieved as transaction components in response to the user selection. The performance monitoring code is able to insert an identifier (GUID) associated with the subsequent selection in each sent request. Though communication involving a traffic monitoring system 180 is not illustrated in FIG. 18, it is understood that the traffic monitoring system may communicate with one or more elements pictured in FIG. 18.

The sequence of events in the sequence diagram is as follows. First, browser application 112 receives a user selection from user 1400 as event 1801. The user selection may be associated with a content page element associated with an anchor, a form element or some other element. In one embodiment, the selected element is associated with content available from application server 155. After receiving the user selection, browser application 112 transmits a content request to application server 150 (through web server 140, not illustrated) as event 1802. In one embodiment, the content request may be an HTTP request. Next, application server 150 receives and processes the content request and generates a content response. In one embodiment, performance monitoring code is included in the response generated as a result of the content request. The code may be implemented as script code, such as JavaScript, or some other type of code. The content response is transmitted to browser application 112 as event 1803.

Browser application 112 receives the content response from server 150 (or intervening web server 140) and extracts the performance monitoring code and content data from the response. The performance monitoring code is loaded and/or registered with browser application 112 and executed at event 1804. While executing the performance monitoring code, browser application 112 also loads the extracted content into an interface provided by the browser.

At some point after receiving the content response and loading the content into the browser, browser application 112 may receive a subsequent user selection as event 1805. Similar to the selection received as event 1801, the subsequent user selection may be a selection of a content page anchor element, form element or some other element that initiates a server request. The script code (performance monitoring code) is loaded into browser 112, creates a GUID associated with the received user selection and stores the GUID as event 1806. The GUID is stored in a cookie or other file accessible to browser application 112. Browser application 112 then sends a content request A with the GUID created at event 1806 to application server 150 as event 1807. A second content request B with the same GUID is sent to application server 150 at step 1808. Content requests A and B are initiated by the user selection received as event 1805. In some embodiments, the content requests may be sent to different application servers, such as application server 150 and 158.

Application server 150 receives the content requests, generates a content response to each request, and sends the content responses to browser application 112 as event 1809. Though both responses are shown as one communication in the sequence diagram, it is understood that the responses from one or more application servers may be sent asynchronously or synchronously in separate transmissions. At some point after generating and transmitting the responses, GUID and other data may be transmitted from application server 150 to agent 152 as event 1810, for example by probes within an application being monitored on application server 150.

After transmitting the responses, Browser application 112 receives the content responses. After receiving the response, browser application loads content from the response into an interface. In some embodiment, each response may include script code to be loaded in browser application 112. In some embodiments, the script code loaded at event 1804 may be used to add a handler to anchors in a content page received in responses from one or more application servers at event 1809.

After receiving the content response as event 1809 and loading the content into browser application 112, the browser may receive a subsequent user selection as event 1811. The subsequent user selection may be a selection of a content page anchor element, form element or some other element that initiates a server request. The script code (performance monitoring code) within browser application 112 creates and stores a new GUID associated with the received user selection as event 1812 in the cookie or other file generated at step 1806. Browser application 112 then sends a content request C to application server 150 as event 1813. A subsequent content request D is sent to application server 150 at event 1814. As with events 1807-1808, it is understood that the content requests may be sent to synchronously or asynchronously different application servers or the same application server through one or more web servers.

Application server 150 receives the content requests, generates a content response to each request, and sends the content responses to browser application 112 as event 1815. After generating and transmitting the responses, the new GUID and other data for the monitored application server may be transmitted from application server 150 to agent 152 as event 1816, for example by probes within an application being monitored on application server 150. After receiving data from application server 150, agent 152 transmits aggregated performance data, including GUID data, to enterprise manager 120 as event 1817.

Figure 20:
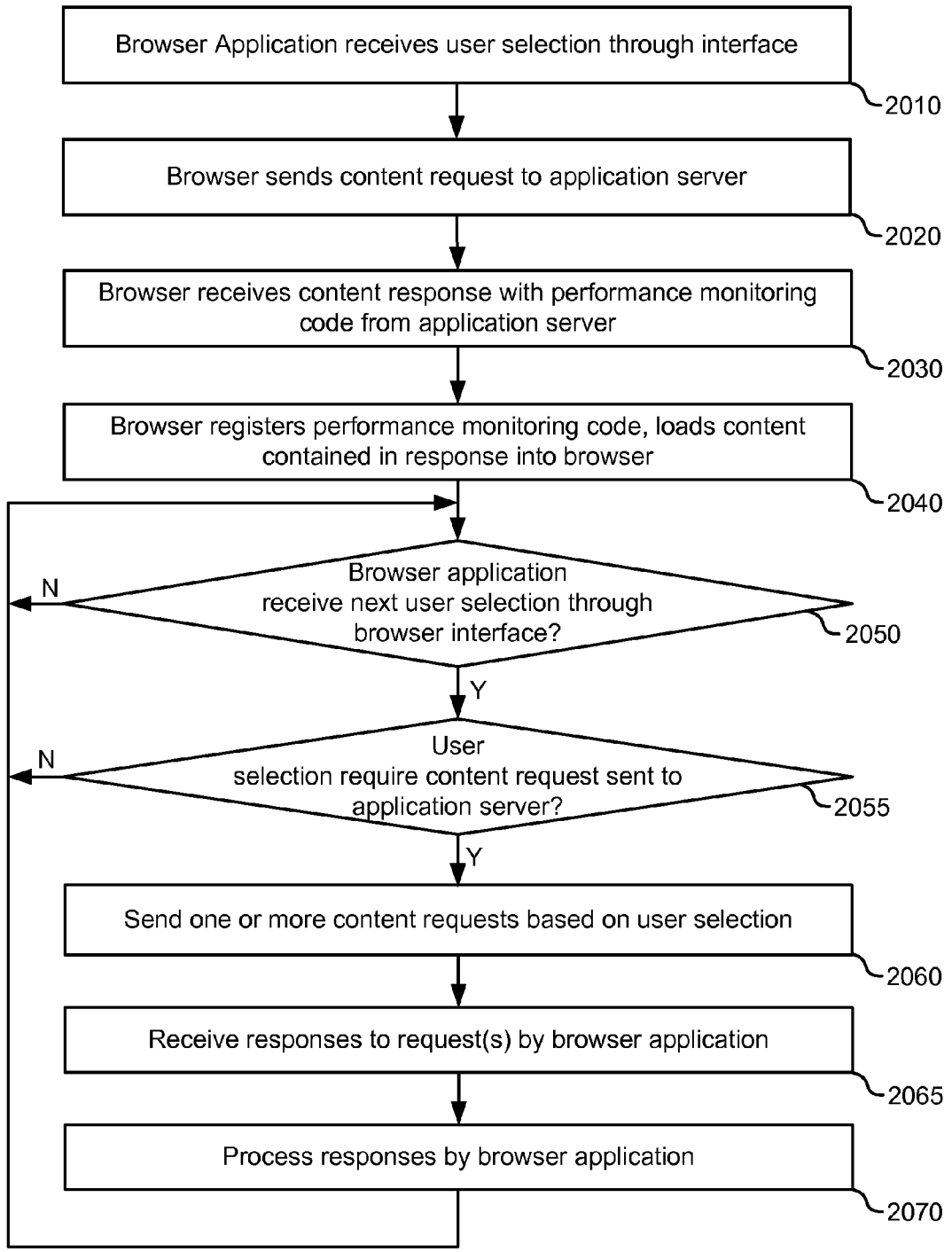
FIG. 20 illustrates a flowchart of an embodiment of a method for client-side actions performed to monitor application performance.
Figure 21:
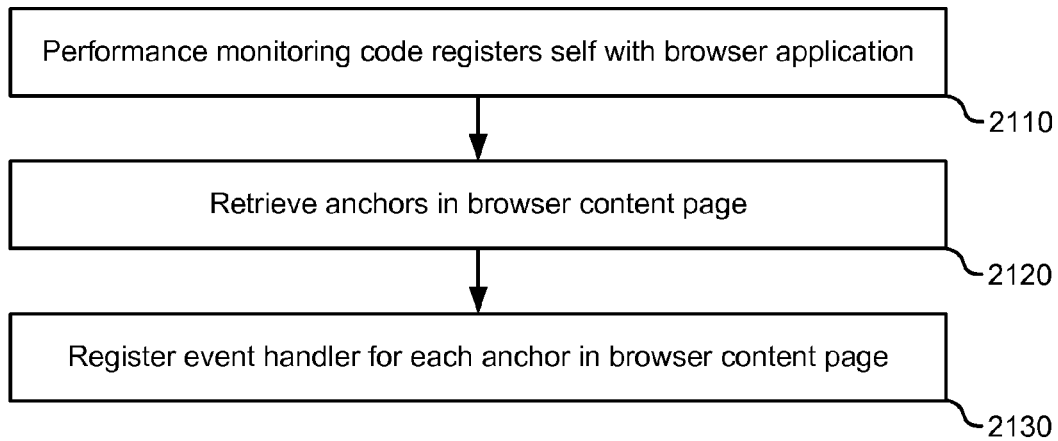
FIG. 21 illustrates a flowchart of an embodiment of a method for registering performance monitoring code in a browser application.
Figure 22:
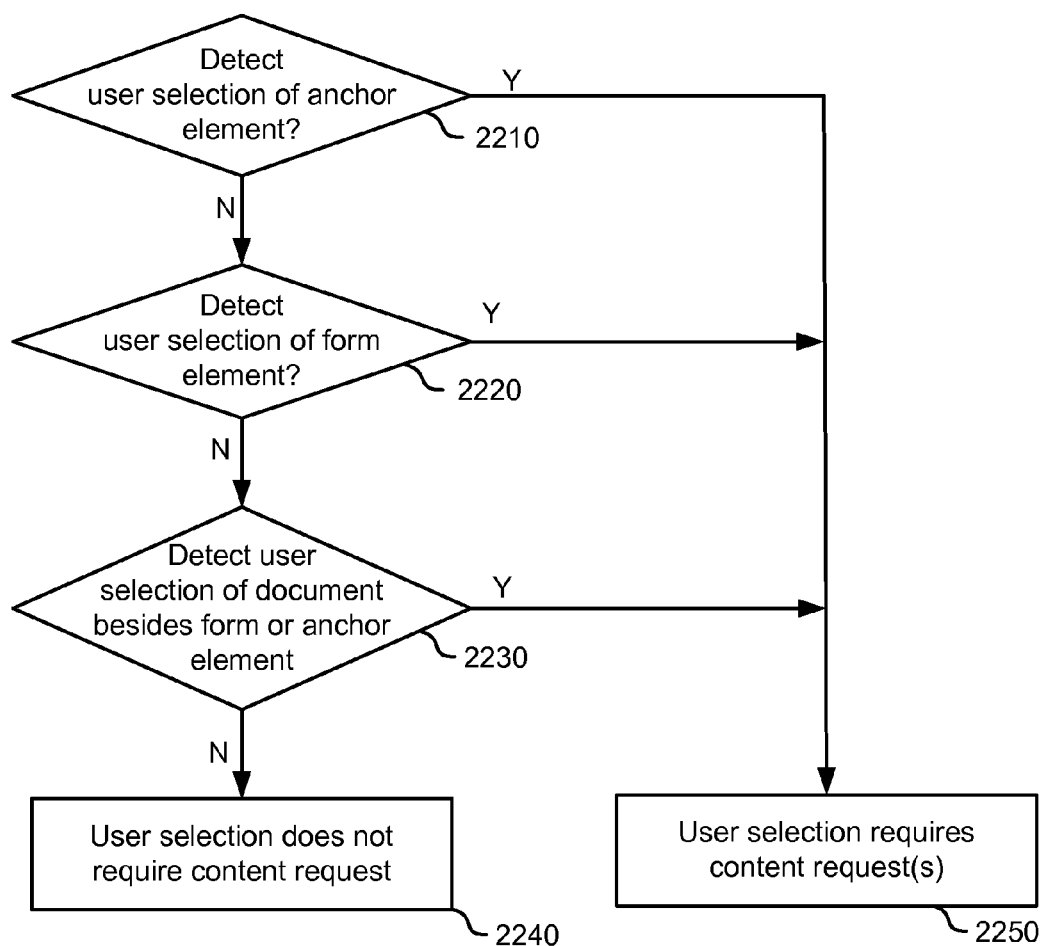
FIG. 22 illustrates a flowchart of an embodiment of a method for storing time information in response to an On Click event.
Figure 23:
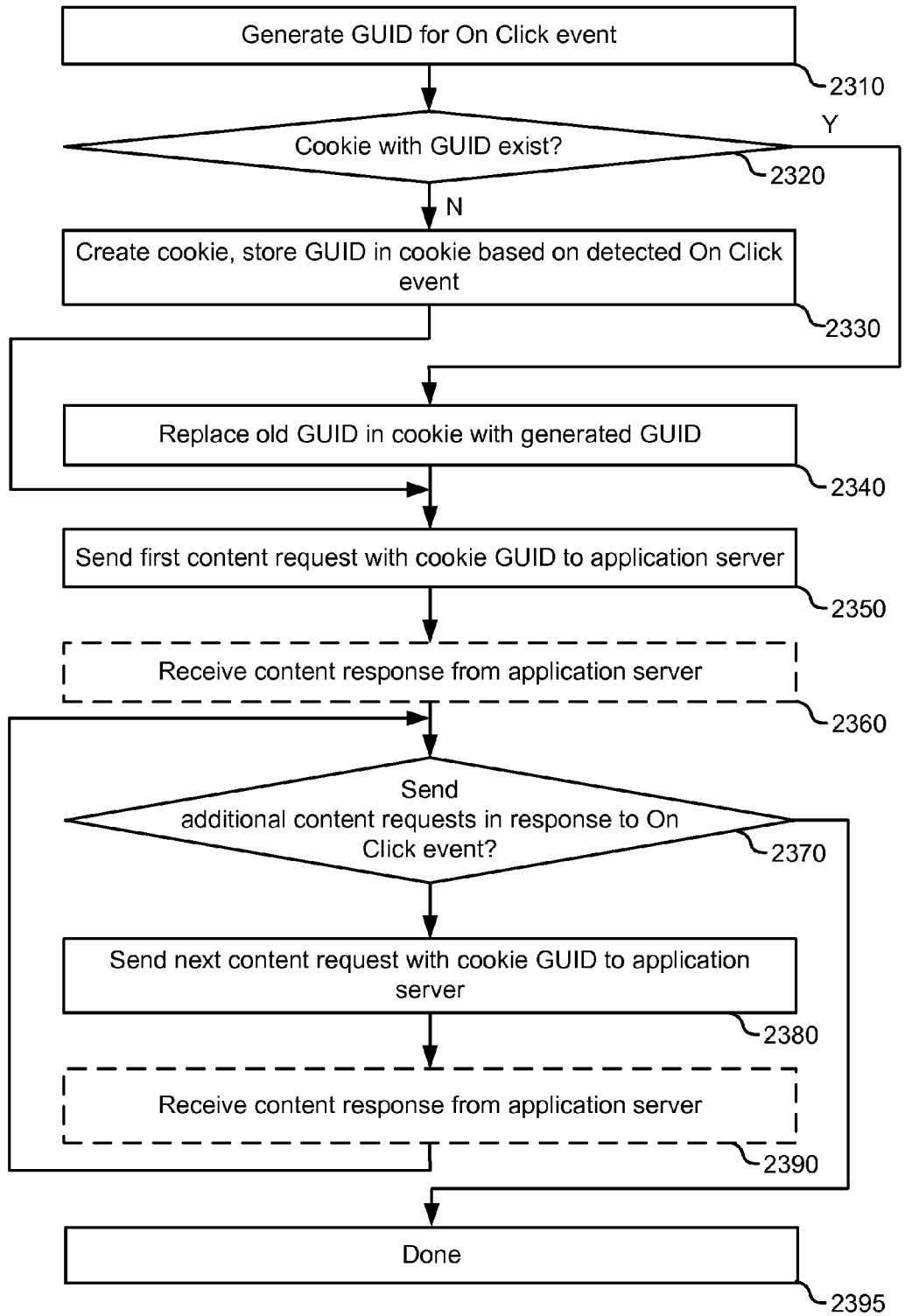
FIG. 23 illustrates a flowchart of an embodiment of a method for sending content requests and receiving request responses.
Figures 24, 26:
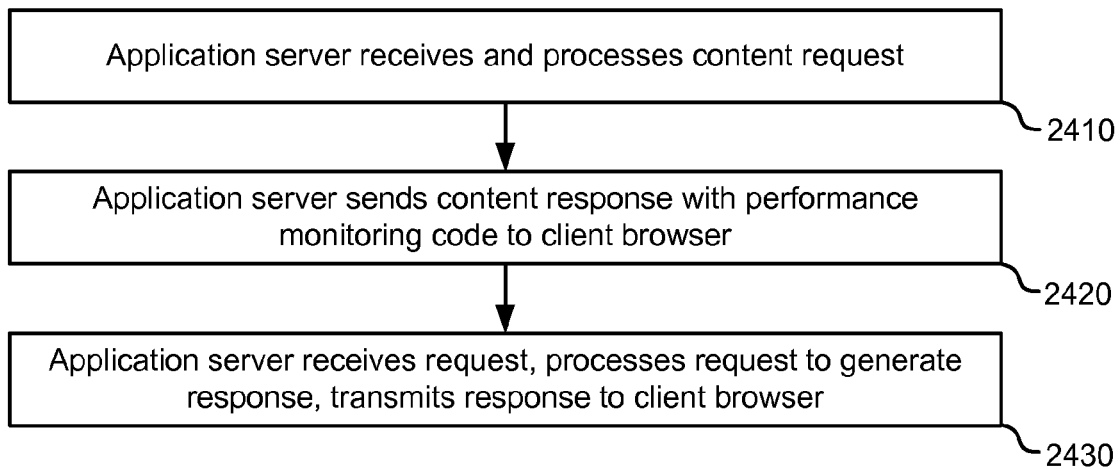
FIG. 24 illustrates a flowchart of an embodiment of a method for server-side actions performed to monitor application performance.
FIG. 26 illustrates an example of a servlet identification table.

The entities implementing the present technology and the events between those entities are discussed in more detail below. In particular, the portion of the present technology implemented at client device 105 by browser application 110 is discussed with respect to FIGS. 20-23. FIG. 20 is a flowchart illustrating client side actions performed by browser application 110 and performance monitoring code executed at the browser. FIGS. 21-23 provide more detail for the flow chart of FIG. 20. The portion of the present technology implemented at an application server is discussed with respect to FIGS. 24-30. FIG. 24 provides a flowchart illustrating server side actions performed by application server 130 while a web service is monitored. FIGS. 25-30 provide more detail for the flow chart of FIG. 24.

Figure 19:
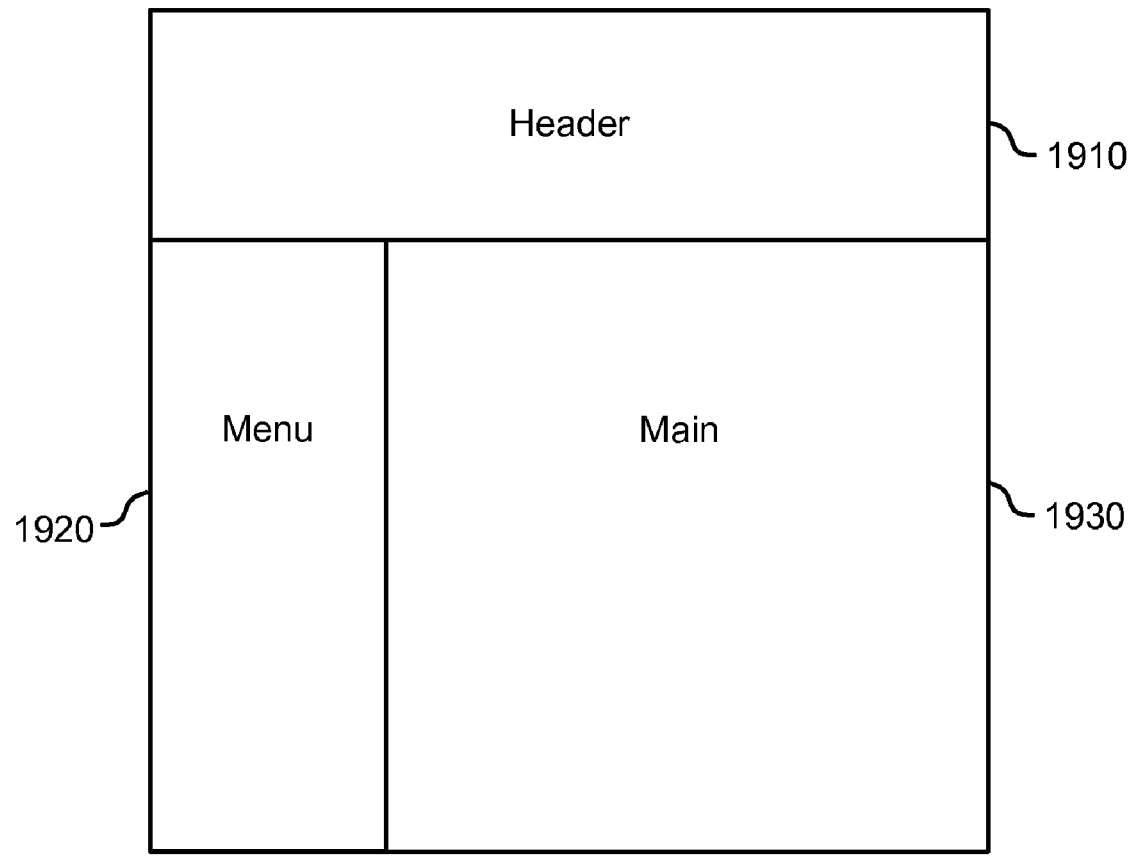
FIG. 19 illustrates an embodiment of a block diagram of a content page having frames.

In some instances, a user selection received through a browser application may initiate more than one content request. This may be the case for browser content provided in frames. FIG. 19 illustrates an embodiment of a block diagram of a content page having multiple frames. The content page of FIG. 19 includes frames 1910, 1920 and 1930. Each frame may be associated with a target name. For example, frame 1910 has a target name of "Header," frame 1920 has a target name of "Menu" and frame 1930 has a target name of "Main." In some embodiments, a single frame may be configured to send more than one content request in response to user input. In particular, a frame may initiate a content request for more than one frame within the content page. For example, if the content page of FIG. 19 is associated with an email interface, input received into "Menu" frame 1920 may trigger a content request for a list of emails for "Menu" frame 1920, inbox header content for "Header" frame 1910, and mail content for "Main" frame 1930. In any case, multiple On Unload events and On Load events may be associated with a single On Click event in a browser application providing a content page having frames.

FIG. 20 illustrates a flowchart of an embodiment of a method for the client-side actions performed in monitoring related transactions of a web service. With respect to the sequence diagram of FIG. 4, the flowchart of FIG. 20 provides more detail for the steps performed by browser application 110 and performance monitoring code within browser application 110. The flowchart of FIG. 20 begins with browser application 110 receiving a user selection through an interface at step 2010. The interface is provided by browser application 110 and may be implemented as a web page. The user selection received through the interface can include a selection of an anchor element, selection of a form, a hot key, detection of an On Click event, selection of other page content or some other input. Selection of anchor elements and form elements is discussed in more detail below with respect to FIG. 22.

After receiving user input, browser application 110 sends a content request to application server 130 at step 2020. In one embodiment, the content request is sent to application server 130 in response to receiving a user selection at step 2010. For example, the user selection may select a hyperlink which requires a resource or other content to be retrieved from application server 130. Browser application 110 may then generate a content request to retrieve the resource. After sending the content request, browser application 110 receives a content response containing performance monitoring code from application server 130 at step 2030. The performance monitoring code may be script code, for example Java Script code or some other format of code. In one embodiment, application server 130 generates the content response after receiving the content request from browser application 110. Generation of the response by application server 130 is discussed in more detail with respect to FIGS. 24-27 below.

After receiving the response, browser application 130 retrieves browser content and the performance monitoring code from the response, registers the performance monitoring code with browser application 110, and loads browser content into the browser application at step 2040.

In one embodiment, registering the performance monitoring code at step 2040 includes registering code with event handlers in browser application 110. The event handlers may include an On Click event handler and other handlers for one or more anchors in the current content page provided in the network browser. Registration of code with event handlers is discussed in more detail below with respect to FIG. 21.

After loading the content of the content response at step 2040, a determination is made as to whether the next user selection is received through browser application 110 at step 2050. Browser application 130 may receive the next user selection through an interface provided by browser application 110. Input received may be the same type of input discussed above with respect to step 2010 or some other type of input. If the next user selection has not been received through browser application 110, the method of FIG. 20 remains at step 2050 until the next user selection is received. Once the next user selection is received, a determination is made as to whether the user selection requires one or more content requests to be made at step 2055. The user selection may require one or more content requests if the selection is a particular type of input, such as an anchor element or a form element. Other types of input, such as a selection of the background of a content page, may not require generating a content request for an application server. Determining whether a user selection requires one or more content requests at step 2055 is discussed in more detail below with respect to the method of FIG. 22. If the user selection received requires one or more content requests, the method of FIG. 20 continues to step 2060. If the user selection does not require a content request, the method returns to step 2050.

One or more content requests are transmitted based on the user selection at step 2060. Transmitting content requests may include generating a GUID or other identifier for the user selection and including the GUID in each request initiated by the user selection. Sending one or more content requests is discussed in more detail with respect to FIG. 23. The responses to the transmitted requests are received at step 1065. After receiving the responses, browser application 130 processes the responses at step 2070. Processing the responses may include providing content in browser application 112, loading performance monitoring code in the browser application, and other processing. In some embodiments, the responses may be received synchronously or asynchronously with respect to request sent at step 2060.

As discussed above, when a browser application receives a first content response, performance monitoring code is registered with the browser application. The registered code can then generate a GUID associated with subsequent user input and include the GUID in content requests. FIG. 21 illustrates a flowchart of an embodiment of a method for registering performance monitoring code in browser application 110. In one embodiment, the flowchart of FIG. 21 provides more detail for step 2040 of FIG. 20 discussed above. The flowchart of FIG. 21 begins with performance monitoring code registering itself with browser application 112 at step 2110. The code registers itself with browser application 112 so that the browser will be able to execute the code. When executed, the registered code will perform actions as discussed below.

After the performance monitoring code is registered with browser application 112, the code retrieves the anchors included in the HTML of the browser content page provided by browser application 110 at step 2120. In this case, the code may request a list of all the anchors contained in the content page provided by browser application 112.

An event handler is then registered for each anchor in the content page at step 2130. Registering an event handler for each anchor in the page may include registering code that will generate a GUID upon detecting a user selection of the anchor. The GUID may be stored in one or more data files, cookies or in some other format on the client or some other location. In one embodiment, the GUID is stored in a cookie on client 110 by browser application 112. After registering an event handler for each anchor, registration of the performance monitoring code is complete. In some embodiments, an event handler is registered for selected anchors which initiate a transaction component to a particular application rather than all anchors in a content page.

FIG. 22 illustrates a flowchart of an embodiment of a method for determining whether a user selection requires one or more content requests are generated and transmitted. In one embodiment, the flowchart at FIG. 22 provides more detail for step 2055 of FIG. 20. A determination is made as to whether a user selection of an anchor element is detected at step 2210. In one embodiment, an anchor element is an element associated with a hyperlink, and selection of the hyperlink results in user selection of the hyperlink anchor element. If a user selection is associated with an anchor element, the user selection requires one or more content requests at step 2250.

If the user selection is not associated with an anchor element, a determination is made as to whether the user selection is associated with a form element at step 2220. Selecting a form element may include completing a form using a control mechanism within an interface provided by browser application 112. Control mechanisms may include buttons, check boxes, radio buttons, menus, text input, file selects, hidden controls, object controls or other controls. If the user selection involves a form element, the form element selection requires one or more content requests are generated at step 2250. If a determination is made that no form element selection was received, the method continues to step 2230.

A determination is made as to whether a user selection is associated with an element of the document besides a form or anchor element at step 2230. If the user selected a selectable portion of the document other than an anchor or element, the user selection may require one or more content requests at step 2250. If the selection was not associated with a selectable portion of the document, the user has selected or "clicked" an irrelevant or unselectable part of the content page (for example, the background of the page) and a determination is made that the user selection received does not require any content requests at step 2240. When a user selection associated with an On Click event is determined to be an irrelevant element of the content page as indicated at step 2240, no GUID is stored.

FIG. 23 is a flow chart of an embodiment of a method for sending content requests and receiving request responses. In some embodiments, FIG. 23 provides more detail for step 2060 of the method of FIG. 20. First, a GUID is generated for an On Click event at step 2310. The GUID may be generated by script code provided by an application server and loaded into browser application 112. The GUID may be a random number, a number in a sequence, based on an algorithm (such as the date and time) or some other number. Next, a determination is made as to whether a cookie or other file with a previously generated GUID exists at step 2320. If a previous user selection was made since the script code was loaded into the browser, the cookie (or other file) would have been generated at the time of the prior user selection. If the current user selection is the first user selection since the script code was loaded into the browser, then a cookie may not already exist. If a cookie does already exist at step 2320, the method of FIG. 23 continues to step 2340 where the old GUID in the cookie is replaced with the new GUID generated at step 2310. The method of FIG. 23 then continues to step 2350. If a cookie does not currently exist, the cookie is created by browser application 112 and the generated GUID is stored in the cookie at step 2330. The method of FIG. 23 then continues to step 2350.

A first content request is sent to an application server with the cookie and corresponding GUID at step 2350. The first content request corresponding to event 1807 in the sequence diagram of FIG. 18 may be one of several content requests generated in response to the user selection. At some point, a content response is received from the application server at step 2360. As discussed above, the response may be asynchronous with respect to the request, and is therefore optional at this point in the method (as indicated by a dashed line). A determination is made as to whether additional content requests should be sent in response to the most recent user selection (On Click event) at step 2370. If no additional content requests are to be sent, the method of FIG. 23 is complete at step 2395. If one or more additional content requests are to be made, the next content request is sent with the cookie GUID to the corresponding application server associated with the additional content request at step 2380. The additional content request includes the same cookie and GUID which was included in the first content request at step 2350. Thus, all content requests sent in response to a single On Click event include the same cookie and GUID which identify the On Click request.

At some point after sending the additional content request, one or more application servers receive the additional content requests, process the requests, generate a response to each request and transmit the responses back to client 110. The responses to the additional content requests are received by browser application 110 from application server 150 at step 2390. As discussed above, the response may be asynchronous with respect to the request, and is therefore optional at this point in the method (as indicated by a dashed line). After receiving the additional content response, the method of FIG. 23 returns to step 2370 where a determination is made as to whether there are additional content requests to send.

FIG. 24 is a flowchart illustrating the server side actions performed in the process of monitoring transactions over a network. The flow chart of FIG. 24 provides detail for the operation of application server 150 of FIGS. 14 and 18. First, application server 150 receives and processes a content request at step 2410. Application server 150 receives the request from browser application 110 and processes the request using one or more servlet filters and a servlet. Processing by the servlet includes generating a content response, which may include content requested by browser application 110. Processing by the servlet filters may include adding performance monitoring code to the content response. Receiving and processing a content request by application server 150 is discussed in more detail below with respect to FIG. 25.

Application server 150 sends the content response to browser application 110 at step 2420. The content response includes performance monitoring code added to the response while processing the request. The performance monitoring code may include script code for detecting anchors in a content page and adding handlers to each anchor. Each added handler may generate and store a GUID, randomly generated or otherwise, in a cookie or other file upon receiving a user selection through browser application 112. The cookie is then transmitted to an application server as part of subsequent content requests sent by a browser application in response to the user selection.

After sending the content response at step 2420, application server 150 receives one or more content requests, processes the requests to generate one or more content responses and transmits the responses to requesting browser application 112 at step 2430. Each request received after sending the response with performance monitoring code will contain a GUID. The GUID can be included in communication between application components that process the request on application server 150. For example, if application server 150 forwards the request to an application within the server, and several components (EJBs, servlets, and so on) may process the request in the process of generating a response. The GUID will be communicated between each EJB, servlet and other application component that processes the request.

Figure 25:
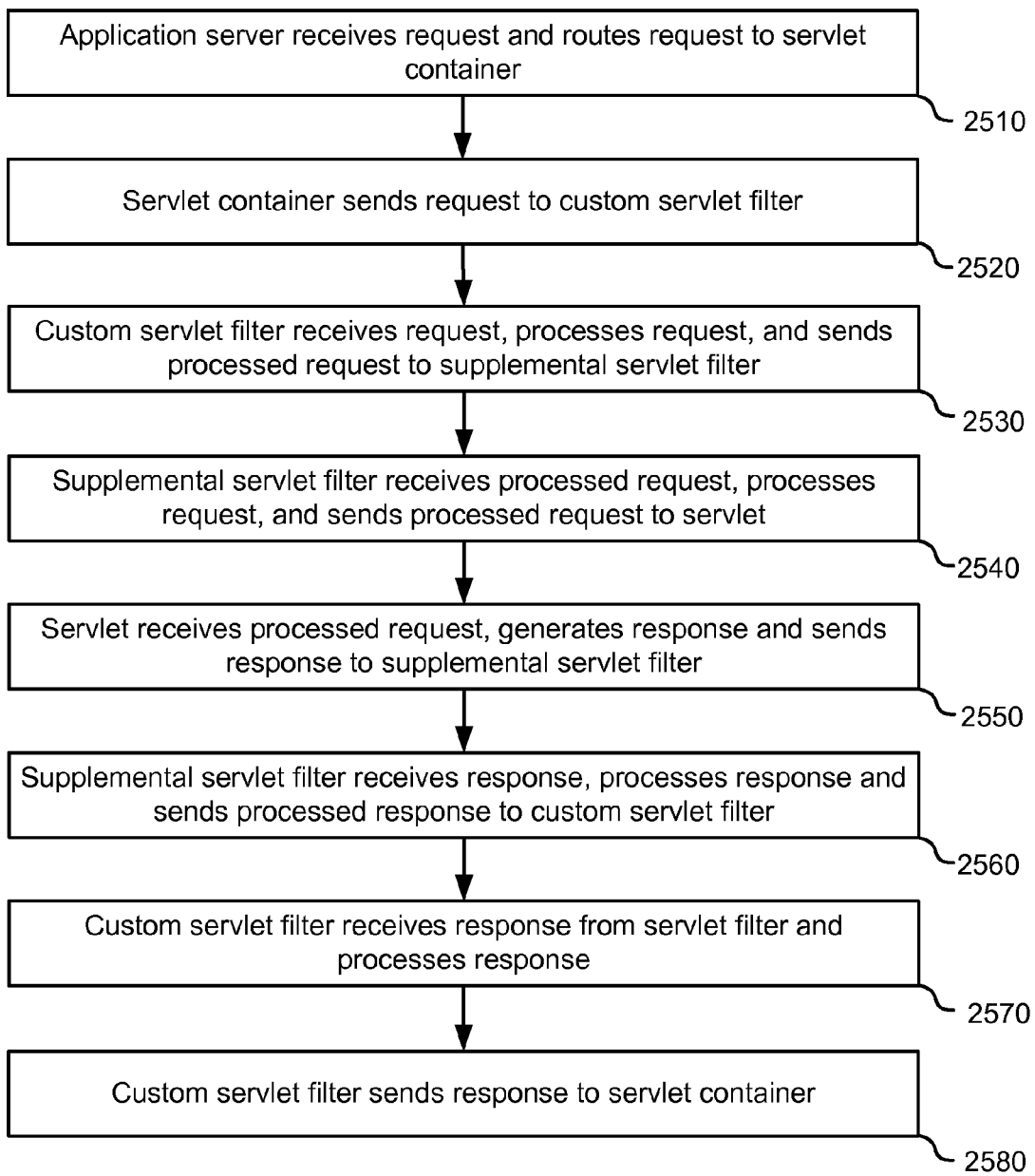
FIG. 25 illustrates a flowchart of an embodiment of a method for processing a content request by an application server.

FIG. 25 illustrates a flowchart of an embodiment for processing a content request by an application server. The flowchart of FIG. 25 provides more detail for step 2410 of the flowchart of FIG. 24. The flowchart of FIG. 25 begins with application server 150 receiving a request and routing the request to servlet container 1520 at step 2510. Next, servlet container 1520 sends the request to custom servlet filter 1530 at step 2520. Before sending the request, servlet container 1520 determines the appropriate servlet to process the response. In one embodiment, servlet container 1520 maintains templates for URLs that determine the chain of servlet filters and servlets to route requests to. To send the request, servlet container 1520 calls custom servlet filter 1530 with a request object and response object. The response object may be in the form of a response template generated by servlet container 1520.

Next, custom servlet filter 1530 receives the request from servlet container 1520, processes the request and sends the processed request to supplemental servlet filter 1540 at step 2530. In one embodiment, processing of the request by custom servlet filter 1530 includes assigning a unique identification number to the request. The request unique identification number and servlet identification information used to process the request is stored in servlet identification table 131. Servlet identification table 131 is discussed in more detail with respect to FIG. 24. In another embodiment, custom servlet filter 1530 may wrap the response object in a wrapper. The response object wrapper may be used to detect communications made to and from the response. For example, the wrapper may detect what mechanism is used to generate the body of the response and subsequently provide that information to a requesting entity. This is discussed in more detail below with respect to FIG. 27.

Supplemental servlet filter 1540 receives the content request from custom servlet filter 1530, processes the request if needed, and sends the content request to servlet 1550 at step 2540. Supplemental servlet filter 1540 can perform any needed action to the response object before providing the response to servlet 1550. For example, custom servlet filter 1540 may be used to change an image within the request from one format to another format within the response.

Servlet 1550 receives the content request from supplemental servlet filter 1540, generates a content response, and sends the response to supplemental servlet filter 1540 at step 2550. Servlet 1550 may perform logic on the received request and generate the response object for transmission to client device 110. In generating the response, servlet 1550 can access one or more databases, call methods, or perform other actions. In one embodiment, a response wrapper associated with the response may record the mechanism used by servlet 1550 to generate the response. For example, the response may be generated using a writer method, an output stream or some other mechanism. In any case, the response wrapper will save the writing mechanism information. In another embodiment, servlet 1550 may configure length information for the response. The length information may be saved to the response itself as a length tag. The length tag may specify the length or size of the response (for example, 200 bytes). This may be manipulated later if the response is amended to include performance monitoring code or other information code.

Supplemental servlet filter 1540 receives the content response from servlet 1550, processes the response if needed, and sends the content response to custom servlet filter 1530 at step 2560. Supplemental servlet filter 1540 may process the response by including any needed action as discussed above with respect to step 2540. Next, custom servlet filter 1530 receives the response from supplemental servlet filter 1540 and processes the response at step 2570. In one embodiment, custom servlet filter 1530 adds performance monitoring code to the response. The performance monitoring code may be JavaScript or some other type of code that is able to configure event handlers and/or otherwise modify browser content such as XML or HTML generate a GUID and store the GUID in a cookie upon detecting a user selection through a browser application content page. Adding performance monitoring code to the content response is discussed in more detail below with respect to FIG. 27. After processing the content response, custom servlet filter 1530 transmits the response to servlet container 1520 at step 2580. The response is now ready to be sent back to browser application 110 at client device 110.

FIG. 26 illustrates an example of servlet identification table 590. The table of FIG. 26 includes columns for a unique identification number for received requests and servlet identification information. Each unique identification number corresponds with a request received by the application server. The servlet associated with each request identification number is the servlet used to process that particular request. As discussed above, this data is saved to a table, or other format, by custom servlet filter 162 at step 2530 at FIG. 25. The same servlet used to generate a response from a content request can be used to change or modify the response, if needed. The data of the table of FIG. 26 can be accessed to ensure that further processing of a response (associated with a particular request unique identification number) is performed by the appropriate servlet (the servlet corresponding to the unique identification number).

Figure 27:
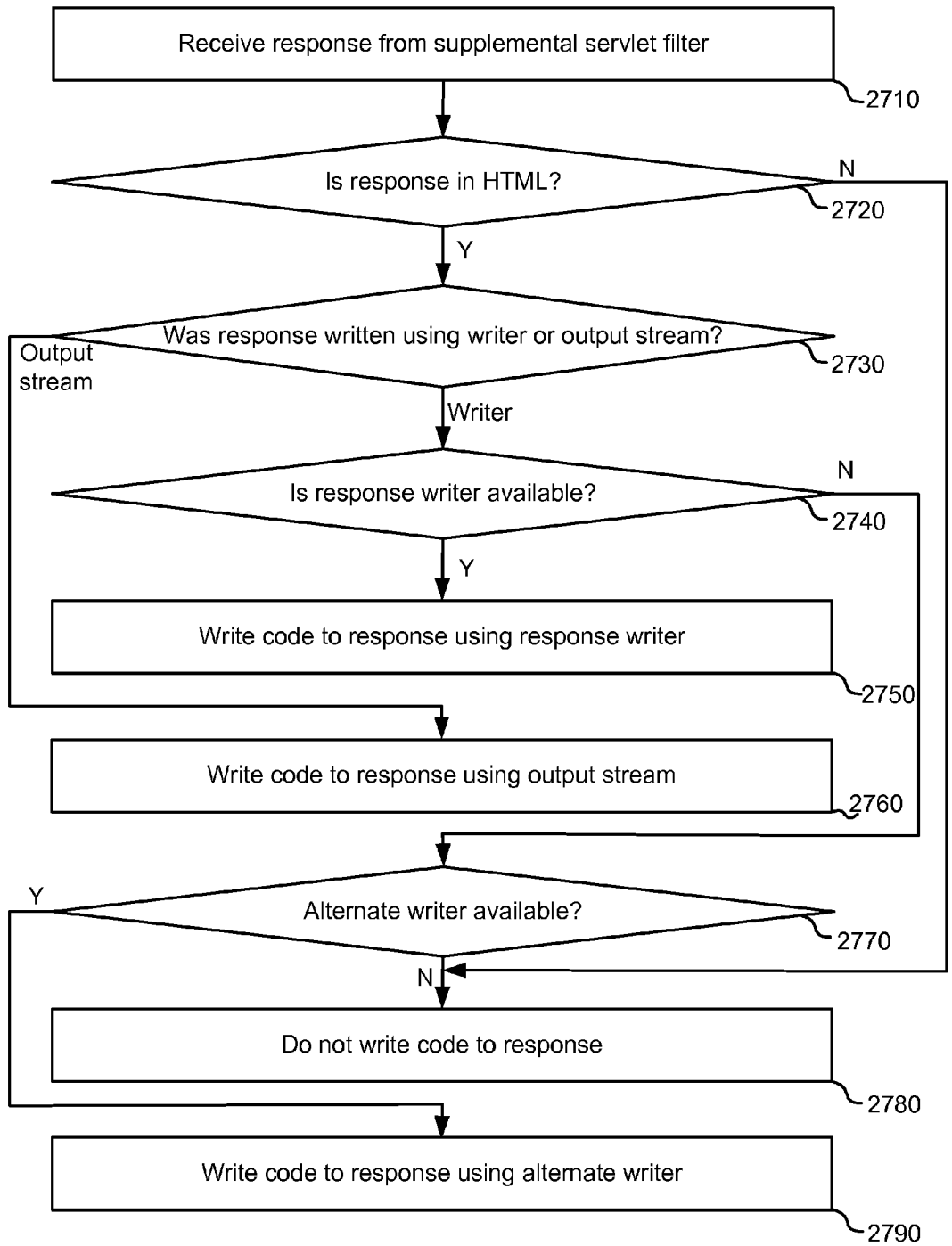
FIG. 27 illustrates a flowchart of an embodiment of a method for processing a response by a custom servlet filter.

FIG. 27 illustrates an embodiment of a method for processing a content response by custom servlet filter 272. FIG. 27 illustrates more detail of step 2570 of FIG. 25. First, a content response is received by custom servlet filter 1530 from supplemental servlet filter 1540 at step 2710. Next, a determination is made as to whether the received response is in HTML at step 2720. In one embodiment, the determination is made by querying the response object. The query may comprise of a call to a method for retrieving a Multi-Purpose Internet Mail Extension (MIME) type of the response object comprising the response. For example, the method may be a "get MIME type" method. The method call will retrieve the MIME type associated with the response. The response from the get MIME type method should indicate whether the MIME type is HTML or some other format. Custom servlet filter 1530 may analyze the response from the method to determine whether the content response is in HTML format or not. If the response is determined to be HTML, operation continues to step 2730. If the response is determined to not be in HTML, then operation continues to step 2780. In one embodiment, in addition to determining the MIME type of the received content response, a portion of the response object may be parsed to confirm it has a particular format. For example, a header portion of the response may be parsed to determine if it is in HTML format.

A determination is made as to whether the content response was written using a writer method or output stream at step 2730. In one embodiment, a Get Writer query can be made to the response object comprising the response. A response object wrapper having information associated with how the response was generated may intercept and reply to the Get Writer query. In one embodiment, the response object wrapper may record the mechanism used by servlet 1550 to generate the object at step 2550 of the flowchart of FIG. 25. If it is determined that the response was written using a writer method, operation continues to step 2740. If it is determined that the response was written using an output stream, operation continues from step 2730 to step 2760.

If a writer method was used to generate the response, a determination is made as to whether the particular response writer object used to generate the content response is available at step 2740. In this case, the response writer object used to generate the content response is needed to add additional content, such as performance monitoring code, to the content response. In one embodiment, the response writer object may not be available if it is closed or currently in use. Custom servlet filter 1530 can call the desired response writer to determine whether it is available or not. In this case, the writer will send a response indicating whether it is closed or unavailable. If the response writer is determined to be available at step 2740, operation continues to step 2750. If the writer method is not available, operation continues to step 2770.

If the writer method used to generate the response is determined to be available at step 2740, JavaScript or some other appropriate type of code is written to the response using the available response writer at step 2750. The code written to the response may include response identification data, code used to configure event handlers, generate and store a GUID, and store, access and configure data files, browser cookies or other files at browser application 1112. In another embodiment, in addition to writing the code to the response, the response writer may be used to change the response length data. In one embodiment, the response generated by servlet 1550 includes data indicating the length or size of the response. The response length can be changed to reflect the addition of the performance monitoring code. In this case, the writer is used to change the length tag to reflect the length of the response which includes the performance monitoring code.

If a determination is made at step 2730 that the response was written using an output stream, then the performance monitoring code is written to the response using an output stream at step 2760. The code written using an output stream may be similar to that written using a response writer at step 2750. The flowchart of FIG. 27 then ends at step 2760.

If a determination is made at step 2740 that the response writer is not available, a determination is then made as to whether an alternate writer is available at step 2770. The alternate writer may be provided by custom servlet filter 1530 or some other source. If no alternate writer is available, operation continues to step 2780. If an alternate writer is available, operation continues to step 2790. At step 2780, no performance monitoring code is written to the response and operation of the flowchart ends. At step 2790, performance monitoring code is written to the response using the alternate writer. The code written to the response using the alternate writer at step 2790 is similar to the performance monitoring code using original response writer at step 2750. The flowchart of FIG. 27 then ends at step 2790.

Figure 28:
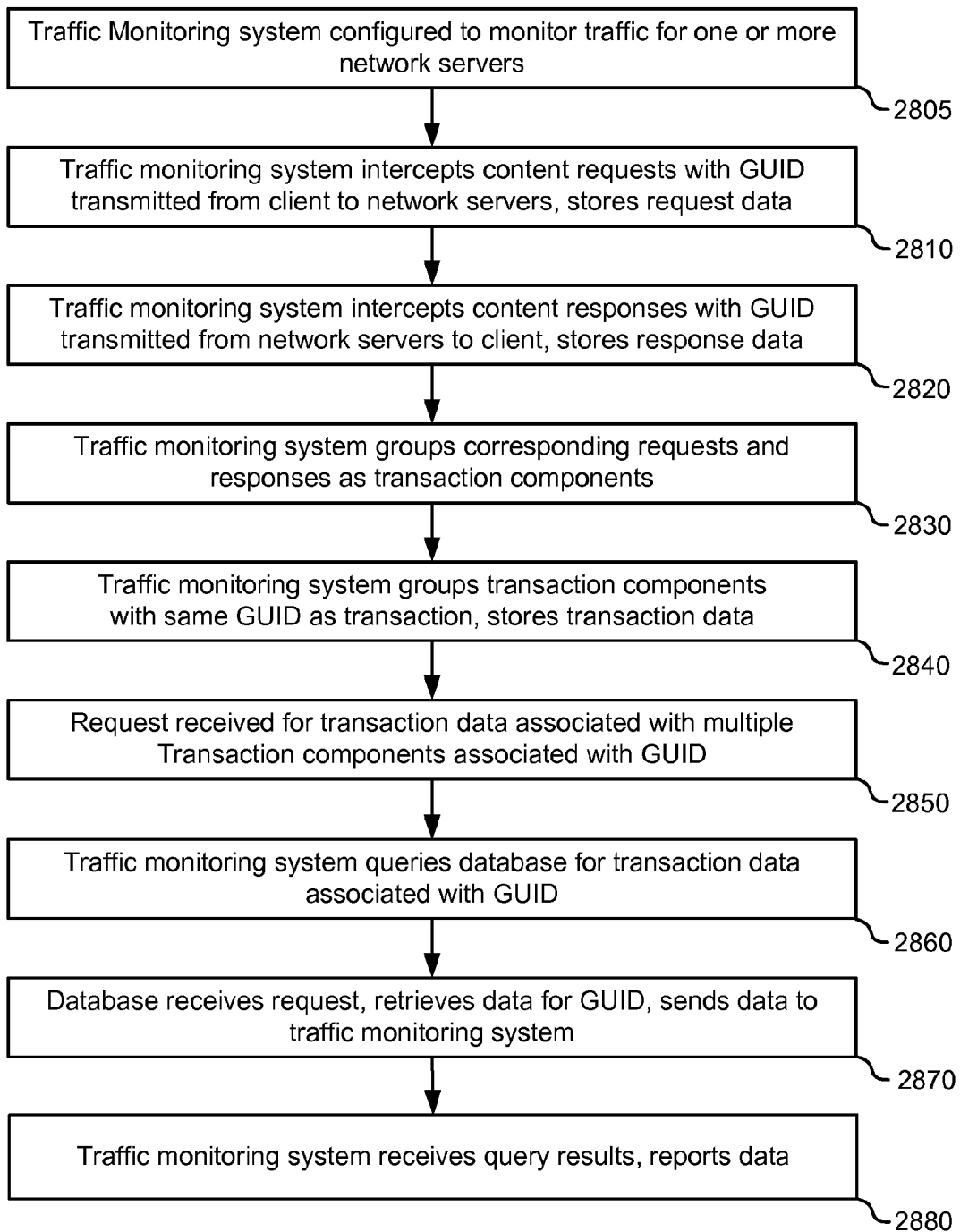
FIG. 28 illustrates a flowchart of an embodiment of a method for reporting data for correlated transaction components by a traffic monitoring system.

Once data is collected for a set of request-response pairs which comprise application components making up a transaction, data regarding the transaction, transaction components, and the application components that process the transaction can be reported. Reporting can be performed using traffic monitoring system 180, application monitoring system 190, both or some other system. FIG. 28 illustrates a flowchart of an embodiment of a method for reporting data for correlated transaction components by a traffic monitoring system. First, a traffic monitoring system is configured to monitor traffic for one or more network servers at step 2805. This involves setting up the system to monitor traffic for one or more web servers or application servers. The traffic monitoring system intercepts content requests with a GUID transmitted from client 110 to network server 140 and stores content request data at step 2810.

Content responses are intercepted between one or more network servers and client 110 and response data is stored at step 2820. The traffic monitoring system may then group corresponding requests and responses together as transaction components at step 2830. The request-response pairs are grouped together by identifying each response generated for a corresponding request. Configuring a traffic monitoring system, intercepting requests and responses, storing data for the intercepted communications and grouping request-response pairs is discussed above with respect to FIGS. 1B, 2-3 and 8-10B.

Traffic monitoring system 180 groups transaction components having the same GUID as a transaction and stores the transaction data at step 2840. In some embodiments, transaction server 164 of traffic monitoring system 180 may receive data from several traffic monitors and group transaction component data that has the same GUID. By grouping data from several traffic monitors which may monitor different servers, transaction server 164 may correlate transaction components associated with different servers. The correlated transaction components may be stored by transaction server 164 within database server 360 of FIG. 3.

A request may be received for transaction data associated with multiple transaction components associated with the GUID at step 2850. In response to the request, the traffic monitoring system may query a database for transaction data associated with the GUID at step 2860. In some embodiments, the query may be made from report console 370 to database server 360. A database receives the request, retrieves data for the GUID and sends data to the traffic monitoring system requesting entity at step 2870. In some embodiments, the data may include transaction component identification information for each component associated with the GUID, timing information for the transaction components, and other data. Traffic monitoring system 180, for example report console 370, retrieves the results of the request and reports the data at step 2880. The data may be reported through a browser 372, an email alert, pager alert, printer, or some other reporting mechanism. The reported data may indicate a set of transaction components performed between client 110 and one or more servers, either synchronously or asynchronously, in response to a single user selection received through browser application 112.

Figure 29:
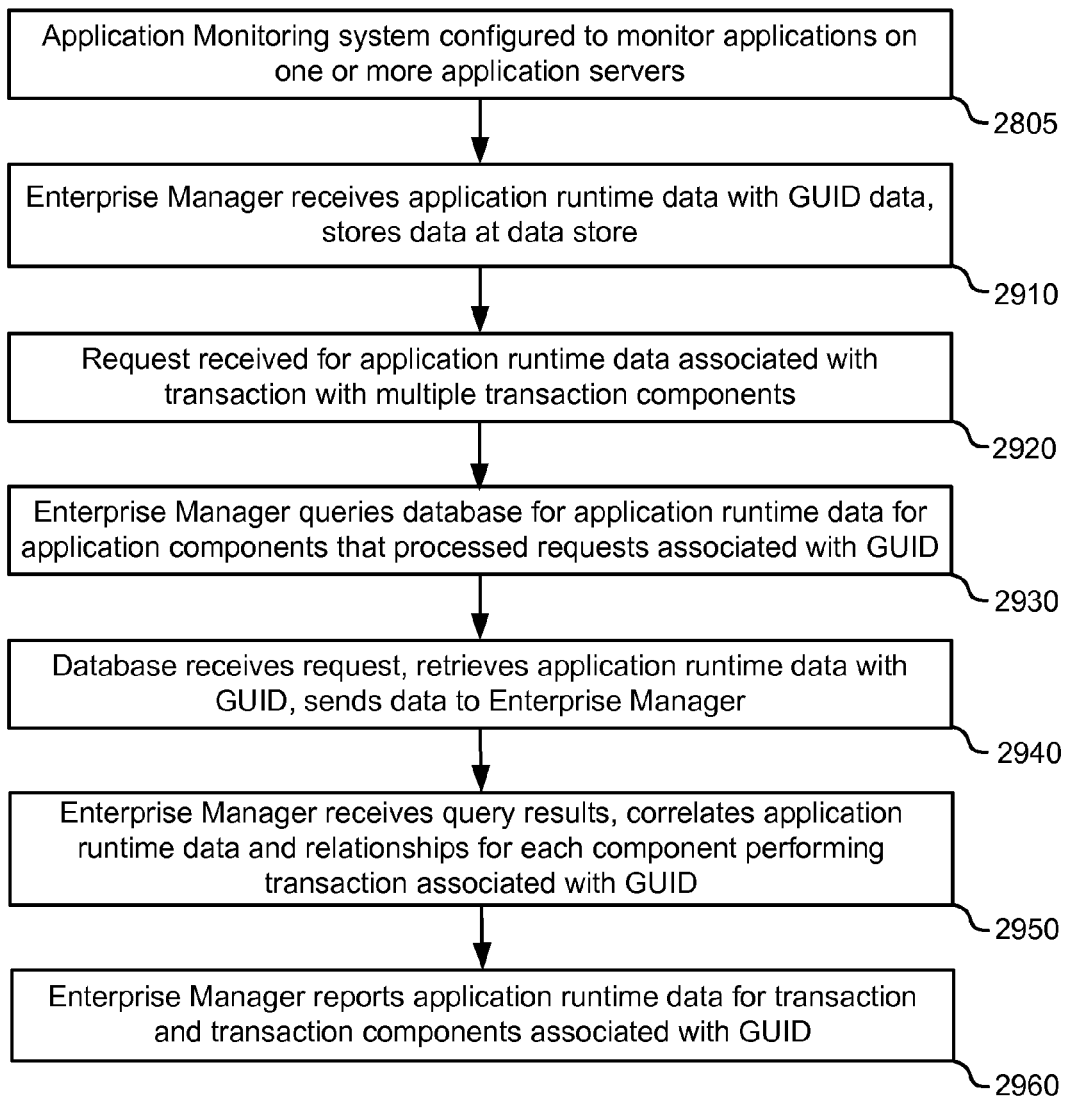
FIG. 29 illustrates a flowchart of an embodiment of a method for reporting performance data for components processing correlated transaction components by an application monitoring system.

FIG. 29 illustrates a flowchart of an embodiment of a method for reporting application runtime data for components processing correlated transaction components by an application monitoring system. Application monitoring system 190 is configured to monitor applications on one or more application servers at step 1805. Enterprise manager 155 receives runtime application runtime data with GUID data and stores the data at step 2910. The data may be stored by the enterprise manager at database 430 or at some other location and includes data indicating what components processed requests associated with the GUID. Configuring application monitoring system 190 and receiving and storing data by enterprise manager 155 is discussed in more detail above with respect to FIGS. 1C, 4 and 11-12B.

A request is received for application runtime data at step 2920. The request may be for a transaction having multiple transaction components and received through workstation 410 or 420 or some other source. Enterprise manager 155 queries database 430 for application runtime data at step 2930. In some embodiments, enterprise manager 155 associate the request with a corresponding GUID if applicable, and query the database for application runtime data associated with the GUID. For example, the enterprise manager may associate a transaction name, URL or some other identifier with a GUID if the transaction is comprised of multiple transaction components.

Database 430 receives the request, retrieves the application runtime data associated with the GUID in the request, and sends the retrieved data to enterprise manager 155 at step 2940. Enterprise manager 155 receives the query results and correlates the data at step 2950. Correlating the received data may include correlating the relationships between application components that processed the transaction components, identifying a chain servlets, EJBs and other components that process a transaction component.

Application runtime data for the requested transaction and transaction components may then be reported at step 2960. The data reported is that associated with the GUID generated by browser application 112 and stored in requests initiated by a single user selection received through the browser. The data may be reported by enterprise manager 155 by email, pager, fax, printer or some other mechanism. In some embodiments, the requested application runtime data may be reported through work stations 410 and/or 420 in graphical format. For example, a user may select a transaction from a list of one or more transactions, and be provided with graphical data indicating the performance for each transaction component comprising the selected transaction (e.g., each transaction component associated with the GUID associated with the transaction).

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A computer implemented method for monitoring a transaction, comprising:

receiving a request through an application by a client;

generating an identifier in response to the request, the identifier associated with the request;

storing the identifier by the application;

generating by a hardware processor two or more content requests based on the received request, each of the two or more content requests including the identifier;

transmitting the two or more content requests with the identifier by the application; and correlating the two or more content requests using the identifier included in each of the two or more content requests, the two or more content requests forming the transaction, the identifier is a global unique identifier;

wherein the step of correlating includes:

accessing a set of traffic monitoring data associated with traffic experienced by one or more applications; and retrieving a subset of the traffic monitoring data associated with the identifier, the subset associated with the two or more content requests that form the transaction.

2. The computer implemented method of claim 1, wherein the request is received through a network browser application.

3. The computer implemented method of claim 1, wherein the identifier is stored by performance monitoring code received from a remote server and loaded into the application.

4. The computer implemented method of claim 1, wherein the identifier is associated with a user selection of an anchor element in a network browser, the application including the network browser.

5. The computer implemented method of claim 1,
wherein the request includes a user selection through a network browser application.

6. The computer implemented method of claim 1, further comprising:
configuring an event handler for one or more anchors in a content page provided by the application, each event handler configured to store the identifier.

7. The computer implemented method of claim 1, wherein said step of storing includes:
storing the identifier in a cookie file.

8. The computer implemented method of claim 7, further comprising:
replacing the identifier in the cookie file upon detecting a subsequent user selection or a browser idle state.

9. The computer implemented method of claim 1, wherein the two or more content requests are sent asynchronously.

10. The computer implemented method of claim 1, further comprising:
receiving a first user selection through an interface provided by the client application;
sending a content request to a server in response to the user selection; and
receiving a response associated with the content request from the server, the response including performance monitoring code, the performance monitoring code configured to store the identifier.

11. The computer implemented method of claim 1, wherein said step of correlating includes:
accessing a set of performance data associated with the performance of one or more applications; and
retrieving a subset of the performance data associated with the identifier, the subset associated with the two or more content requests that form the transaction.

12. One or more processor readable storage devices having processor readable code embodied on said processor readable storage devices, said processor readable code for programming one or more processors to perform a method comprising:
receiving a user selection through a network browser;
generating a global unique identifier (GUID) associated with the selection in response to the user selection;
sending two or more asynchronous requests by the network browser in response to the selection, each of the two or more asynchronous requests including the GUID; and
correlating the two or more asynchronous requests based on the GUID included in each of the two or more asynchronous requests;
wherein the step of correlating includes:
accessing a set of traffic monitoring data associated with traffic experienced by one or more applications; and
retrieving a subset of the traffic monitoring data associated with the identifier, the subset associated with the two or more content requests that form the transaction.

13. The one or more processor readable storage devices of claim 12, wherein the computer implemented method further includes:
receiving network browser content over a network from an application;
retrieving performance monitoring code from the network browser content; and
executing the performance monitoring code in the network browser, the executed performance monitoring code performing said step of generating a GUID associated with the user selection.

14. The one or more processor readable storage devices of claim 13, wherein the performance monitoring code is configured to store a new GUID in a file in response to each user selection received the requires a content request.

15. The one or more processor readable storage devices of claim 12, further comprising:
receiving a second user selection through the network browser;
generating a second GUID associated with the second user selection; and
transmitting the second GUID in two or more supplemental asynchronous requests to one or more servers in response to the second user selection.

16. The one or more processor readable storage devices of claim 12, wherein said step of sending includes:
sending one or more asynchronous requests to each of two or more remote application servers.

17. The one or more processor readable storage devices of claim 12, wherein said step of generating includes:
detecting a selection of an anchor element in a content page provided by the network browser; and
generating the GUID in response to said step of detecting.

* * * * *